(12) United States Patent
Beshai

(10) Patent No.: US 8,064,341 B2
(45) Date of Patent: Nov. 22, 2011

(54) TEMPORAL-SPATIAL BURST SWITCHING

(75) Inventor: Maged E. Beshai, Stittsville (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1741 days.

(21) Appl. No.: 10/952,619

(22) Filed: Sep. 29, 2004

(65) Prior Publication Data

US 2005/0078666 A1    Apr. 14, 2005

Related U.S. Application Data

(60) Provisional application No. 60/510,334, filed on Oct. 10, 2003.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 14/00 | (2006.01) |
| H04J 4/00 | (2006.01) |
| H04L 12/50 | (2006.01) |
| H04L 12/28 | (2006.01) |
| H04L 12/56 | (2006.01) |
| H04N 7/173 | (2011.01) |
| H04N 7/16 | (2011.01) |

(52) U.S. Cl. ..... 370/230; 370/235; 370/369; 370/395.4; 370/400; 398/47; 398/57; 398/75; 725/118; 725/148

(58) Field of Classification Search .......... 370/369–377, 370/380, 384–385, 229–230.1, 235–236.2, 370/395.4–395.43, 400; 398/43–49, 53–59, 398/66–72, 74–76, 79, 95, 97, 98–99; 725/118, 725/148; 710/29–35, 52–57
See application file for complete search history.

(56) References Cited

U.S. PATENT DOCUMENTS

| 6,647,017 B1 * | 11/2003 | Heiman .......................... 370/412 |
| 6,671,256 B1 * | 12/2003 | Xiong et al. .................... 370/230 |
| 6,898,205 B1 * | 5/2005 | Chaskar et al. ................ 370/450 |
| 7,366,412 B2 * | 4/2008 | Beshai ............................. 398/49 |
| 7,426,210 B1 * | 9/2008 | Miles et al. .................... 370/400 |
| 2002/0085491 A1 * | 7/2002 | Beshai et al. .................. 370/230 |
| 2002/0118420 A1 * | 8/2002 | Liu .................................. 359/139 |
| 2004/0264960 A1 * | 12/2004 | Maciocco et al. .............. 398/49 |

* cited by examiner

*Primary Examiner* — Alpus H Hsu
*Assistant Examiner* — Jeremy Costin
(74) *Attorney, Agent, or Firm* — Withrow & Terranova, PLLC

(57) ABSTRACT

Expanding the coverage of a time-shared network comprising electronic edge nodes interconnected by bufferless fast-switching optical nodes is enabled by combining spatial switching with temporal switching. The output side of each edge node preferably connects to a large number of core switches through individual time-locked channels and the input side preferably connects to each of a small number of core switches through a channel band having a sufficiently large number of channels. Wavelength routers may be used to aggregate individually-routed channels into WDM links.

16 Claims, 35 Drawing Sheets

Prior-art

Prior-art

Prior-art

Prior-art

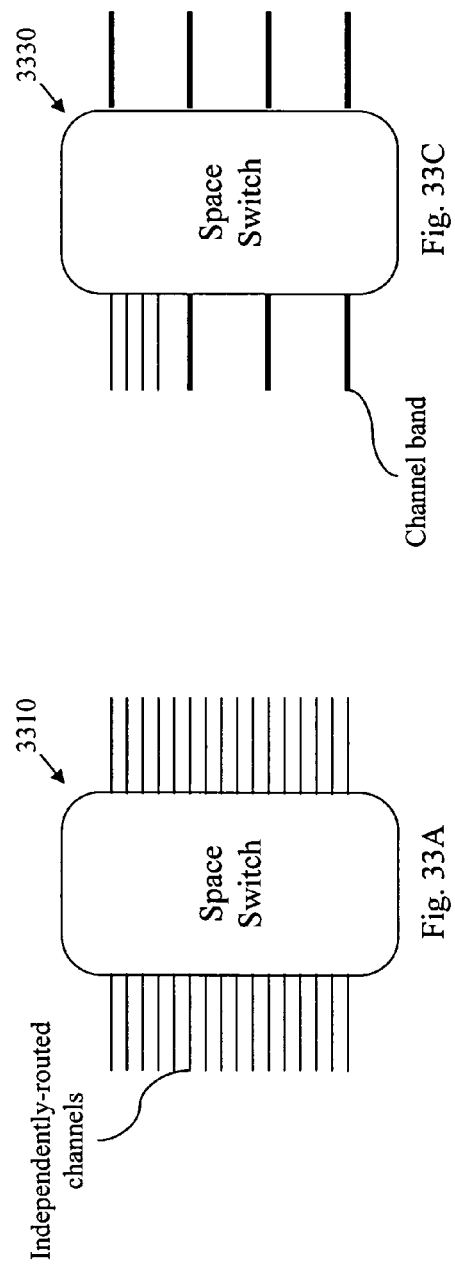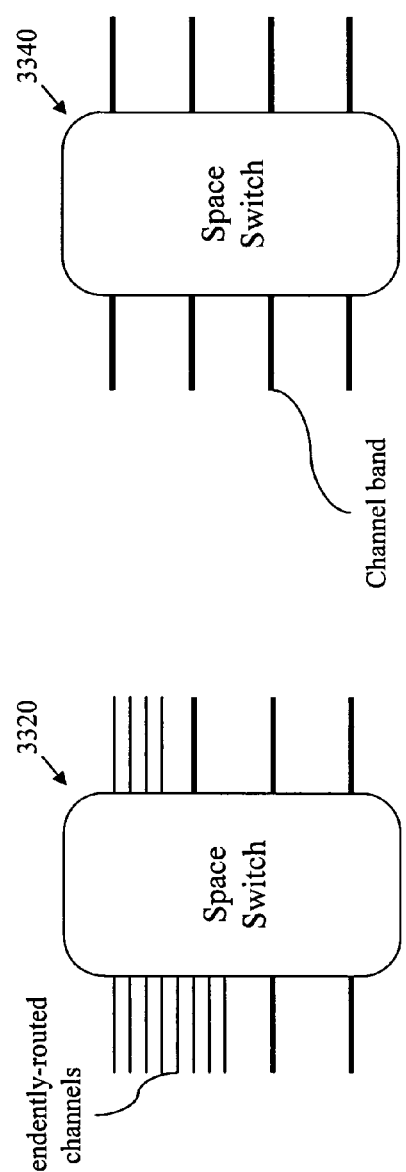
FIG. 33

TEMPORAL-SPATIAL BURST SWITCHING

CROSS REFERENCE TO RELATED APPLICATIONS

The present application claims the benefit of prior provisional application Ser. No. 60/510,334 filed Oct. 10, 2003.

FIELD OF THE INVENTION

The present invention relates to time-shared wide-coverage networks employing fast-switching optical nodes. In particular, the invention relates to burst switching in an optical-core network.

BACKGROUND

In a prior-art burst-switching scheme, a source node sends a burst transfer request to a core node to indicate that a burst of data follows the request. The request indicates the size of the accompanying burst and its destination. Responsive to this burst transfer request, the core node configures a space switch to connect a specific channel in a link on which the burst will be received to any channel in a link directed towards the requested burst destination. The burst follows the burst transfer request after a predetermined time period sufficient to configure the switch and it is expected that, when the burst arrives at the core node, the space switch would have been configured by the core-node controller to accommodate the burst. The core node may fail to schedule the transfer of the burst from input to output at the respective arrival time, and, if the core node does not include a buffer, the burst may be lost. Naturally, the probability of burst loss decreases with the number of channels per link and increases with the number of bufferless core nodes traversed. This switching method is hereinafter called "spatial switching".

An alternative burst switching method, hereinafter called "temporal switching", and a mechanism for burst transfer in a composite-star network having optical core nodes is described in Applicant's U.S. patent application Ser. No. 09/750,071, filed on Dec. 29, 2000, and titled "Burst Switching in a High-Capacity Network", the specification of which is incorporated herein by reference. According to the method, a burst-transfer request is sent to a controller of a selected core node after a burst has been formed at a source node. High network efficiency is realized by pipelining burst scheduling and burst-transfer. The transfer of bursts across the optical core nodes is loss-free.

To realize low-latency temporal switching, Applicant developed a technique according to which burst schedules may be initiated by any of a plurality of bufferless core nodes and distributed to respective edge nodes. A burst size is determined by a core node according to an allocated flow rate of a burst stream to which the burst belongs. The technique is described in applicant's U.S. patent application Ser. No. 10/054,512, filed on Nov. 13, 2001 and titled "Rate-Controlled Optical Burst Switching", the specification of which is incorporated herein by reference. Burst formation takes place at source nodes, according to information accompanying the burst schedules. An allocated flow rate of a burst stream may be modified according to observed usage of scheduled bursts of a burst stream. A method of control-burst exchange between each of a plurality of edge nodes and each of a plurality of bufferless core nodes enables time coordination, burst scheduling, and loss-free burst switching. Both the load bursts and control bursts are carried by optical channels connecting the edge nodes and the core nodes. The burst descriptors are generated by a master controller of an optical switch in a core node. The switching times of the bursts corresponding to the generated descriptors are scheduled, and the schedules are distributed to the respective edge nodes. The burst-descriptor generation is based on burst-stream flow-rate-allocation defined by the source nodes. A method and an apparatus for allocating an appropriate flow rate to a data stream is described in U.S. Pat. No. 6,580,721, issued to Beshai on Jun. 17, 2003 and titled "Routing and rate control in a universal transfer mode network, the specification of which is incorporated herein by reference.

The burst-switching methods of U.S. patent applications Ser. Nos. 09/750,071 and 10/054,512 require time-coordination where each path from a source edge node to a core node adjacent to a destination edge node is time locked. The network coverage, in terms of the number of edge nodes, is determined primarily by the dimensions of the core nodes.

Extending the network coverage to a global scale may be realized by using a cascade of channel switching and time-slot switching (channel switching establishes a connection from an input port to an output port of a switch and holds the connection for an extended period of time). Extending the network coverage may also be realized by partial use of random-access buffers at selected core channels, as described in Applicant's U.S. patent application titled "Hybrid fine-coarse carrier switching", filed on Nov. 8, 2002, and assigned Ser. No. 10/290,314, the specification of which is incorporated herein by reference. Such buffers may require optical-to-electrical conversion, electronic storage, and electrical to-optical conversion. The selected core channels are provided with buffers to enable temporal alignment of signals arriving at any core node from several other core nodes. A buffer may be provided at either end of a channel connecting two core nodes. Otherwise, all other ports of the core nodes may be bufferless. Providing such buffers enables the construction of a high-capacity wide-coverage network comprising a large number of core nodes shared by numerous edge nodes. Time-division-multiplexing and burst transfer can coexist in the network disclosed in the aforementioned U.S. patent application Ser. No. 10/290,314 and both are enabled by time-locking each edge node to an adjacent core node (or to a core node reached through channel switching) and by time-alignment at the random-access buffers.

Thus, as described above, extending the coverage of a network based on temporal switching may require an intermediate electronic-switching step either at an intermediate edge node or, preferably, at a random-access buffer placed at selected core channels. It may be desirable, however, to avoid electronic buffering, except at the source edge node and the destination edge node, and explore means for providing fast-switched paths in an entirely optical core in a wide-coverage network.

SUMMARY OF THE INVENTION

The present invention provides a method for extending the coverage of a time-shared fast-switching bufferless-core network using temporal switching in conjunction with spatial switching. The method significantly reduces the mean number of hops in a large-diameter core network by providing individually routed temporally-switched upstream channels from each edge node to numerous core switches. Signals are transferred from a core switch to another core switch or to a destination edge node through a process of spatial switching from an input channel to an output channel selected from a channel band during a specified time interval.

In accordance with one aspect, the present invention provides a method of switching a burst at a specific node in a network comprising a plurality of nodes. The method comprises steps of: receiving from a control channel invariant information of the burst; assigning as a candidate channel any available output channel from among a band of output channels connecting the specific node to a succeeding node according to the invariant information; sending to the succeeding node an identifier of the candidate channel; receiving from the control channel an identifier of an incoming channel assigned to carry the burst to the specific node; and scheduling an internal path from the incoming channel to the candidate channel if the identifier is a valid number. The invariant information includes a destination of the burst, duration of the burst, and a delay time after which the burst follows the invariant information.

In accordance with another aspect, the present invention provides a method of transmitting a signal originating from a first edge node to a second edge node in a network of edge nodes interconnected by bufferless core switches. The method comprises steps of: temporal switching of the signal in the first core switch; and spatial switching of the signal in the second core switch. The step of temporal switching includes steps of: allocating any time-interval during which a specific output channel of the first core switch is free; determining a transmission time of the signal from the first edge node so that the signal arrives at the first core switch at the start of the any time interval; and transmitting the signal at the determined transmission time. The step of spatial switching includes a step of allocating, from among a specific band of output channels of the second core switch, any output channel that is free during a specific time interval.

In accordance with a further aspect, the present invention provides a network comprising: a network core having a plurality of core switches interconnected by multiple-channel links; a plurality of shell switches each having a plurality of outward channels individually routed to selected core switches from among the plurality of core switches; and a plurality of edge nodes each edge node having at least one time-locked upstream channel to at least one of the shell switches and a downstream channel band from each of at least one core switch. Each of the core switches has at least one multiple-channel path to at least one of the edge nodes.

In accordance with another aspect, the present invention provides an asymmetrical edge node having outbound channels individually routed to selected core switches from among a plurality of core switches, and inbound channels arranged in channel bands each channel band emanating from a core switch from the plurality of core switches. The asymmetrical edge node is operable to: time lock each of the outbound channels to a corresponding core switch from among the selected core switches; receive bursts of a burst downstream over at least one inbound channel of the each channel band; and collate the bursts of the burst downstream according to a predetermined order.

In one mode of burst scheduling, the asymmetrical edge node is operable to: formulate burst-transfer requests, each burst-transfer request specifying a destination and a burst duration of a corresponding burst; send the each burst-transfer request over one of the outbound channels to a specific core switch from among the selected core switches; receive from the specific core switch an indication of a required transmission time for the corresponding burst; and transmit the corresponding burst at the required transmission time.

In an alternative mode of burst scheduling, the asymmetrical edge node is further operable to: formulate flow-rate-allocation requests, each flow-rate-allocation request specifying a destination and a required flow rate for a burst upstream; send the each flow-rate-allocation request over one of the outbound channels to a specific core switch from among the selected core switches; receive from the specific core switch burst-transfer permits for the burst upstream, each permit including an indication of a permissible size and a transmission time of an upstream burst; formulate an upstream burst within the permissible size; and transmit the upstream burst at the required transmission time.

In accordance with yet another aspect, the present invention provides a controller associated with a switching node, the switching node having input ports, output ports, and a switching fabric. The controller comprises: a temporal scheduler operable to allocate a path from a specific input port to a specific output port during any time interval of a specified duration; and a spatial scheduler operable to allocate a path from a specific input port to any output port from within a band of output ports during a specified time interval. The controller further includes a timing circuit for exchanging time locking signals with other controllers. The controller also includes a selector operable to arbitrate between the temporal scheduler and the spatial scheduler when the specific output port is within the band of output ports.

BRIEF DESCRIPTION OF THE DRAWINGS

Embodiments of the present invention will be further described with reference to the accompanying exemplary drawings, in which:

FIG. 1-B illustrates a space switch used for switching an input signal from an input channel to a specific output channel at an arbitrary instant of time;

FIG. 33 illustrates different ways of grouping input ports and output ports of a space switch to adapt the space switch for use in either a shell switch or a core switch, for use with an embodiment of the present invention;

DETAILED DESCRIPTION

Figure 1:
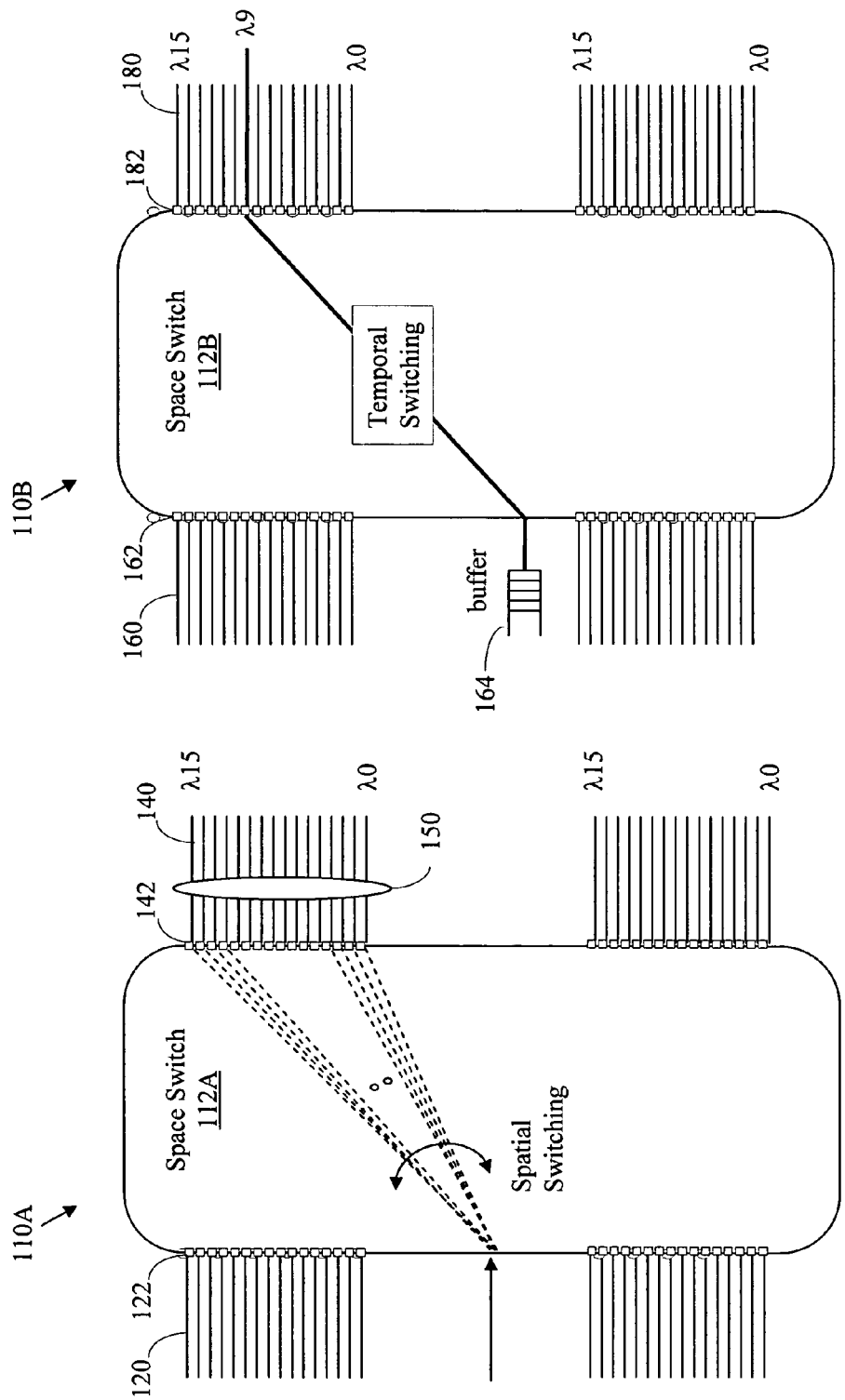
FIG. 1-A illustrates a space switch used for switching an input signal from an input channel to any channel in an output channel band at a specified instant of time.

The terminology used in describing the embodiments of the invention is listed below.

Edge node: A switching node having subtending (directly connected) information sources and sinks (also called subtending traffic sources and sinks) and connecting to other nodes is called an edge node.

Source node: An edge node transmitting signals, received from subtending traffic sources, to other nodes is called a source edge node, or a source node.

Sink node: An edge node receiving signals from other nodes, for delivery to subtending traffic sinks, is called a sink edge node, or a sink node.

Core switch: A switching node connecting only to other switching nodes, which may be edge nodes or core switches, is called a core switch. A core switch does not connect directly to traffic sources and sinks.

Shell switch: A core switch receiving signals directly from an edge node is called a shell switch.

Composite-star network: A network comprising a set of electronic edge nodes interconnected through independent core switches that are not interconnected is called a composite-star network. The composite-star network used in this disclosure has fast-switching optical switches.

Native edge node: Edge nodes of the same composite-star network are called native edge nodes.

Native shell switch: Shell switches of the same composite-star network are called native shell switches.

Network coverage: Network coverage is defined herein as the number of edge nodes in a network, regardless of the number of core nodes.

Time-shared network: A network employing fast switching in the core so that successive data blocks (such as bursts) in an inter-nodal channel may be destined to different nodes is a time-shared network.

Input port: A port of a switching node receiving information signals from either a subtending information source or from an external node is called an input port.

Output port: A port of a switching node transmitting information signals to either a subtending information sink or an external node is called an output port.

Outer port: In an edge-node, an input port receiving signals from a traffic source, or an output port transmitting signals to a traffic sink, is called an outer port.

Inner port: In an edge-node, an input port receiving signals from another switching node, or an output port transmitting signals to another switching node, is called an inner port (outer ports interface with access devices while inner ports interface with other switching nodes).

Ingress port: An input port of an edge node receiving information signals from subtending information sources (traffic sources) is referenced as an ingress port. An ingress port is an outer port.

Egress port: An output port of an edge node transmitting information signals to subtending information sinks (traffic sinks) is referenced as an egress port. An egress port is an outer port.

Inbound port: An input port of an edge node receiving information signals from external switching nodes is referenced as an inbound port. An inbound port is an inner port.

Outbound port: An output port of an edge node transmitting information signals to external switching nodes is referenced as an outbound port. An outbound port is an inner port.

Inbound channel: An inbound channel is a communication channel, usually a wavelength channel in a fiber-optic link, connecting an external node to an inbound port of an edge node.

Outbound channel: An outbound channel is a communication channel, usually a wavelength channel in a fiber-optic link, connecting an outbound port of an edge node to an external node.

Inlet port: An input port, of a shell switch or a core switch, receiving an outbound channel of an edge node, is herein called an inlet port.

Outlet port: An output port, of a shell switch or a core switch, connecting to an inbound channel of an edge node, is herein called an outlet port.

Inward port: An input port, of a shell switch or a core switch, receiving a wavelength channel from another core switch, is called an inward port.

Outward port: An output port, of a shell switch or a core switch, having a wavelength channel to another shell switch or core switch, is called an outward port.

Inward and outward channels: A channel connecting a first core switch (or shell switch) to a second core switch (or shell switch) is an inward channel with respect to the second core switch (or shell switch) and an outward channel with respect to the first core switch (or shell switch).

Upstream: The adjective 'upstream' refers to a flow in the direction from an edge node to a shell switch or core switch.

Downstream: The adjective 'downstream' refers to a flow in the direction from a shell switch or a core switch to an edge node.

Link: A channel band within a fiber transmission line forms a link. A fiber transmission line may include two or more channel bands, i.e., two or more links, which may be demultiplexed at a wavelength router and directed to different destinations.

Uplink: An uplink is a communication link, usually a multiple-channel link, from an edge node to a shell switch or a core switch.

Downlink: A downlink is a communication link, usually a multiple-channel link, from a shell switch or a core switch to an edge node.

Up-channel: An up-channel is a channel, usually a wavelength channel, within an uplink.

Down-channel: A down-channel is a channel, usually a wavelength channel, within a downlink.

Core link: A core link is a link connecting two core switches. A core link is preferably a wavelength-division-multiplexed (WDM) fiber link.

Core channel: A channel in a core link is a core channel.

Adjacency (degree): The adjacency of a specific switching node is the number of switching nodes to which the specific switching node connects through at least one channel. This is often called the 'degree' of the switching node.

Hop: A direct connection from one switching node to another is called a hop. A route from one edge node to another edge node may include several hops. The number of hops in a route is the number of switching nodes traversed by the route minus one (i.e., the number of intermediate switching nodes plus one).

Topological length of a route: The number of hops along a route from one edge node to another is herein called the topological length of the route.

Network diameter: The topological length of a route from a source edge node to a sink edge node in a switched network may be used as an indication of "network diameter". The network diameter may be the largest topological length of a route, or may be chosen to be a traffic-weighted topological length for all designated routes.

Sparse connectivity: A switched network where the network diameter is large (8 for example) is considered a sparsely connected network. A ring network having a large number of nodes (16 or more, for example) is a sparsely connected network. A full mesh of switching nodes forms a densely connected network. A partially-meshed network lies between these two extremes.

Node dimension: The dimension of a switching node is determined by both the number of input ports and the number of output ports where each input port connects to an input channel and each output port connects to an output channel. A switching node having 256 input ports and 320 output ports, for example, is said to be of dimension 256× 320.

Data packet: It is a conventional data block of arbitrary size and having an identifying header.

Data burst: A data burst may be an aggregation of data packets having a burst header in addition to the individual packet headers; a data burst may contain only one packet of a large size, in which case only the burst header is required. According to an embodiment of the present invention, a data burst may have a split header the parts of which may be communicated during noncontiguous time intervals.

Time-limited signal: A signal occupying a channel during a relatively short period of time, 16 microseconds for example, is called a time-limited signal. Successive time-limited signals carried by a channel may be directed to different destinations. Packets and bursts are examples of time-limited signals.

Load burst: A data burst formed at an edge node is a load burst, herein also referenced as a 'burst' for brevity. When the data burst modulates an optical carrier of a given central wavelength, the corresponding portion of the modulated carrier is also called a load burst (or simply a burst). In other words, the term burst refers to a baseband time-limited signal or a time-slice of a carrier wave modulated by the baseband signal.

Data stream: A stream of signals originating from a first edge node and destined to a second edge node is called a data stream. Signals of a data stream are normally assigned the same route towards the second edge node.

Packet stream: A packet stream is a data stream where the data units are data packets; generally of variable and arbitrary sizes.

Burst stream: A burst stream is a data stream in which data units are aggregated into data bursts. Where distinction is not required, the terms data stream, packet stream, and burst stream may be used interchangeably.

Traffic signal: A signal containing information generated by a source to be sent to a sink is a traffic signal. A traffic signal may have a fixed size or a variable size.

Control signal: A signal containing control information generated by a switching node in a network is called a control signal.

Flow rate: The mean rate, usually expressed in bits per second, of a data stream of any data format is the flow rate of the data stream.

Time counter: A time counter is a device that measures time. A digital watch is a time counter. The time counter used hereinafter is a conventional clock-driven cyclical counter having a specified wordlength (32 bits, for example).

Time Locking: It is a technique for time coordination using time-counters to enable time alignment of signals received at connecting nodes. A first node is time-locked to a second node if a signal transmitted at an instant of time indicated by a time counter at the first node arrives at the second node at the same instant of time as indicated by an identical time counter at the second node. When a first node is time-locked to a second node along a given path, the given path is said to be time-locked. The path may include multiple wavelength channels in which case, due to dispersion, each of the channels may be time locked separately.

Time reference: A first time counter provides a time reference to several other time counters if each of the other time counters is time-locked to the first time counter. Hereinafter, a reading of a time counter collocated with a bufferless switch (such as an optical switch) may serve as a time reference for several time counters associated with electronic edge nodes.

Temporal degree of freedom: The ability to select an arbitrary interval in the time domain to transfer a signal is a temporal degree of freedom.

Spatial degree of freedom: The ability to select an arbitrary channel within a channel band to transfer a signal is a spatial degree of freedom.

Temporal switching: A process of finding a time interval during which a specific input channel and a specific output channel are free and subsequently connecting the specific input channel to the specific output channel during the sought time interval is called "temporal switching". The name reflects the fact that the only degree of freedom is the time-domain search. Temporal switching may be characterized as coherent switching.

Spatial switching: A process of finding an output channel, within a bundle of output channels, during which a specific input channel and the sought output channel are free during a specified interval of time, and subsequently connecting the specific input channel to the sought output channel during the specified time interval is called "spatial switching". The name reflects the fact that the only degree of freedom is the output-channel search.

Spectral switching: Spatial switching from an input port of an optical switch to any wavelength channel in an output WDM link is also called spectral switching. Spectral switching is a form of spatial switching.

Channel switching: Channel switching establishes a connection from an input port to an output port of a switch and holds the connection for an extended period of time.

Burst switching: Burst switching establishes a connection from an input port to an output port of a switch and holds the connection for a predetermined duration of the burst.

Single-channel data stream: A data stream transmitted along a path from a first edge node to a second edge node where successive data units (bursts for example) of the data stream are confined to a designated single channel along each hop between successive nodes along the path is called a single-channel data stream. The single channel may be centered on different wavelengths in different hops. Temporally-switched bursts form a single-channel data stream.

Multiple-channel data stream: A data stream transmitted along a path from a first edge node to a second edge node where successive data units (bursts for example) of the data stream may occupy different channels in any hop between successive nodes along the path is called a multi-channel data stream. Spatially-switched bursts may form a multiple-channel data stream.

Wavelength router: A wavelength router is an optical device, well-known in the art, which has a set of wavelength-division multiplexed (WDM) input links and a set of WDM output links, and which connects wavelength channels received at an input link to corresponding output links. The connection pattern is static; typically based on a spatial cyclic mapping of input wavelengths to output port numbers.

Spatial Versus Temporal Switching

FIG. 1-A illustrates a connection established according to a spatial switching process in a space switch 110A having input ports 122 connecting to output ports 142 through a bufferless time-shared fabric 112A. Each input port 122 may receive input signals from an input channel 120 and each output port may transmit output signals over an output channel 140 connecting to an output port 142. The output channels 140 are routed in channel bands 150 where all the channels of each channel band are directed to a subsequent switching node. The input signals are switched instantly because of the absence of input buffers in space switch 110A. As defined earlier, a process of establishing a connection from an input port 122 to any output port 142 in a specific group of output ports during a specified time interval is spatial switching process. A signal arriving at an input port 122 is either switched immediately to an appropriate output port 142 or discarded. The signal cannot be queued because the input port 122 does not have a signal buffer. The appropriate output port is determined by a spatial scheduler (not illustrated in FIG. 1-A).

FIG. 1-B illustrates a connection established according to a temporal-switching process in a space switch 110B comprising input ports 162, a switch fabric 112B, and output ports 182. Each input port 162 is provided with an input buffer 164 (only one is illustrated) and may receive input signals from an input channel 160. Each output port 182 may transmit output signals over an output channel 180. The output channels 180 may be routed individually to different adjacent nodes. As defined above, a process of establishing a connection from a specific input port 162 to a specific output port 182 during any selectable time interval is a temporal switching process (coherent switching process). An input signal arriving at an input port 162 may wait in a buffer 164 until a pre-selected output port 182 becomes free. The instant of time at which the input signal is switched is determined by a temporal scheduler (not illustrated in FIG. 1-B). FIG. 1-B illustrates a connection to an output port 182 connecting to an output wavelength channel of central wavelength $\lambda_9$.

Figure 2:
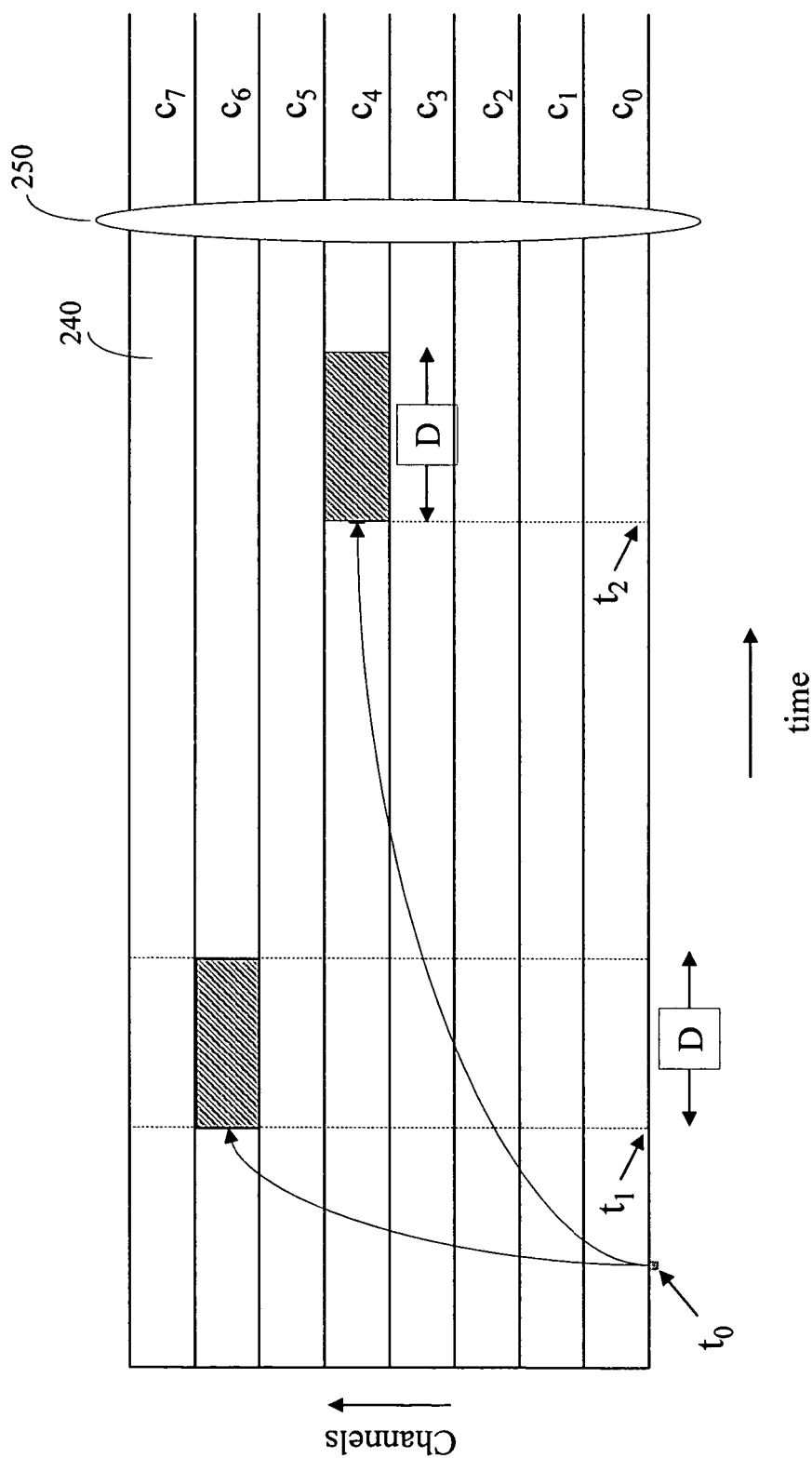
FIG. 2 illustrates spatial and temporal switching, for use with an embodiment of the present invention.

FIG. 2 illustrates the basic processes of spatial and temporal switching. The figure illustrates an output-channel band 250 comprising eight channels 240. In a spatial-switching process, the eight channels 240, labeled $C_0$ to $C_7$, are routed together to a subsequent switching node, and a burst routed to the subsequent switching node, which may be an intermediate switching node or the destination edge node, may be switched to any of the eight output channels 240. In a temporal-switching process, the eight channels 240 may, however, be routed individually towards up to eight adjacent nodes. Individual-channel routing may be realized using channel routers as will be described with reference to FIGS. 34 and 35. If the eight channels 240 are routed individually to adjacent nodes, then an input burst would be switched to a particular output channel leading to a specific destination.

As indicated in FIG. 2, a request to transmit a forthcoming burst to a specific destination is received at an input port of a switching node at time $t_0$. The request indicates a duration, D, of the forthcoming burst. Additionally, if the receiving input port is bufferless, the request specifies an instant of time $t_1$ at which the forthcoming burst associated with the request is to arrive at the switching node. A spatial scheduler associated with the switching node examines the occupancy states of the eight channels 240, determines that channel $c_6$, for example, is free during the time interval $\{t_1, t_1+D\}$ and allocates channel $C_6$ for this time interval. If the switching node has input buffers and if the specific destination is reached through a particular output channel (channel $C_4$ in this example) a temporal scheduler associated with the switching node attempts to allocate an interval of time during which the particular output channel is free. In this example, the temporal scheduler allocates channel $c_4$ for the period $\{t_2, t_2+D\}$.

The probability of finding a specific output port to be in a busy state at the instant of a new burst arrival (instant $t_1$ in FIG. 2) may be quite high even at a moderate occupancy. For example, if the mean occupancy of an output port is only 0.5 and under the assumption that the arrival process is independent of (uncorrelated to) the state of any of the output channels, then the probability that the new burst finds a specific channel occupied with (or reserved for) a prior burst, i.e., the probability of rejecting the new burst, is approximately 0.5. Such a high rejection probability cannot be tolerated. The incoming burst, however, may experience a very low probability of rejection, under low occupancy, if it can select any channel from a channel band having a sufficiently large number of channels connecting a current node to a subsequent node towards destination. For example, if a current node has a 32-channel link to a subsequent node, the probability that all the 32 channels are busy, when the mean occupancy is 0.5, is negligibly small. Under pure-randomness conditions, this probability would be of the order of $10^{-5}$. As illustrated in FIG. 1-A, a burst arriving at an un-buffered input port may select one of many candidate output ports 142 each connecting to a wavelength channel 140.

Figure 3:
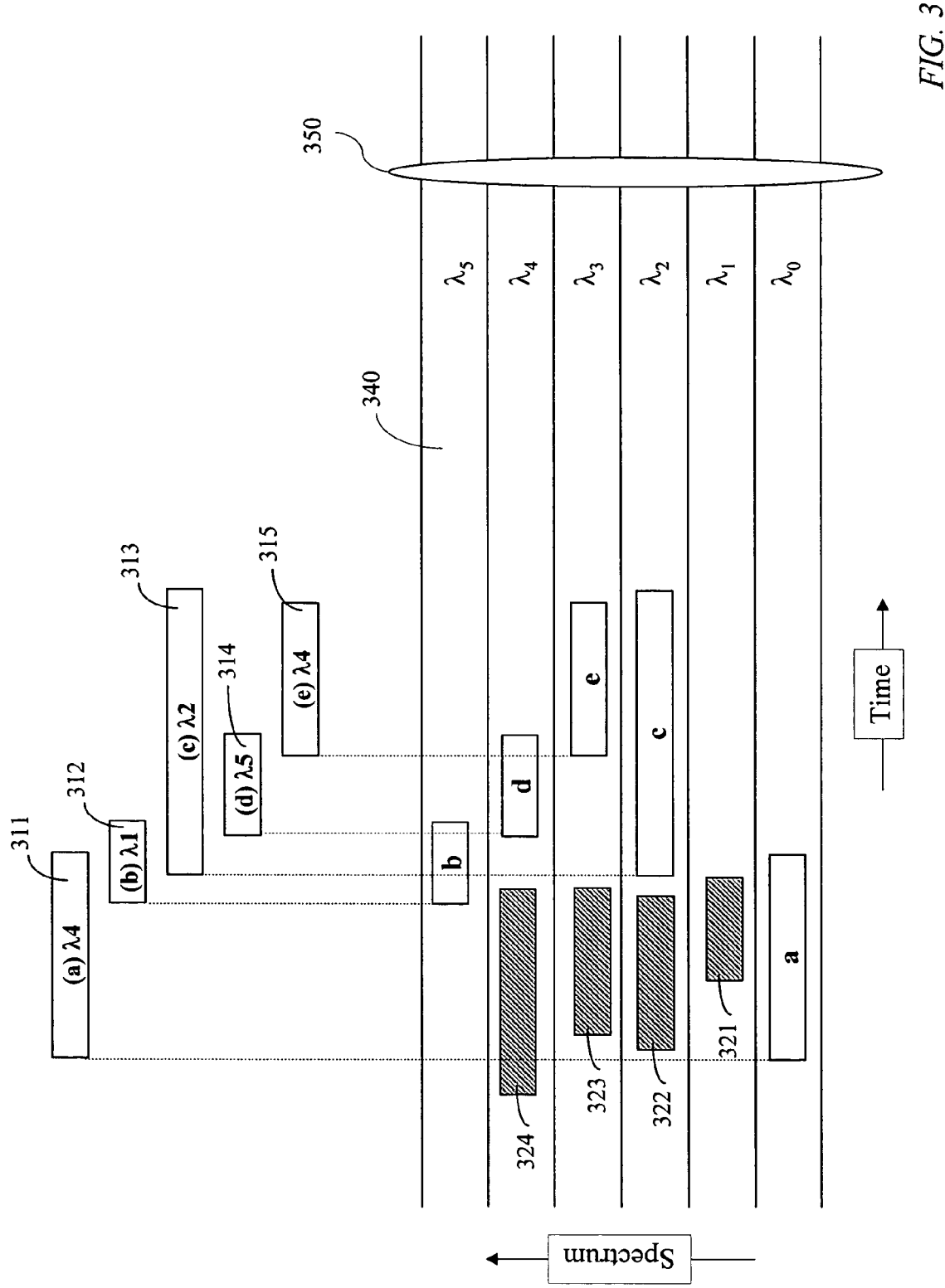
FIG. 3 illustrates spatial switching processes in a bufferless switch for a number of incoming signals, for use with an embodiment of the present invention.

FIG. 3 illustrates spatial switching to an output channel band 350 having six wavelength channels 340 occupying wavelength bands centered on wavelengths $\lambda_0, \lambda_1, \lambda_2, \lambda_3, \lambda_4$, and $\lambda_5$. The wavelength channels 340 are labeled $\lambda_0, \lambda_1, \lambda_2, \lambda_3, \lambda_4$, and $\lambda_5$. Five time-limited signals (bursts) of arbitrary durations and labeled a, b, c, d, and e (referenced as 311, 312, 313, 314, and 315, respectively) arrive at input ports on wavelength channels having central wavelengths of $\lambda_4, \lambda_1, \lambda_2, \lambda_5$, and $\lambda_4$, respectively. The signals are received during overlapping time intervals at respective input ports 122 of the bufferless switch 110-A of FIG. 1-A. The signals are switched to output channels 340 of an output channel band 350 leading to a subsequent node determined according to a route-selection process. FIG. 3 illustrates time intervals 321, 322, 323, and 324, in wavelength channels centered on wavelengths $\lambda_1, \lambda_2, \lambda_3$, and $\lambda_4$, which were reserved for previous bursts. Burst 'a' (311) of duration $D_a$ is expected to arrive at time $t_a$ over a channel of wavelength $\lambda_4$ and only output channels of wavelengths $\lambda_0$ and $\lambda_5$ were determined to be available during the interval $\{t_a, t_a+D_a\}$. In the illustrated example, the switch scheduler arbitrarily selected the output channel of wavelength $\lambda_0$. A spectral translation process shifts the input channel band centered around $\lambda_4$ to a channel band centered around $\lambda_0$. Burst 'b' (312) is received over wavelength $\lambda_1$ but had to be shifted to another wavelength $\lambda_5$ because the $\lambda_1$ output channel was reserved for burst 321 at the instant of arrival of burst 'b'. Burst 'c' (313) is switched without spectral translation because wavelength channel $\lambda_2$ is determined to be free, burst 'd' (314), arriving over a $\lambda_5$-input-channel is switched to a $\lambda_4$-output-channel, and burst 'e' (315), arriving over a $\lambda_4$-input-channel is switched to a $\lambda_3$-output channel. Thus, in this example, bursts a, b, d, and e had to undergo spectral translations.

Figure 4:
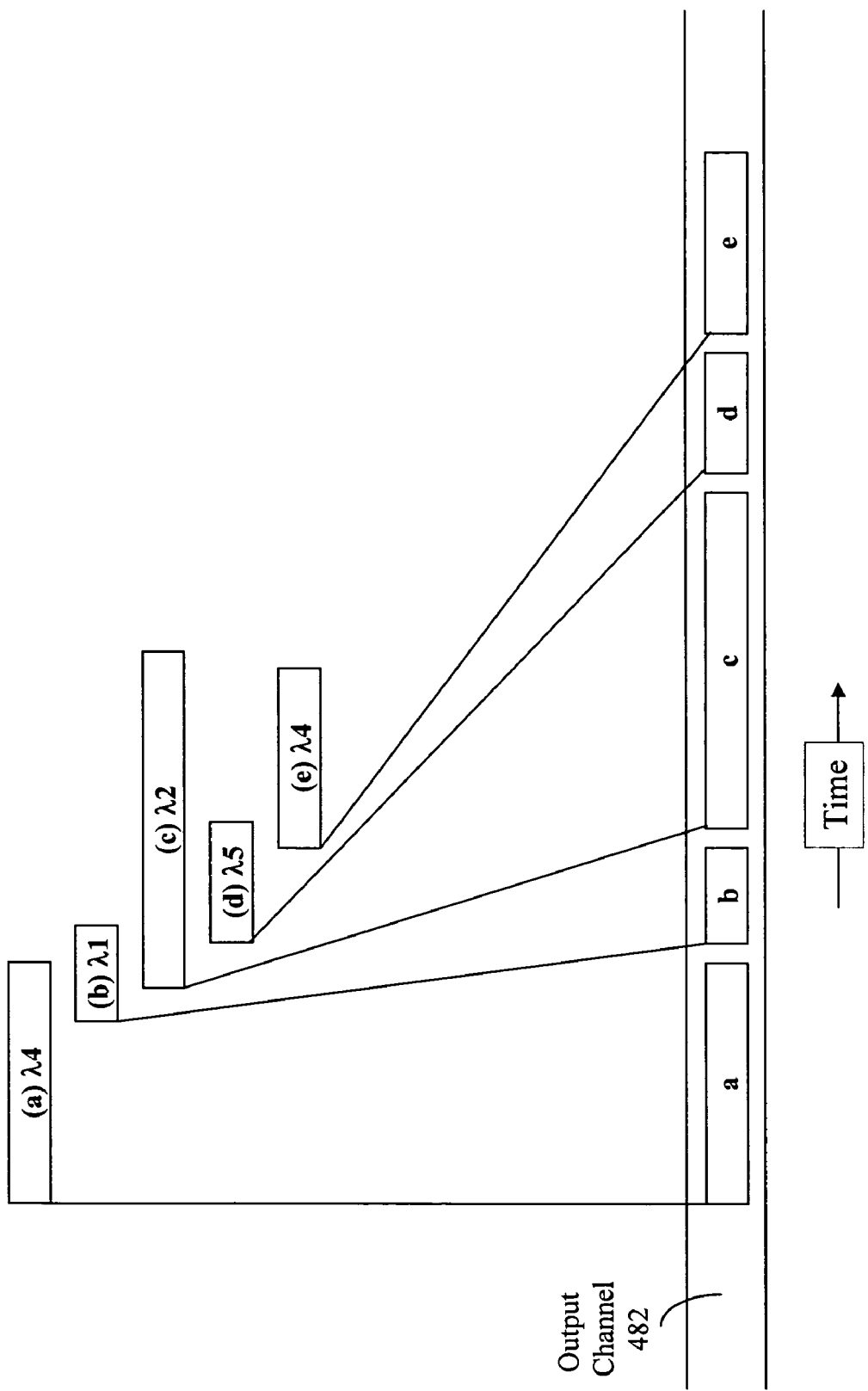
FIG. 4 illustrates temporal switching processes in a switch having input buffers, for use with an embodiment of the present invention.

FIG. 4 further illustrates temporal switching where the same signals labeled 'a' to 'e' of FIG. 3 are received during overlapping time intervals at respective input ports 162 of the bufferless switch 110-B of FIG. 1-B and are switched to a specific output channel 482 (corresponding to one of output channels 182 of FIG. 1-B) leading to a subsequent node determined according to a route-selection process. The signals are appropriately delayed at input buffers of respective input ports 162 to enable conflict-free switching to the specific output channel 482.

Figure 5:
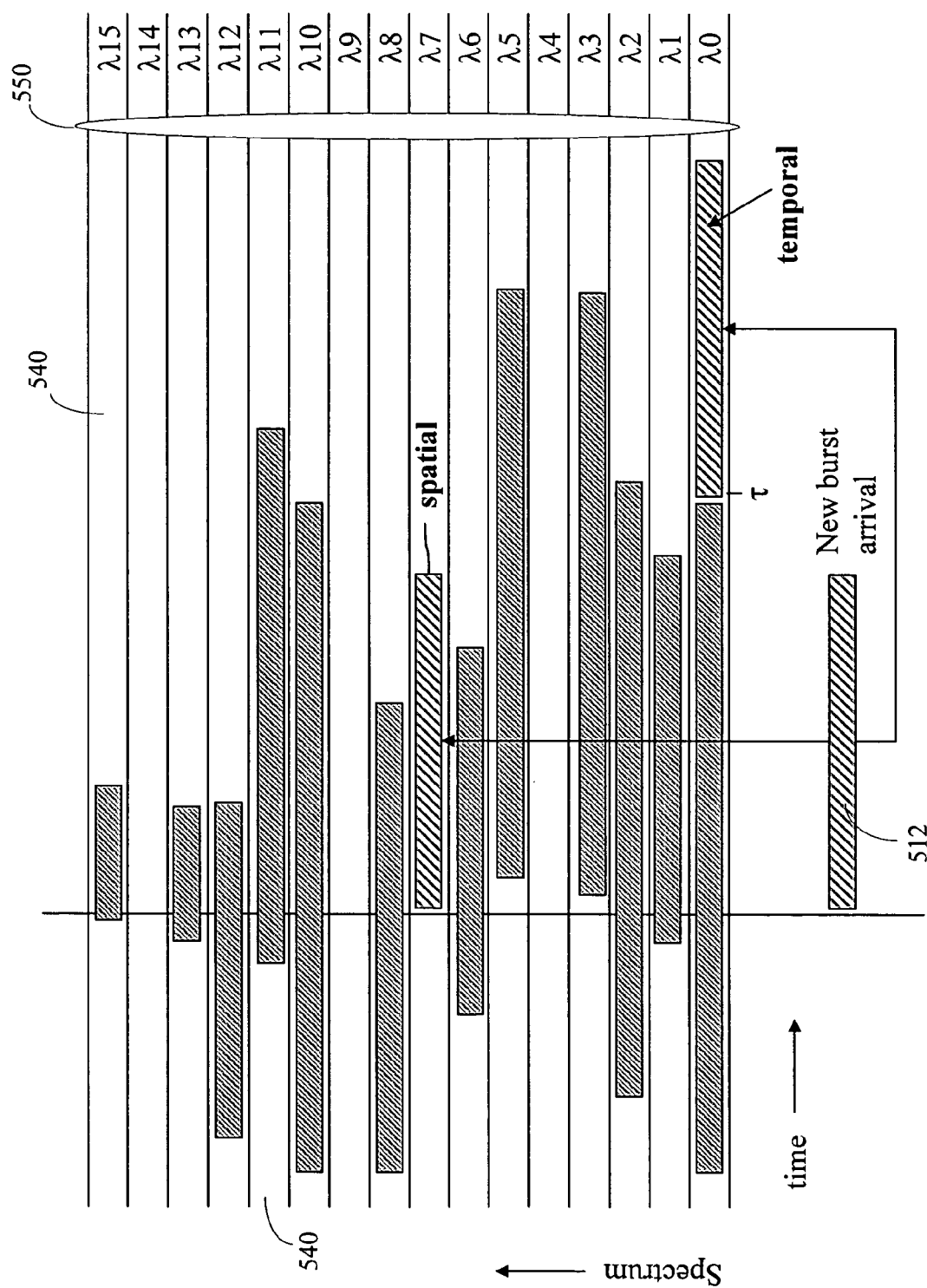
FIG. 5 further illustrates spatial and temporal switching of a time-limited signal, for use with an embodiment of the present invention.

FIG. 5 further illustrates spatial and temporal switching. A new burst 512 arriving over an input channel may be scheduled to be switched to a specific output channel 540 (of wavelength $\lambda_0$ in this example) after an appropriate waiting period, or may be switched instantly to any one of free output channels 540 in a channel band 550 having sixteen wavelength channels occupying spectral bands centered around wavelengths $\lambda_0$ to $\lambda_{15}$. A temporal scheduler selected an interval starting at time $\tau$ in a specified output channel 540 centered on wavelength $\lambda_0$. A spatial scheduler determined, in this example, that channels having central wavelengths $\lambda_4$, $\lambda_7, \lambda_9$, and $\lambda_{14}$ are free and the channel of central wavelength $\lambda_7$ is selected. Control signals and load signals may be interleaved in a single channel when temporal switching is used as described in Applicant's U.S. patent application Ser. No. 10/054,509, filed on Nov. 13, 2001 and titled "Time-Coordination in a Burst-Switching Network", the specification of which is incorporated herein by reference. With spatial switching, a selected channel, herein called a control channel, in a channel band connecting two nodes may be dedicated to carry control signals.

Although the example of FIG. 5 illustrates instantaneous spatial switching, deferred switching for a fixed period of time called 'offset time' (the period $\{t_1-t_0\}$ in FIG. 2) would be needed to allow a spatial scheduler sufficient time to allocate a free output channel 540. Deferred spatial switching with a constant delay for each burst yields the same overall blocking probability as instantaneous spatial switching. However, the blocking probability for different burst streams may differ if a burst is given a stream-dependent offset time.

Network Diameter Versus Nodal Degree

Figure 6:
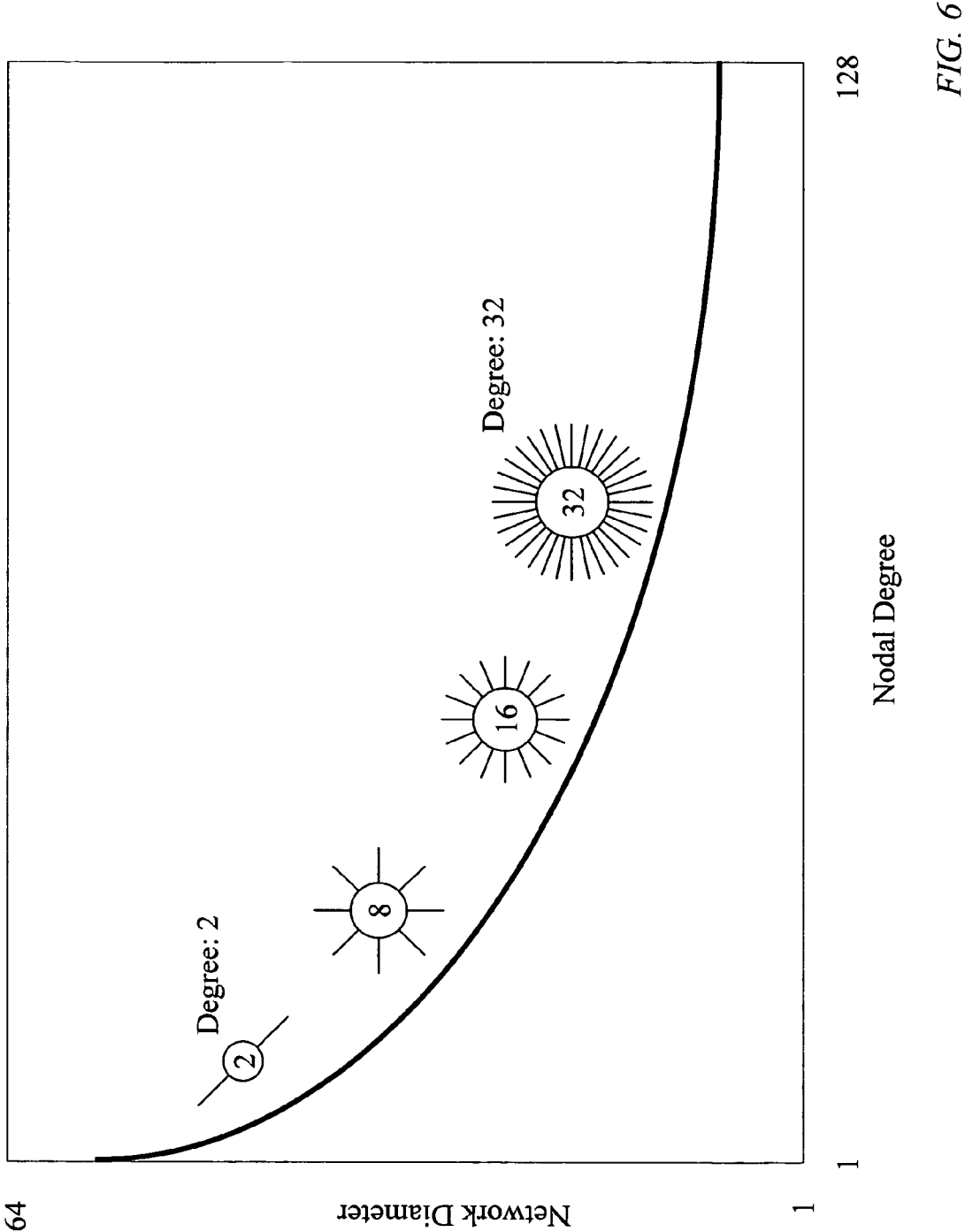
FIG. 6 illustrates a known dependence on network diameter on nodal degree.

FIG. 6 illustrates a known relationship between network diameter and nodal degree in a hypothetical network. The network diameter is an indication of the number of intermediate nodes traversed by a path from a source edge node to a sink edge node. A nodal degree (also called node adjacency) of a specific node is an indication of a number of other switching nodes to which the specific node directly connects. As the nodal degree increases, between one and 128 in this example, the network diameter decreases rapidly. An increase in network diameter increases network complexity and worsens network performance. A network diameter may be defined in terms of a traffic weighted mean number of hops per route for selected routes. The minimum value of a network diameter is one, which corresponds to a hypothetical fully meshed network providing a direct route of sufficient capacity for each pair of originating and terminating nodes.

The relationship between nodal degree and network diameter may be illustrated using a canonical network structure. Consider, for example, a network core having a classical multi-stage structure which has a predetermined number of hops for each input-output pair. Using core switches each having n links, a v-stage network, where v is an odd number, would have a number of input links equal to $n^{(v+1)/2}$, with an equal number of output links. With n=4, a network of relatively small coverage, having 4096 input links (and 4096 output links), requires an 11-stage structure (v=11). A medium-capacity medium-coverage network having 65536 input links (and 65536 output links) requires a 15-stage structure. It is well known in the art that the efficiency of a network decreases with increasing the number of switching stages along each of the end-to-end paths. It is, therefore, an objective of the present invention to devise means for reducing the number of hops while allowing high network coverage despite the limitation of nodal-degree.

Figure 7:
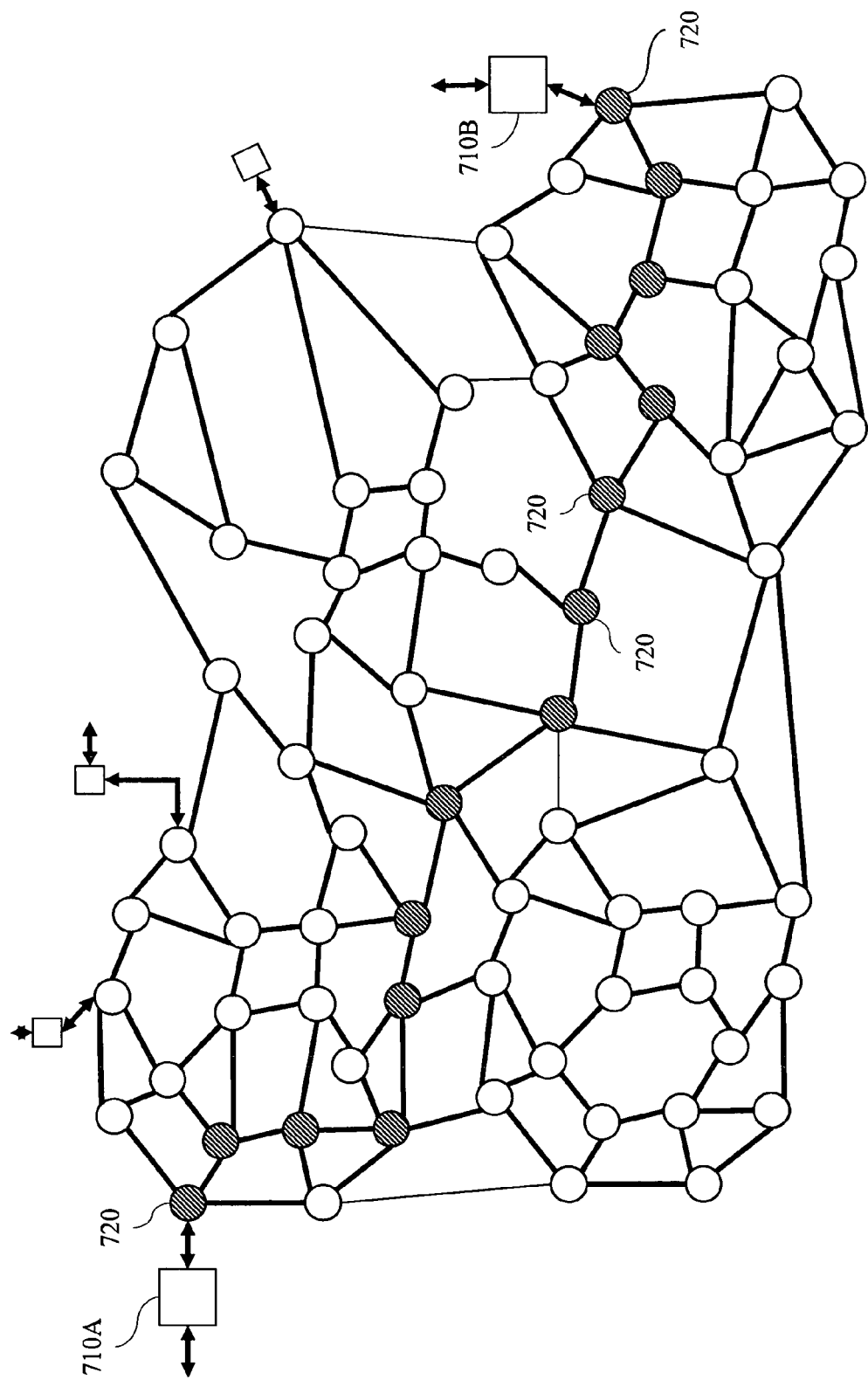
FIG. 7 illustrates a path in a network of large diameter.

FIG. 7 illustrates a network with large diameter. The network has numerous switching nodes each having a small degree, i.e., is adjacent to a small number of other nodes. A path from a source edge node 710A to a sink edge node 710B traverses 15 intermediate nodes 720.

Time-Shared Spatially Switched Optical-Core Network

A time-shared network may comprise electronic edge nodes interconnected by a bufferless network core having interconnected fast-switching optical nodes. A path from a source edge node to destination edge node may traverse more than one optical node. Due to the absence of random-access buffers in an optical node, a signal received at each optical node along the path is switched instantly to either an output port connecting to a subsequent optical node along the path, or the destination edge node. Signals arriving at the input ports of an optical node and originating from several edge nodes, are not necessarily time coordinated, and two or more signals of different originating edge nodes may follow a common path from the optical node to a common destination. This may lead to output-port contention, at each node along the common path, which cannot be resolved due to the lack of buffers. To reduce the incidence of signal loss due to contention, each link in the network should have a sufficient number of channels to render the probability that all channels of a link being busy simultaneously negligibly small at the expected traffic load. Each optical node, therefore, should have a large number of dual ports (a dual port comprises an input port and an output port), where each dual port supports an incoming channel and an outgoing channel. For example, under the optimistic assumption of purely random traffic, a link having 64 channels would experience a blocking of 0.0001 when its mean occupancy is approximately 0.6. In order to reduce the mean number of hops from source to destination, the nodal degree, i.e., the number of adjacent nodes, should be sufficiently high. In a large scale network having several thousand edge nodes, the nodal degree is preferably of the order of 16 or so. With a requirement of 64 channels per link, the dimension of an optical node would be 1024×1024.

The number of links of a core switch is limited by the dimension of the node and the need to provide a sufficiently large number of channels per link to yield a low probability of signal loss given the absence of buffers at the core switches. The dimension of a fast-switching (low-latency) optical switch may be quite limited and each optical core node would have a small number of links connecting to edge nodes and to other core switches.

Figure 8:
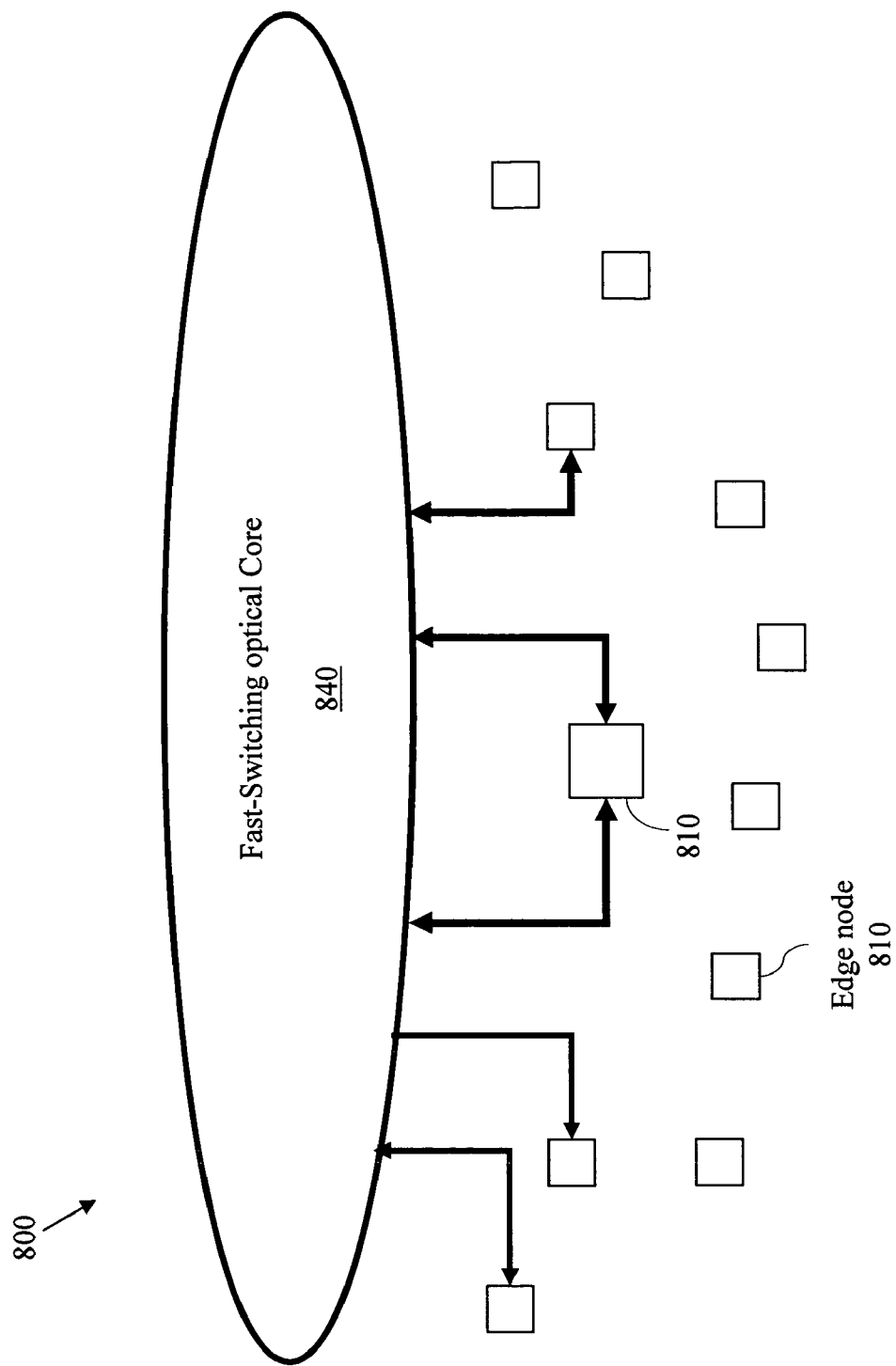
FIG. 8 illustrates a network using prior-art spatial switching in a time-shared optical core.

FIG. 8 illustrates a network 800 having a fast-switching optical core 840 where edge nodes connect to the core through multi-channel links and the core is adapted to handle uncoordinated signal arrivals. Spatial burst switching in such a network has been extensively studied in several publications.

Figure 9:
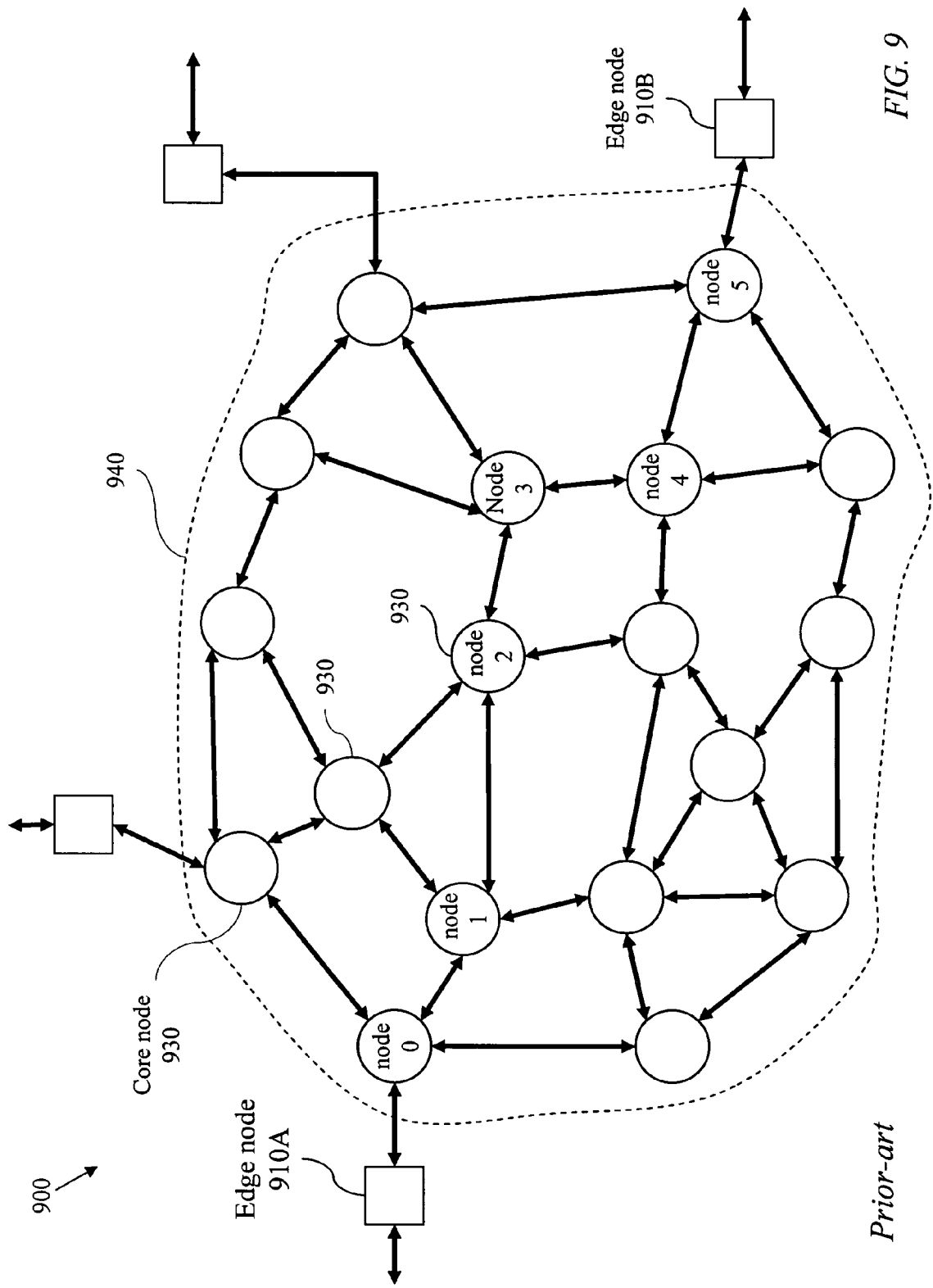
FIG. 9 illustrates a structure of the optical core of the network of FIG. 8.

FIG. 9 illustrates a network 900 where the optical core 840 of FIG. 8 is implemented as a partial-mesh 940 interconnecting a plurality of optical core switches 930. The channels of each core switch 930 are divided into channel bands each band having a sufficiently large number of channels in order to facilitate spatial switching. Several routes may be found to connect an edge node 910A to an edge-node 910B. The number of channels of an optical core switch may be quite limited, thus leading to a small number of channel bands per core switch 930. This, in turn, results in a network of large 'diameter', as described earlier with reference to FIG. 7, where the mean number of hops for core-switch pairs may be significantly large.

Figure 10:
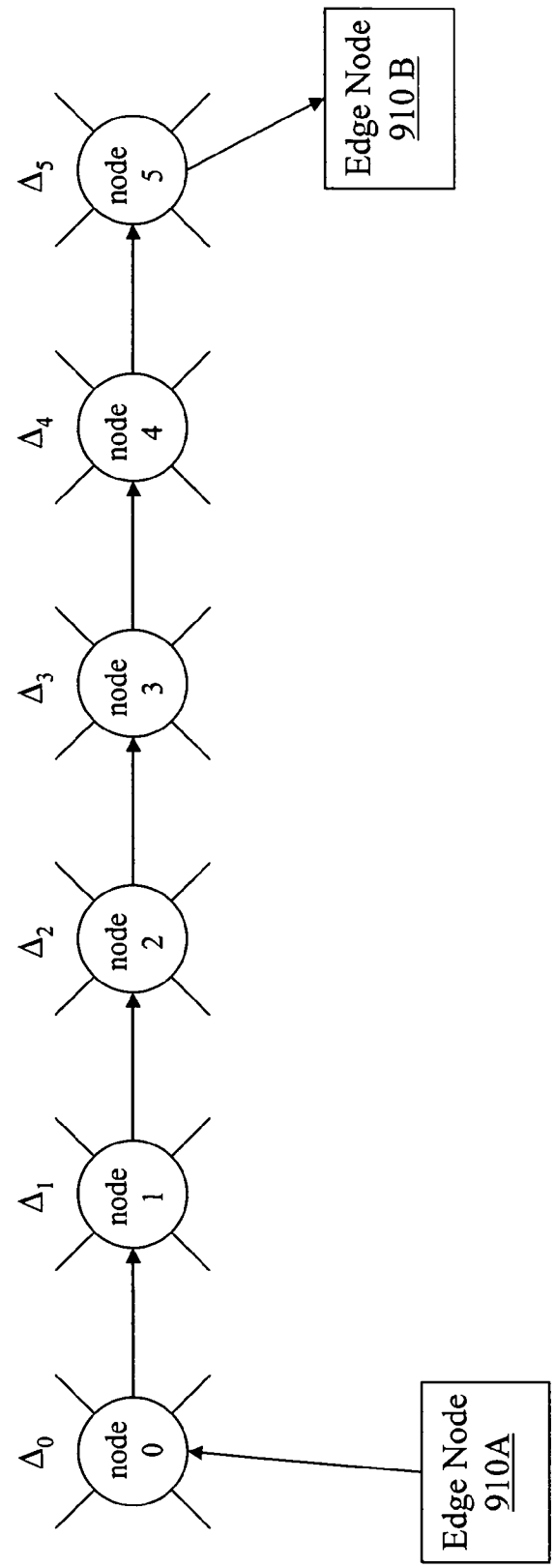
FIG. 10 illustrates a path traversing six successive optical nodes in the optical-core network of FIG. 9 indicating the delay experienced by a control signal at a controller of each node.

FIG. 10 illustrates a path from a first edge-node 910A to a second edge node 910B in optical-core network 900. The path traverses six core switches. Core switch j, $0 \leq j < 6$, has a processing latency of $\Delta_j$. A burst 'offset time' at a core switch j, defined as the time difference between the arrival of a control signal and the arrival of an associated burst, should at least equal processing latency $\Delta_j$.

Spatial Switching with 'Offset Time'

When a time-limited signal (a burst) arrives at an input channel of an optical core switch, a controller of the optical core switch identifies a free channel in an outgoing multi-channel link along a selected route leading to a specified signal destination. Failing to find a free channel, the signal would be discarded due to the absence of storage capability at the optical core switch. To account for processing delay at the controller, a time-limited signal may be preceded by a header containing specifics of the signal. The header may be sent ahead of the signal itself by an interval of time, often called an "offset time interval" as mentioned earlier, to allow the controller a sufficient time to select a channel in an appropriate outgoing link. In order to permit reasonable link utilization (occupancy), given a specified signal-loss-probability tolerance, the number of channels per link should be sufficiently high; 64 for example. With a 256×256 optical node, the number of input links would be four and the number of output links would be four. This limits the adjacency of the core switch to four, i.e., the core switch may directly connect to at most four other switching nodes. A core switch may connect to edge nodes and other core switches or it may connect exclusively to other core switches. With a network having several-thousand edge nodes, a path between two edge nodes may have to traverse several core switches, thus resulting in low network efficiency in addition to low performance. The signal-loss probability naturally increases with the increase of the number of traversed core switches.

The offset time interval associated with a burst in a spatial-burst-switching network is selected at the electronic edge node that originates the burst. The value of the offset time may decrease as the burst and its header traverse bufferless switching nodes along the path to destination. The burst itself propagates along the path as a modulated optical carrier and experiences only propagation delay, with no processing delay at any intermediate switch. However, the burst may undergo spectral translation at any of the optical nodes it traverses. The header undergoes optical-to-electrical conversion at an optical core switch and is processed electronically to determine a destination and other attributes of the burst. The header may be modified, at least to indicate to a subsequent optical core switch, along the path to destination, the wavelength channel on which the current node has sent the burst. The header is then retransmitted, after electronic-to-optical conversion, to the subsequent switch. The offset time is then reduced by the value of the electronic processing time at the current switch. In an alternative control scheme, according to an embodiment of the present invention, the optical control signals, containing burst headers, received over the control wavelength channel are split at each optical switch along the path. The headers are retransmitted without delay to a subsequent switch, if any, and a copy of each of the optical control signals is directed to the controller of the optical switch for processing.

Header Content in a Spatially-Switched Burst

In a network employing spatial switching, a burst header is transmitted over a dedicated control channel within a multi-channel link while the burst itself (the load burst) may be transmitted over any channel in the multi-channel link. A burst header contains invariant information about the burst duration, its destination, and other attributes that do not change as the burst traverses intermediate switching nodes en route. The invariant information is also referenced herein as 'state-independent information' because the information remains unchanged as the burst traverses the intermediate switching nodes regardless of the allocated output channel at each intermediate switching nodes. A burst header also contains essential hop-dependent (hence variable) information, mainly an identifier of a channel in the multi-channel link over which the burst is transmitted by an immediately preceding switching node and the time-lag between the header and the forthcoming burst. As will be described below, the invariant information and the hop-dependent variable information of a header may be communicated independently and during different time intervals.

Header Processing in Spatial Switching

The propagation of a header along the path of FIG. 10 is illustrated for two header-management schemes. Edge node 910A transmits the header $\tau_1$ seconds ahead of the load signal, i.e., the 'burst offset interval' mentioned earlier is $\tau_1$ seconds at a first intermediate switching node (node-0).

Figure 11:
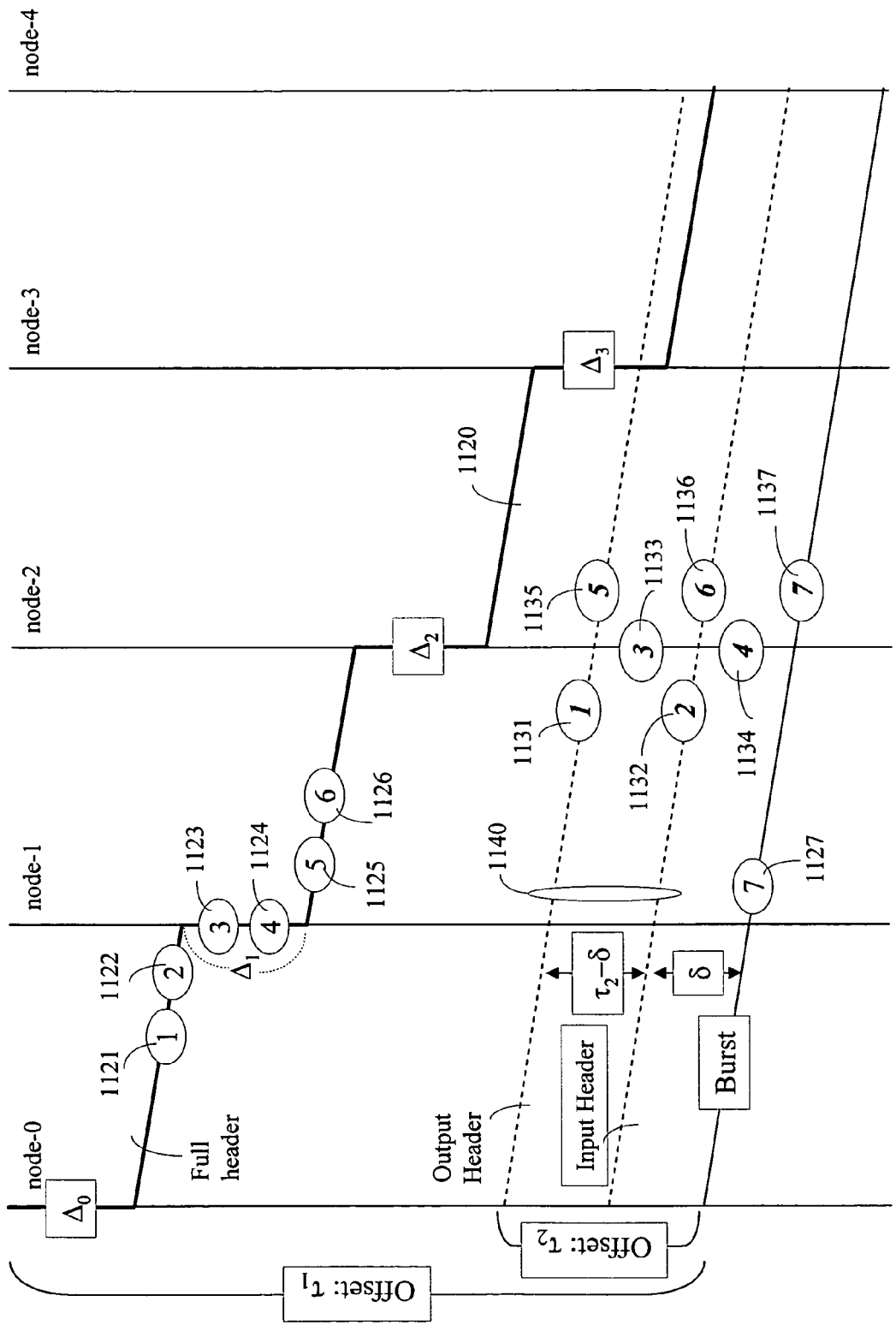
FIG. 11 illustrates the propagation of a control signal sent ahead of an associated load burst, using either a known control method or a method according to the present invention, and indicates an offset time at successive nodes along the path of FIG. 10.

In a prior art header-propagation scheme (illustrated by line 1120), each core switch may forward the header to a subsequent node along a selected path only when a channel to the subsequent node is successfully allocated. The cumulative processing delay along the path is the sum of $\Delta_0$ to $\Delta_5$. Consequently, the temporal separation between the header and the load signal diminishes along the path and the processing-time allowance shrinks gradually from its initial value, $\tau_1$, as illustrated in FIG. 11, with the last core switch having the smallest offset time $\tau^*$ determined as $\tau^* = \tau_1 - \Delta_0 - \Delta_1 - \Delta_2 - \Delta_3 - \Delta_4$.

A sufficient processing-time allowance, at least equal to the sum of the processing delays in the optical core switches along the path (the sum of $\Delta_0$ to $\Delta_5$ in the example of FIG. 10) is therefore required at the first core switch. If each core switch along a path requires 20 microseconds, for example, to schedule and set an internal connection, then the first core switch along a path of 12 hops, for example, must be given a burst-offset interval of at least 240 microseconds. The edge node transmitting the burst should therefore have a large storage capacity to hold each burst until it is transmitted when its offset interval expires. A method, according to the present invention, for reducing the burst delay and consequently reducing the required storage at the edge node is to send a burst header while the burst is still under formation. The header would then contain an estimate of an upper bound of the size of the burst at the instant of transmitting the burst. A burst is formed by aggregating individual packets of a common data stream, where all the constituent packets of the data stream have the same destination edge node. The burst size would be limited by the upper bound indicated in the header. A burst may contain less data than indicated by its size upper bound resulting in a capacity waste. However, the waste may be reduced using biased estimates of expected burst sizes.

In an alternative header-propagation scheme, according to the present invention (illustrated by the dashed lines 1140), a first header for each burst is transmitted by a source edge node and may continue to propagate along a predetermined path regardless of the outcome of scheduling processes at the traversed nodes. The initial offset time interval at the source edge node is set at $\tau_2$ seconds. If the transmission is successful at each intermediate switch, the separation between the first header and the signal would always be $\tau_2$ seconds at the input of each subsequent node. This scheme is attractive because each node has the same offset time, hence the offset time need not be excessive and the storage requirement at the transmitting edge nodes may be reduced. Each intermediate node along a designated path may reserve a channel within a multi-channel link leading to a subsequent node to accommodate a forthcoming burst. However, an intermediate node would not be aware of the output channel selected by a previous node. A second header may then be sent by the source edge node and by each intermediate node along the path to indicate an identifier of the selected channel to the subsequent node. The second header would be sent shortly before the burst is transmitted by a time interval, $\delta$, just sufficient for the receiving node to set a connection from the input port receiving the second header to an output port scheduled based on the first header. Thus, the second header is sent after the first header by a period of $\tau_2 - \delta$. It is noted that the process of finding an output channel that is free during the required time interval may be more time consuming than the process of directing an input channel to the selected output channel, i.e., $\Delta_j \gg \delta$, $\Delta_j$ being the required scheduling time at a node j, as defined earlier with reference to FIG. 10.

If an intermediate node fails to find a free output channel at the desired time interval, the intermediate node may either not send a second header or, preferably, send a second header that includes an indication of burst loss. A null entry in place of an identifier of a selected channel may be used. The subsequent node may then cancel any output channel reservation made on the basis of information of a corresponding first header in order to reduce potential capacity waste resulting from blocking at the preceding intermediate node. A node may mark a reserved output channel as free and available for other requests if it does not receive a second header at the anticipated time or if a second header indicating burst rejection is received from a preceding node. In a properly provisioned network, capacity waste due to blocking would be negligible.

It may be desirable to use the above double-header scheme, where a first header containing invariant information is sent first then followed by a second header carrying variant information, under normal traffic-load conditions and use the prior-art single-header method described above under heavy traffic load, however detected.

The following steps are executed by a controller of a spatial-switching node regardless of the control scheme used:
(1) determining burst destination and identifying a channel band leading to the destination according to a routing rule;
(2) identifying an incoming channel carrying a forthcoming burst;
(3) reserving a channel in the channel band for a period at least equal to the duration of the burst and starting before the arrival instant of the burst;
(4) selecting an internal path within the switching node;

(5) transmitting invariant burst information (duration, destination, etc.) to a subsequent switching node along the route;
(6) transmitting variable burst information (channel identifier, time-lag of succeeding load burst, etc.); and
(7) transmitting the load burst when it is received from the incoming channel.

FIG. 11 illustrates the two schemes that may be considered in managing the headers, hence controlling the offset-interval.

The first scheme is the prior art scheme outlined above, where a single header is used and the header is transmitted from a core switch only if a channel to a subsequent switching node along the path (the subsequent node being either another optical core switch or the destination edge node 910B) is successfully allocated for a forthcoming burst. As illustrated on FIG. 11, node-0 transmits a full header including the invariant and variable burst information to node-1 along the route to destination edge node 910B, thus allowing node-1 to execute steps 1 and 2 (1121 and 1122) described above. Node-1 has all the information needed to execute steps 3 and 4 described above. Step 3 (1123) allocates a path to node-2, i.e., reserves a specified time-interval on a selected outgoing channel in a channel band leading to subsequent node-2, and step 4 (1124) establishes an internal path from the incoming channel to the selected outgoing channel. The time interval is determined from the burst duration (part of the invariant information) and the offset time interval (part of the variable information). Steps 3 and 4 (1123 and 1124) together are executed in $\Delta_1$ seconds. In steps 5 and 6 (1125 and 1126 respectively), node-1 transmits to node-2 the invariant header information and the variable header information which includes an identifier of the selected outgoing channel and the value of the offset time reduced by $\Delta_1$. Node-1 then switches the burst along the internal path to node-2 (step 7, 1127).

In the alternative scheme outlined above, according to the present invention, the header is divided into a first header containing the invariant burst information and a second header containing the variable header information. The scheme is advantageous for paths traversing more than one intermediate switching node where the accumulation of processing delays reduces the offset time. The first header travels along a multi-hop path regardless of the result of channel-allocation at each traversed core switch. As illustrated in FIG. 11, node-1 transmits a first header to node-2, thus enabling node-2 to execute step 1 (1131), and node-2 instantly transmits the same first header to node-3 (step 5, 1135). Node-2 then attempts to reserve an output channel in a channel band directed to node-3 (step 3, 1133). If successful, node-2 includes an identifier of the reserved channel in a second header to be sent to node-3 (step 6, 1136). Meanwhile, node-2 receives an identifier of the channel selected by node-1 to carry the burst to node-2 (step-2, 1132) and uses this information, together with the outcome of step 3 (1133) to establish an internal connection (step 4, 1134). The burst is then switched along the internal path (step 7, 1137). Thus, the order of executing the above seven steps differs significantly in the two schemes. If node-2 fails to reserve an output channel, the identifier of the reserved channel, included in the second header, may be replaced by a null entry (an invalid identifier).

Offset-Time Accuracy

In spatial switching, a burst may be transmitted over any wavelength channel (a load channel) in a multi-channel link but a header of the burst is transmitted over a dedicated wavelength channel (control channel) in the multi-channel link. Due to the dependence of the propagation speed on the spectral band occupied by a wavelength channel in a fiber link, the temporal separation between an optical burst and its header at the receiving end of the multi-channel link may differ appreciably from the temporal separation at the sending end. The separation difference increases with both the length of the multi-channel link and with the spectral separation of the 'load channel' and the control channel. Therefore a guard time may be needed between successive bursts and a means for determining the propagation-delay differential along a link may be used to reduce the guard time.

Traffic Efficiency

Figure 12:
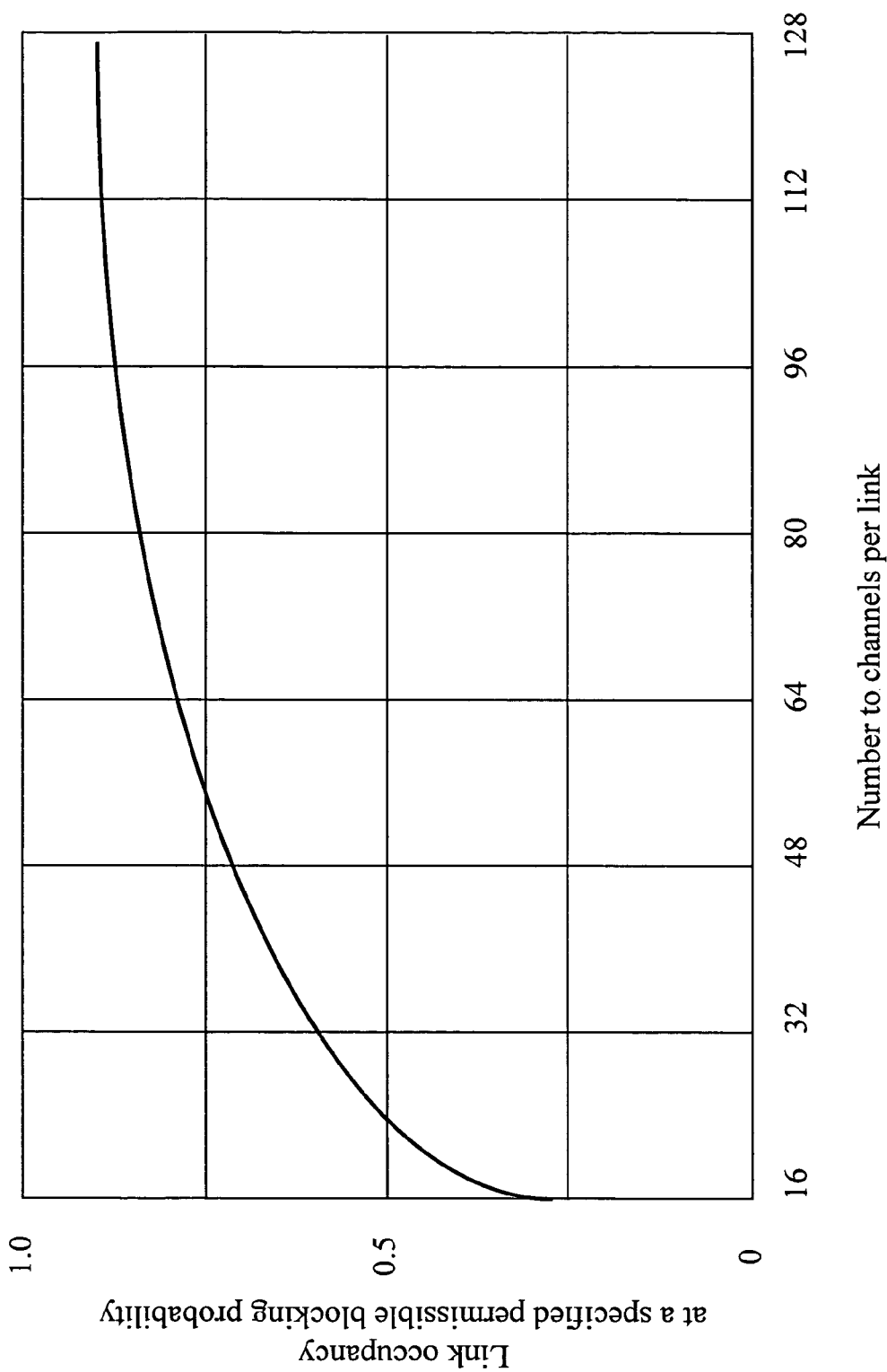
FIG. 12 illustrates a known dependence of the occupancy of a link comprising multiple channels on the number of channels per link under the constraint of a blocking-tolerance specification, for use with an embodiment of the present invention.

FIG. 12 illustrates a known dependence of the mean occupancy of a link on the number of channels in the link at a given specified service-quality index defined in terms of signal-loss probability under given traffic characteristics. For example, if an output channel band directed to a subsequent node has 16 channels to be used for spatial switching, the mean occupancy of the channel band has to be kept below 0.275 to realize a low burst-loss probability of 0.00001. The corresponding permissible occupancies if the channel band has 32, 64, 128, or 256 channels would be 0.428, 0.569, 0.684, and 0.776, respectively. These occupancies are based on the assumption of traffic pure randomness and would change for different traffic characteristics. Thus, as the number of channels per link increases, the link's traffic capacity may increase appreciably; the traffic capacity being the permissible mean occupancy of the link under a specified service-quality index. However, as the number of links per core switch decreases the mean number of hops increases, as illustrated in FIG. 6. The network efficiency may be determined as the ratio of the capacity of the access ports to the total capacity of all ports including the access ports the inner ports of the network. The link efficiency increases with increased number of channels per link and the network efficiency decreases with increased number of hops.

Figure 13:
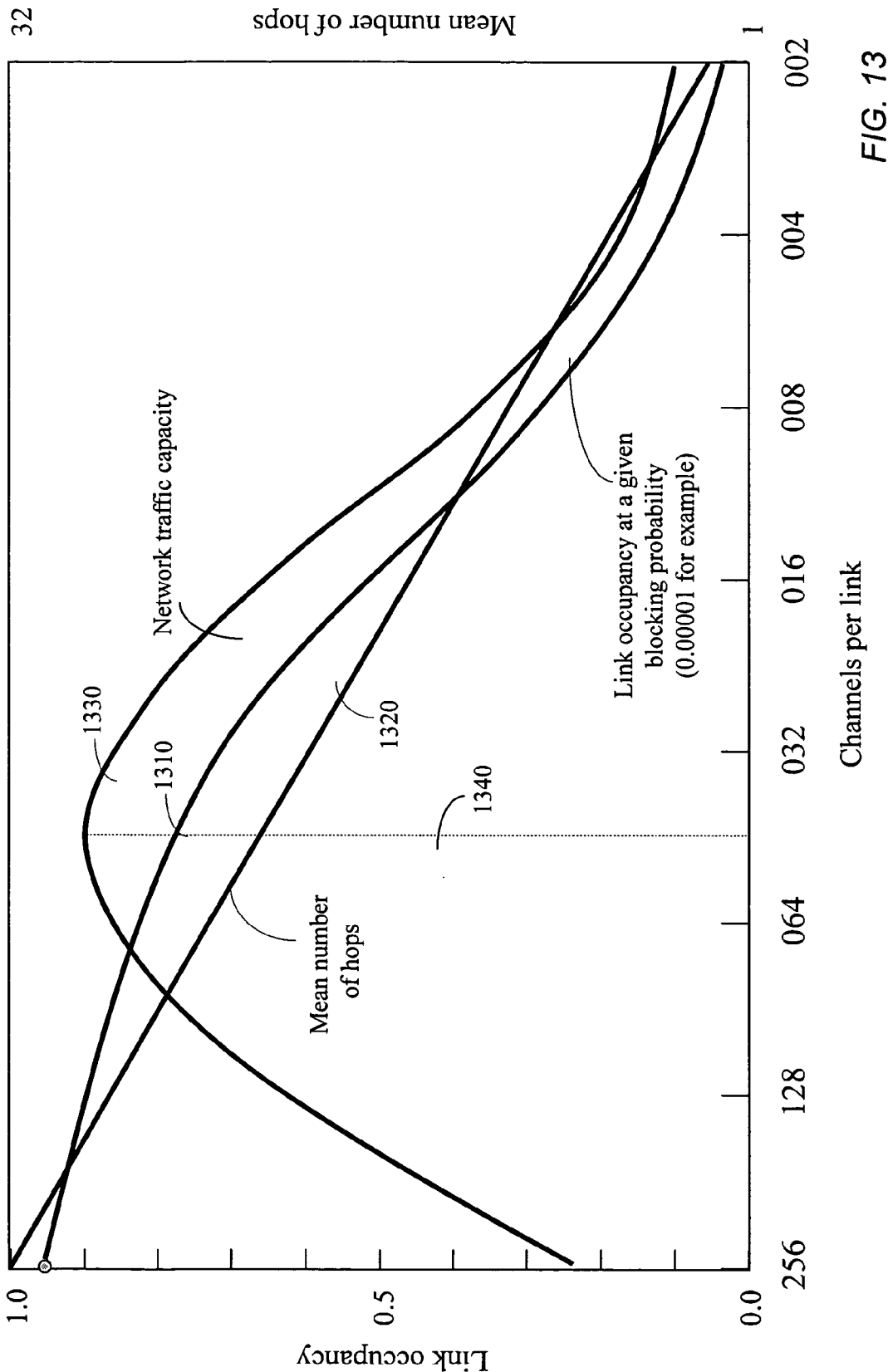
FIG. 13 illustrates the dependence of network efficiency on inter-nodal link sizes under the constraint of a specified node dimension, for use with an embodiment of the present invention.

FIG. 13 illustrates the combined effect of increasing link efficiency and increasing number of hops as the adjacency (also called 'degree') of a core switch decreases, the core switch having a predetermined dimension and capacity. Herein, the term 'link' generally refers to any channel band in a fiber transmission line. The core switch supports 256 channels that may arranged in 128 links of two channels each, 64 links of 4 channels each, 32 links of 8 channels each, and so on. The adjacency is determined by the dimension of the core switch. Given a limited number of dual channels in an optical core switch (a dual channel includes an input channel and an output channel), the larger the number of channels per link the smaller the number of links, hence the smaller the adjacency. The larger the number of channels per link the higher the link efficiency and the larger the network diameter. A large network diameter results in low network efficiency and performance degradation. Line 1310 illustrates the reduced link efficiency with the decrease of the number of channels per link, the link efficiency being the link occupancy at a specified blocking probability (burst-loss probability). Line 1320 illustrates the reduced mean number of hops with the decrease of the number of channels per link in a hypothetical network using identical core switches each of dimension 256×256. Line 1330 illustrates the variation of network traffic capacity with different channel-band sizes (link sizes) in the hypothetical network. The number of channels per link may be selected to maximize the network efficiency as indicated by line 1340.

The connectivity pattern of input channels and output channels of an optical switch (generally any bufferless switch) to adjacent nodes depends on the extent of temporal and spatial switching. In one extreme, all paths may be time locked and only loss-free temporal switching need be used, as will be described with reference to FIG. 14. The ports of the optical switch may then connect to individually routed channels. In another extreme, none of the paths may be time locked and only spatial switching is used as illustrated in the prior-art networks of FIGS. 8 and 9. The ports of the optical node would then be arranged to connect to channel bands with each channel band directed to the same adjacent node.

Temporal Switching in a Composite-Star Network

If the path from one edge node to another traverses only one optical node, the path can be time locked and, hence time-limited signals (signal bursts) may be transferred along the path. An example of a network proving time-locked paths is the composite-star network described in Applicant's U.S. patent application Ser. No. 10/180,050, filed on Jun. 27, 2002 and titled "High-Capacity Optical Node", the specification of which is incorporated herein by reference. The composite-star network comprises a multiplicity of electronic edge nodes interconnecting through independent optical nodes, where the optical nodes are not connected to each other. An optical node may comprise several optical-switch planes. Each edge node is time-locked to each optical node to which it is connected in order to enable temporal switching. Edge nodes of different capacities and dimensions, and optical nodes of different capacities and dimensions may be used. Time-locking enables scheduling the transfer of time-limited signals, of any form, from one edge node to another through the optical core, despite the unavailability of buffers at the optical nodes. The composite-star structure may be used for loss-free burst switching as described in the aforementioned U.S. patent application Ser. No. 09/750,071.

The capacity of a composite-star network can grow to several petabits per second. The number of edge nodes is determined by the dimensions of the optical nodes and the number of optical nodes is determined by the dimensions of the edge nodes. Therefore, a geographic coverage of a continental scale is realizable. A larger number of core switches, each having fewer switch planes, may be realized using wavelength routers as will be described with reference to FIGS. 34 and 35.

Figure 14:
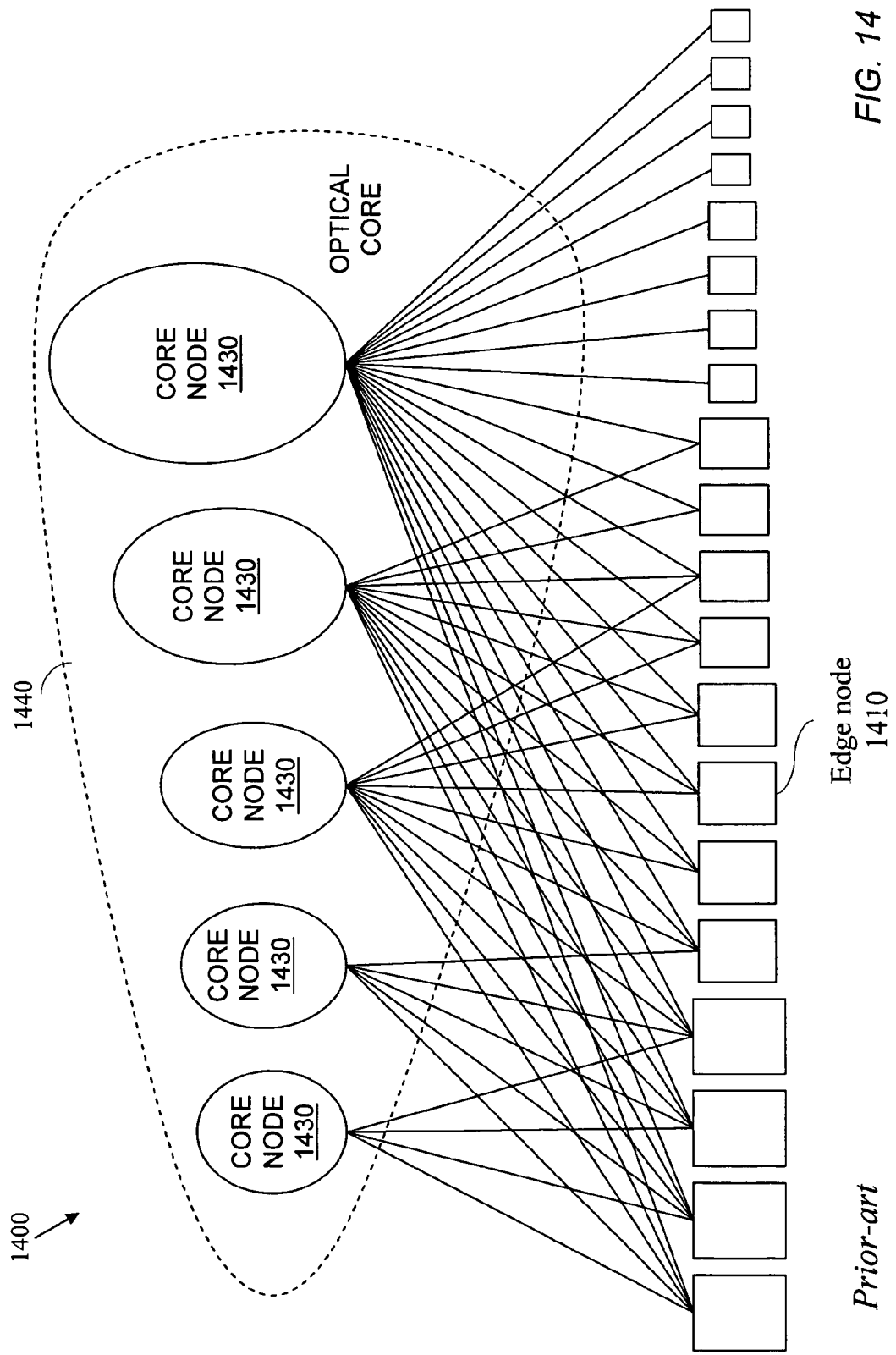
FIG. 14 illustrates a prior-art non-uniform composite-star network using temporal switching in a time-shared optical core.

FIG. 14 illustrates a prior-art composite-star network 1400 described in the aforementioned Applicant's U.S. patent application Ser. No. 10/180,050. The network structure permits time-locked paths, and therefore, temporal switching, for each edge-node pair. The number of edge nodes 1410 in the composite-star network is determined by the feasible dimension of a core switch. This would be of the order of 256 to 1024 edge nodes. Each core switch 1430 may be configured as parallel optical switches. Each edge node 1410 may have a capacity of several terabits per second and the total capacity of network 1400 may be in the order of several petabits per second.

Optical Node Using Spatial and Temporal Switching

Figure 15:
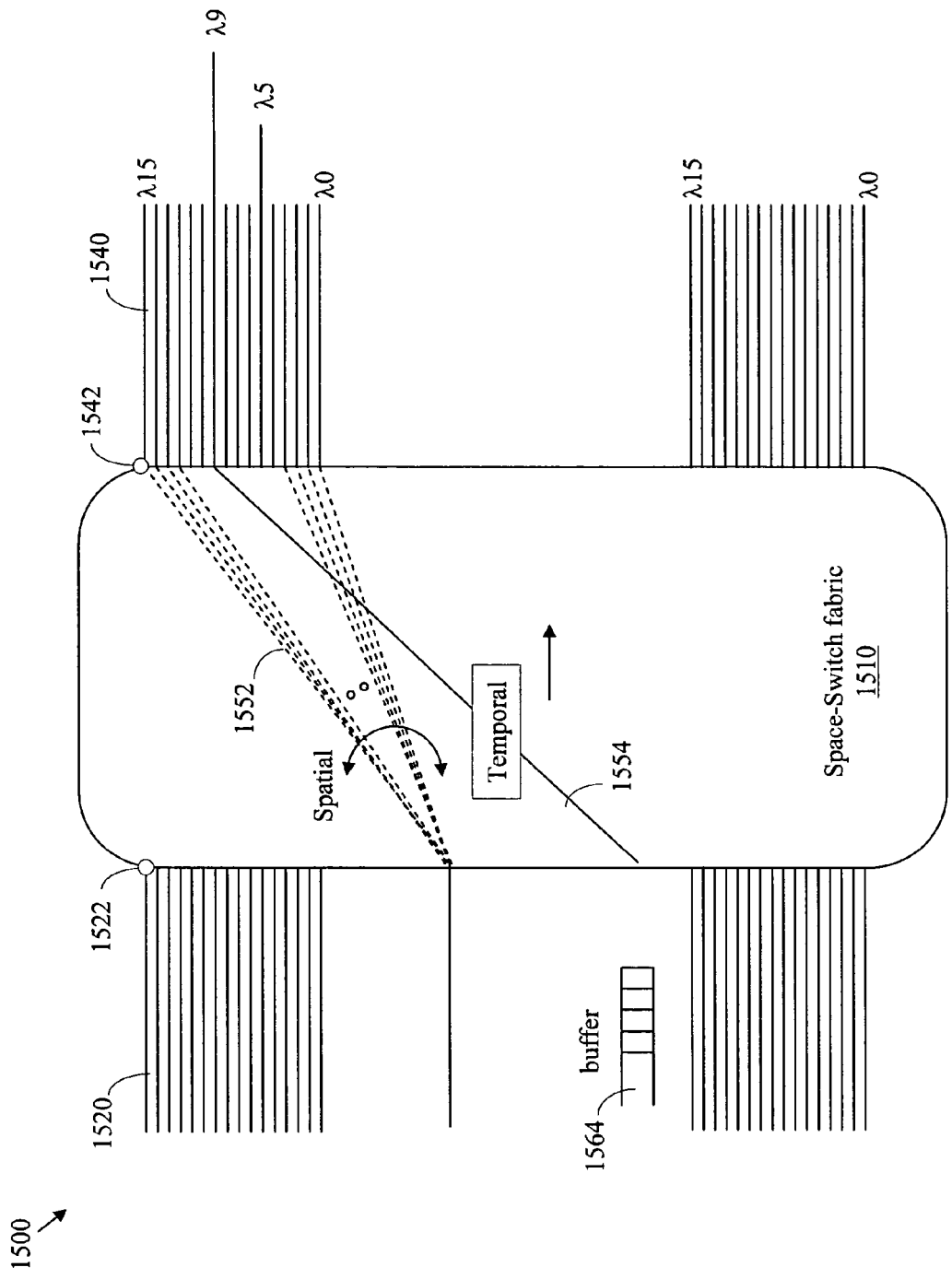
FIG. 15 illustrates the use of temporal switching, spatial switching, or combined temporal and spatial switching in a bufferless switch, in accordance with an embodiment of the present invention.

FIG. 15 illustrates a space switch 1500, according to the present invention, having several input ports 1522, a switch fabric 1510, and several output ports 1542 where at least one input port is provided with an input buffer 1564. Such a buffer may be realized electronically, thus requiring optical-to-electrical and electrical-to-optical conversions. Two internal paths in the space switch are illustrated, one path 1552 established according to a spatial-switching process (as illustrated in FIG. 1-A) and the other path 1554 established according to a temporal-switching process (as illustrated in FIG. 1-B). The first path 1552 relates to a signal arriving at an input port 1522 that does not have a signal buffer. The signal may be switched immediately to an appropriate output channel 1540 of a channel band or be discarded. The second path 1554 relates to a signal arriving at an input port 1522 provided with a buffer 1564. The signal can be scheduled for switching to a specific output port 1542 when the specific output port 1542 becomes free.

Figure 16:
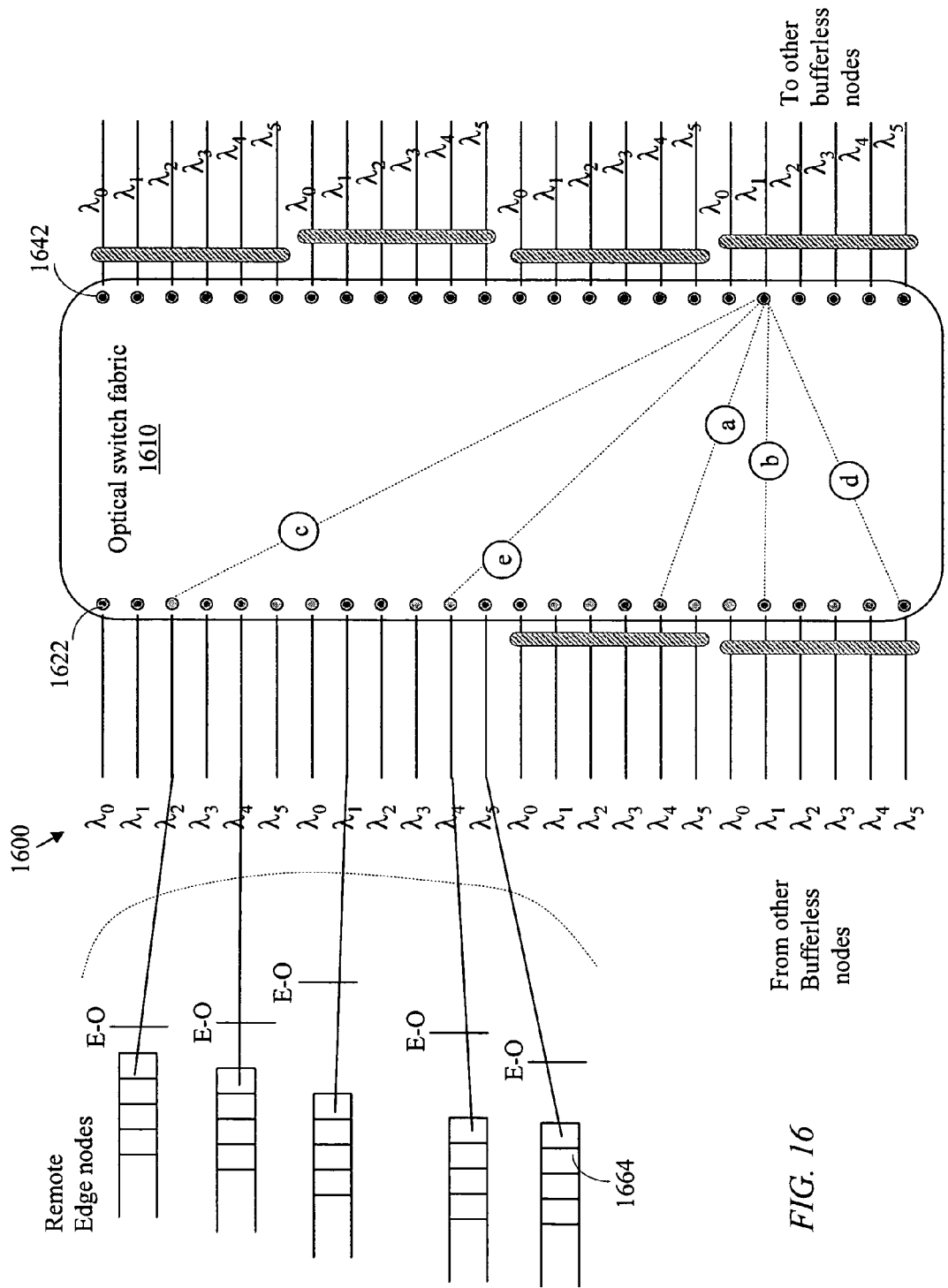
FIG. 16 illustrates temporal switching of signals arriving from remote edge nodes, for use with an embodiment of the present invention.

FIG. 16 illustrates an optical switch 1600 having a bufferless switch fabric 1610 and bufferless input ports. Some input ports 1622 receive signals from distant edge nodes, each of the distant edge nodes having a buffer 1664. Through a time-locking process, the distant edge nodes can be made to appear as if they were collocated with the optical switch 1600. A time-locking process is described in U.S. Pat. No. 6,570,872, issued on May 27, 2003 to Beshai et al. and titled "Self-configuring distributed switch", the specification of which is incorporated herein by reference. Thus, each signal can be switched to a specific output port 1642 in switch 1600 in a manner similar to that of the buffered signal in FIG. 15.

Consider the five time-limited signals (bursts) labeled a, b, c, d, and e, used in FIGS. 3 and 4. The signals arrive at input ports 1622 of the bufferless switch 1600 on wavelength channels having central wavelengths of $\lambda_4, \lambda_1, \lambda_2, \lambda_5,$ and $\lambda_4$. The signals originate from edge nodes each having a signal buffer 1664. The signals are appropriately delayed at their originating edge nodes to avoid temporal overlapping at the input side of the bufferless switch 1600. Applying appropriate delays at the edge nodes, enabled by time locking the edge-nodes buffers 1664 to the bufferless switch fabric 1610, results in non-overlapping arrival at the respective input ports 1622 of the optical switch 1600 so that the signals can be successively switched to a designated output port 1642.

Figure 17:
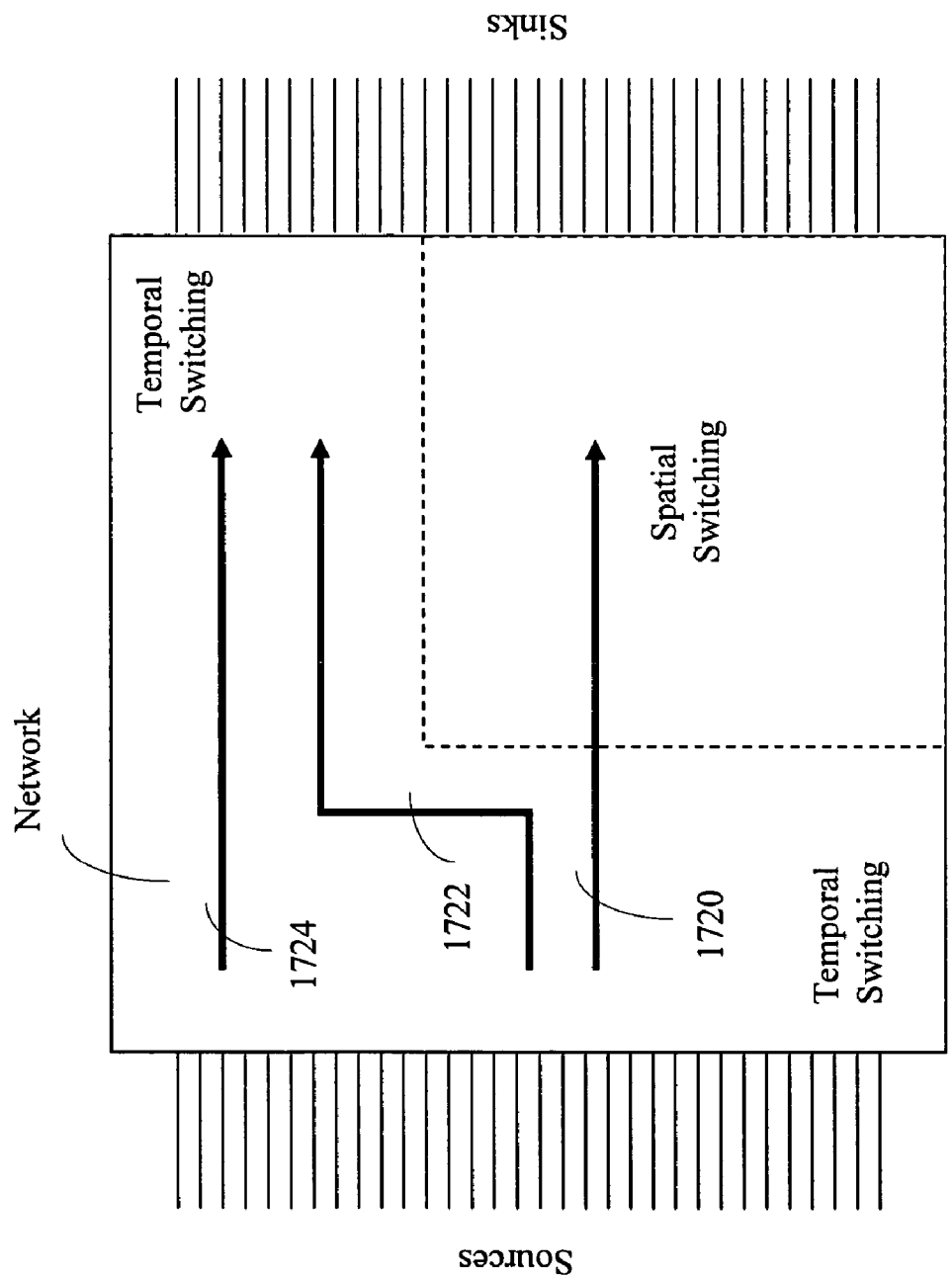
FIG. 17 illustrates a space switch where an input channel uses either temporal switching to switch a signal to a specific output channel or spatial switching to switch a signal to any channel in a specific output channel band, in accordance with an embodiment of the present invention.

FIG. 17 illustrates the use of combined temporal and spatial switching, in accordance with an embodiment of the present invention, to reduce the mean number of hops and, hence, extend the network coverage and capacity upper bound. A time-shared network exclusively using temporal switching is suitable for intermediate coverage of the order of 256 to 1024 edge nodes as described above with reference to the composite-star network of FIG. 14. A time-shared network exclusively using spatial switching has coverage limitations due to the limited nodal degree. A network according to the present invention, conceptually illustrated in FIG. 17, uses temporal switching to reach a core switch that is topologically close (having a small number of hops) to a specified destination edge node. The signals are then transferred from the core switch to the destination node under spatial switching. Thus, bursts may be transferred over a path under both temporal and spatial switching (path 1720). Edge nodes subtending to the same optical node have the privilege of exchanging signals directly under temporal switching (paths 1722 and 1724).

Figure 18:
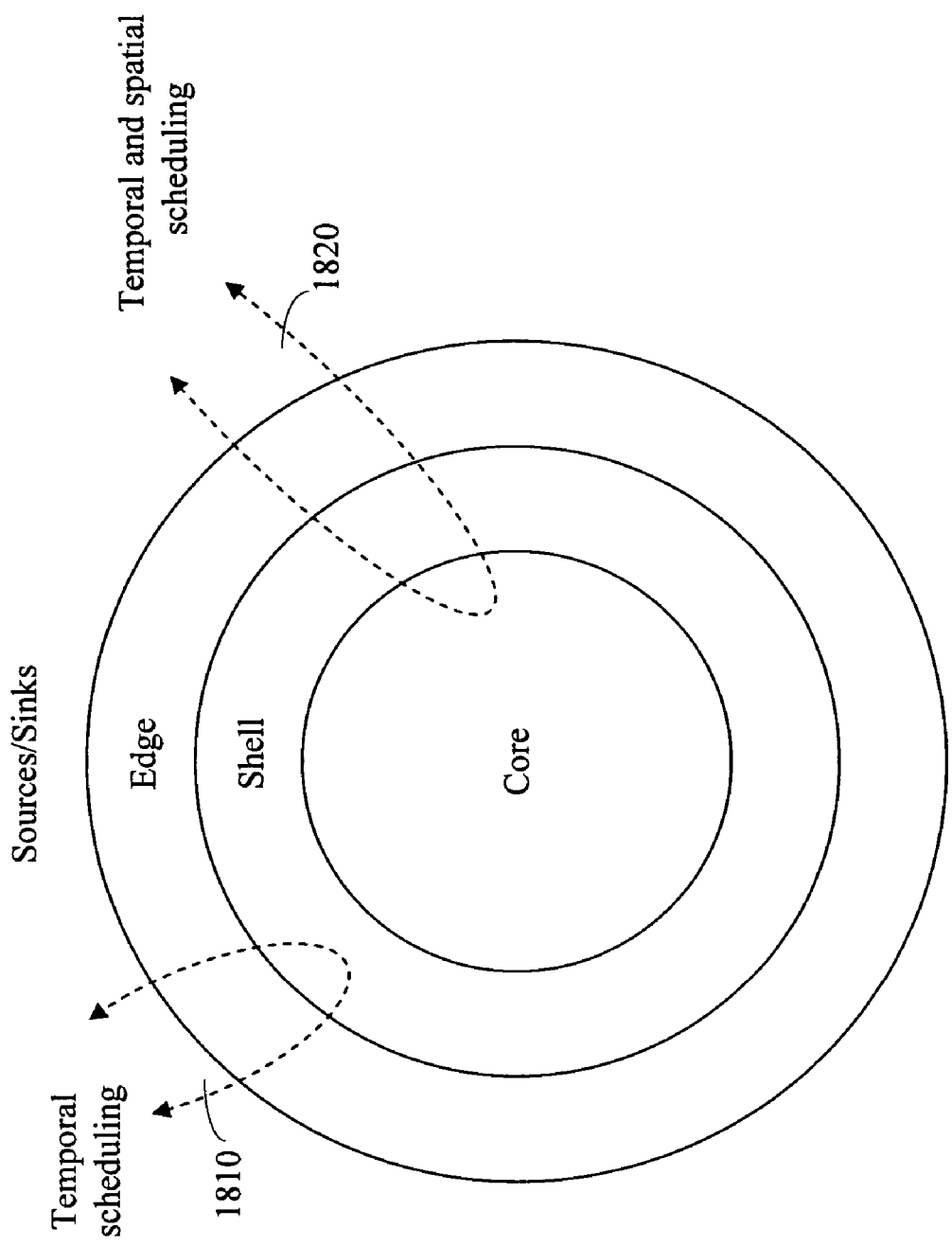
FIG. 18 is a representation of a network having edge nodes, shell switches, and core switches, in accordance with an embodiment of the present invention.

FIG. 18 is a conceptual representation of a network having edge nodes, bufferless shell switches, and bufferless core switches. The shell switches are optical core switches that receive signals directly from edge nodes. The use of intermediate shell switches provides shorter paths for a subset of edge-node pairs and helps in extending the use of loss-free temporal switching. A subset of edge nodes may exchange signals through the shell switches using temporal switching, as in path 1810. In general, edge nodes may exchange signals through temporal switching in the shell switches followed by spatial switching in the core switches, as in path 1820.

Asymmetrical Core Access

Figure 19:
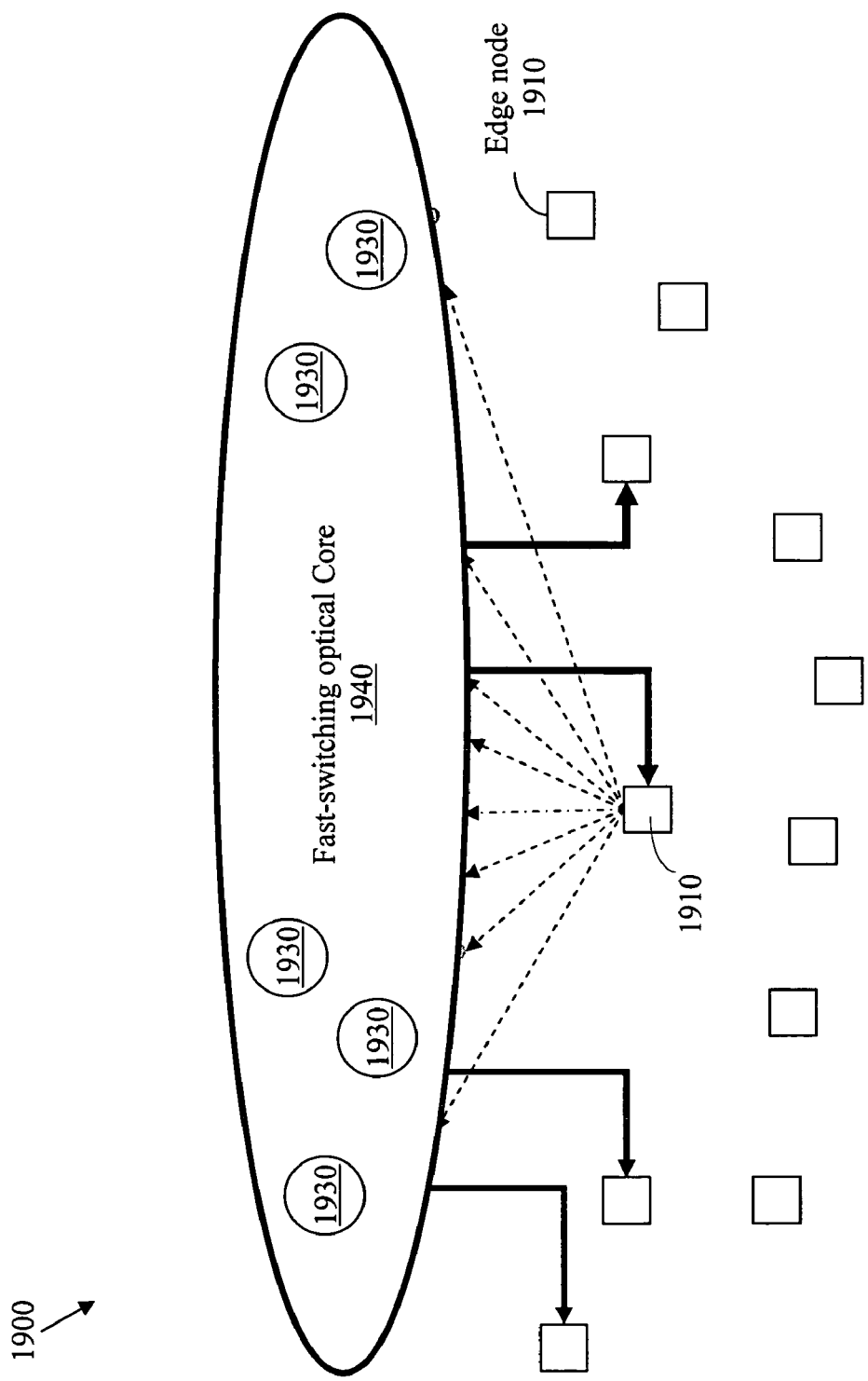
FIG. 19 illustrates a network having edge nodes with asymmetrical connections to an optical core, in accordance with an embodiment of the present invention.

FIG. 19 illustrates a network 1900 realizing the concept of FIG. 17. An edge node 1910 may connect to each of several fast core switches 1930 of an optical core 1940 in the upstream direction through a small number, possibly one, of wavelength channels. Each edge node 1910 has signal buffers and may, therefore, time-lock to each core switch 1930 to which it is connected and use temporal switching of signals over a single channel. The optical core 1940, however, may not be able to maintain time-locking for connections among core switches or in the downstream direction towards the edge nodes. Thus, a core switch may not be able to temporally schedule signals arriving from two or more other core switches. Signals are then switched using spatial switching, which requires that a respective switching node have a channel band connecting to a subsequent node along the route to destination. An edge node 1910, therefore, receives signals from the optical core 1940 through a channel band having a sufficient number of channels to render the probability of burst loss negligibly small under specified load conditions. For example, an edge node may have 32 upstream time-locked channels connecting to 32 core switches 1930 and 32 downstream channels received from a single core switch 1930 to permit downstream spatial switching at negligible burst-loss probability.

Figure 20:
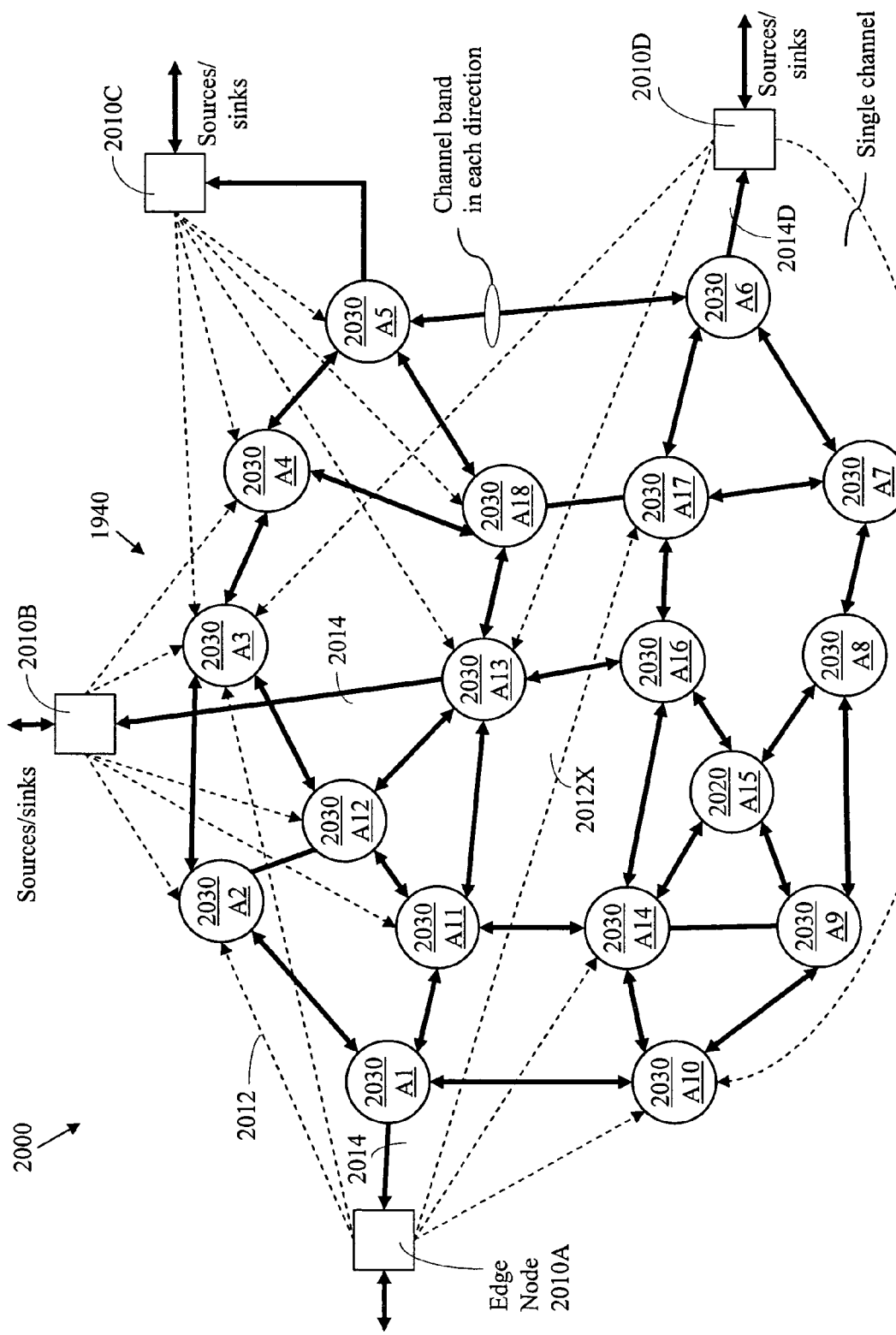
FIG. 20 illustrates a network having edge nodes and optical core switches where the edge nodes have asymmetrical connections to core switches to enable the use of temporal switching and spatial switching, in accordance with an embodiment of the present invention.

FIG. 20 illustrates a network 2000 further illustrating fast-switching optical core 1940 of FIG. 19. The fast-switching optical core includes fast optical switches 2030. An edge node 2010 has individually routed output channels 2012 connecting to different optical switches. However, an edge node 2010 receives signals from the core through channel bands 2014 each originating from a single optical core switch 2030. The optical core switches 2030 of the network are labeled as 2030A1 to 2030A18. An edge node 2010A has individual upstream channels 2012 to core switches 2030A2, 2030A3, 2030A10, 2030A14, and 2030A17 and a downstream multi-channel link 2014 from core switch 2030A1. An edge node 2010B has individual upstream channels to nodes 2030A2, 2030A3, 2030A4, 2030A11, and 2030A12, and a downstream multi-channel link 2014 from core switch 2030A13. A path from edge node 2010A to edge node 2010D may traverse only nodes 2030A17 and 2030A6. The selection of core switches 2030 to which a source edge node 2010 connects may be based on an estimate of the distribution of the traffic volume from the source edge node 2010 to destination edge nodes.

An edge node 2010 time locks to each optical core switch 2030 to which it connects in the upstream direction. Edge nodes 2010 subtending to a common core switch 2030 may communicate using temporal switching through the common core switch while edge nodes that do not connect to a common core switch may connect through temporal and spatial switching. For example, a path from edge node 2010A to 2010D in FIG. 20 may be effected through a time-locked path to core switch 2030A6 then through spatial switching from core switch 2020A6 to destination edge node 2010D. Upstream channel 2012X from edge node 2010A is time locked to core switches 2030A17. Core switch 2030A17 is then able to schedule bursts received from upstream channel 2012X for loss-free switching to a channel from core switch 2030A17 to core switch 2030A6 from which the bursts may be spatially switched to channels in channel band 2014D to the destination edge node 2010D.

Figure 21:
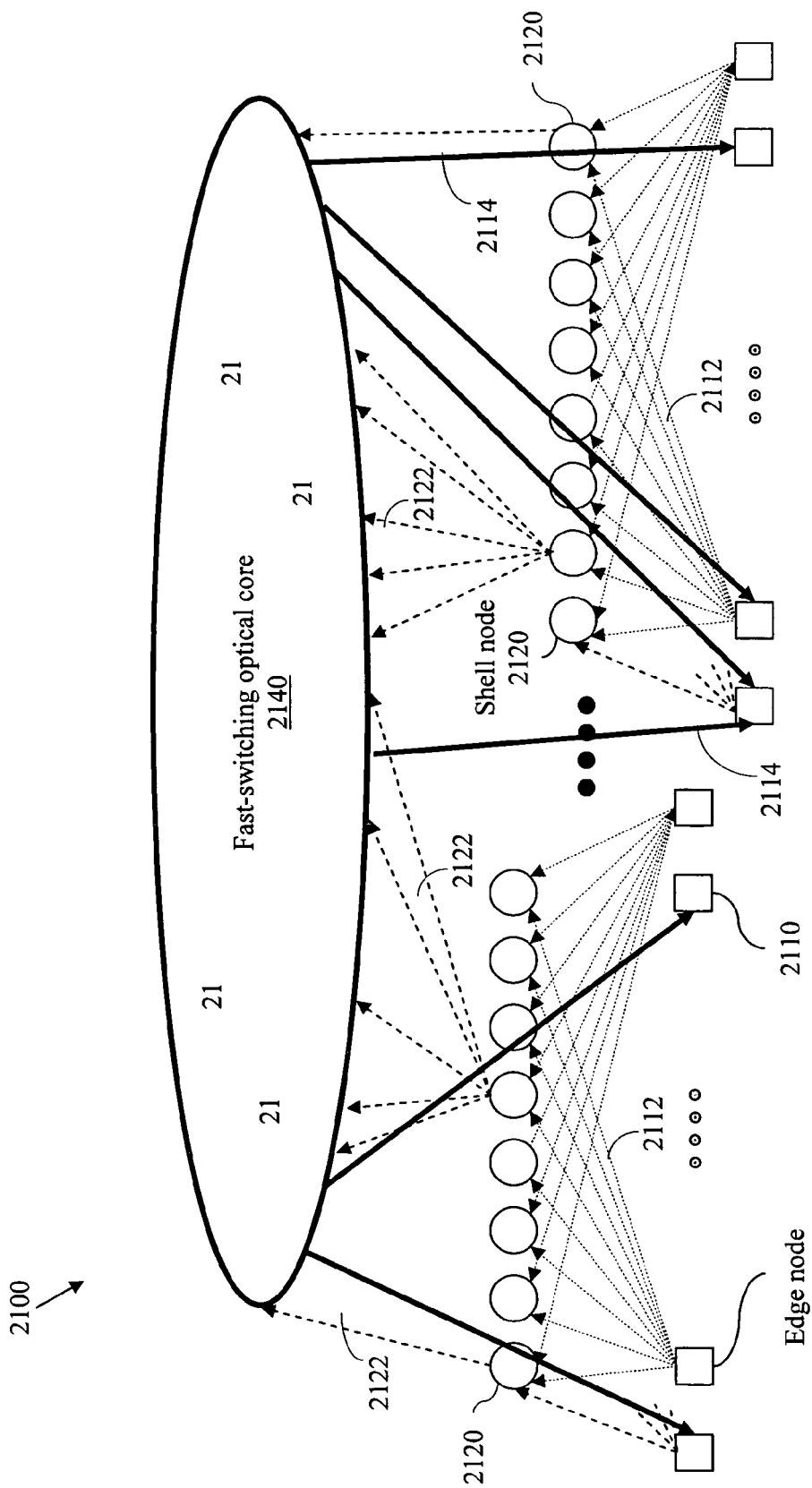
FIG. 21 illustrates a network using asymmetrical edge-node connections and asymmetrical shell-switch connections to enable the use of temporal switching and spatial switching, in accordance with an embodiment of the present invention.

FIG. 21 further extends the structure of FIG. 19. A network 2100 has edge nodes 2110 connecting to fast-switching optical nodes 2120 called 'shell switches'. The shell switches 2120 may be interconnected through fast-switching core switches 2130 collectively forming a fast-switching optical core 2140. The shell switches 2120 and core switches 2130 may be structurally similar, and both may be bufferless. The main difference is in their connectivity and their role in the overall network 2100. The shell switches 2120 may directly interconnect edge nodes 2110 through time-locked connections, i.e., through temporal switching. The shell switches 2120 may also aggregate traffic to be switched in core switches 2130 towards topologically-distant destination edge nodes 2110. A shell switch 2120 preferably has several upstream channels 2122 that may be individually routed to several core switches 2130 and downstream channels that may be individually routed to several edge nodes. For example, a shell switch may have 128 upstream channels connecting to a number of core switches not exceeding 128 and 32 downstream channels connecting to at most 32 edge nodes.

Each edge node preferably has many output channels individually routed to shell switches and core switches. Shell-switch connectivity will be described with reference to FIG. 29.

A shell switch 2120 interfaces with edge nodes 2110. The output channels 2112 of the edge node may be routed individually to other edge nodes, and through time-locked paths to shell switches 2120, or to core switches 2130. To receive signals from optical nodes, the inbound ports of the edge nodes may be arranged into groups, with each group receiving a channel band (a multi-channel link) 2114 from an optical switch 2130. The optical switch 2130 applies spatial switching over the channel band 2114 to communicate signals to the edge node.

A core switch 2130 interfaces with shell switches 2120 and other code switches 2130. Output channels 2112 of a shell switch 2120 may be routed individually to core switches 2130. Thus, the input ports of a core switch may receive signals from independently routed channels as well as channel bands. However, all the output channels of a core switch 2130 are grouped into channel bands to enable spatial switching because the input channels of the core switch may not be time coordinated.

Figure 22:
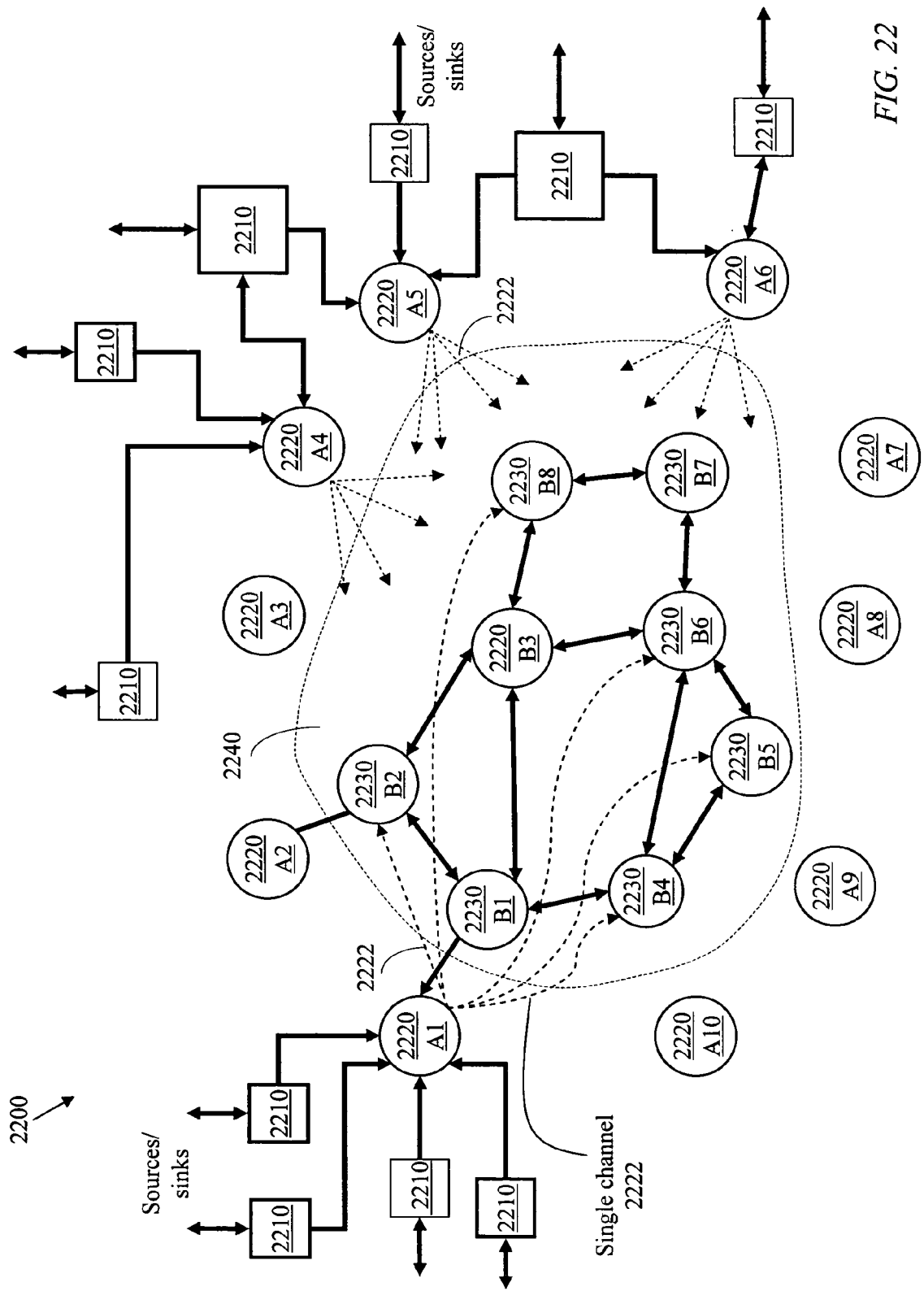
FIG. 22 illustrates a network having shell switches with asymmetrical connections to enable the use of temporal switching and spatial switching, in accordance with an embodiment of the present invention.

FIG. 22 illustrates a network 2200 where the optical nodes are identified as shell switches 2220A1 to 2220A10 and core switches 2230B1 to 2230B8. A shell switch may have several subtending edge nodes. A shell switch 2220 has an asymmetrical connectivity as in network 2100. A shell switch transmits to other optical nodes through individually routed output channels 2222. For example, shell switch 2220A1 has output channels connecting to core switches 2230B2, 2230B4, 2230B5, 2230B6, and 2230B8. The selection of core switches to which a shell switch connects may be based on an estimate of the distribution of the aggregate traffic volume from subtending edge nodes to destination edge nodes.

Figure 23:
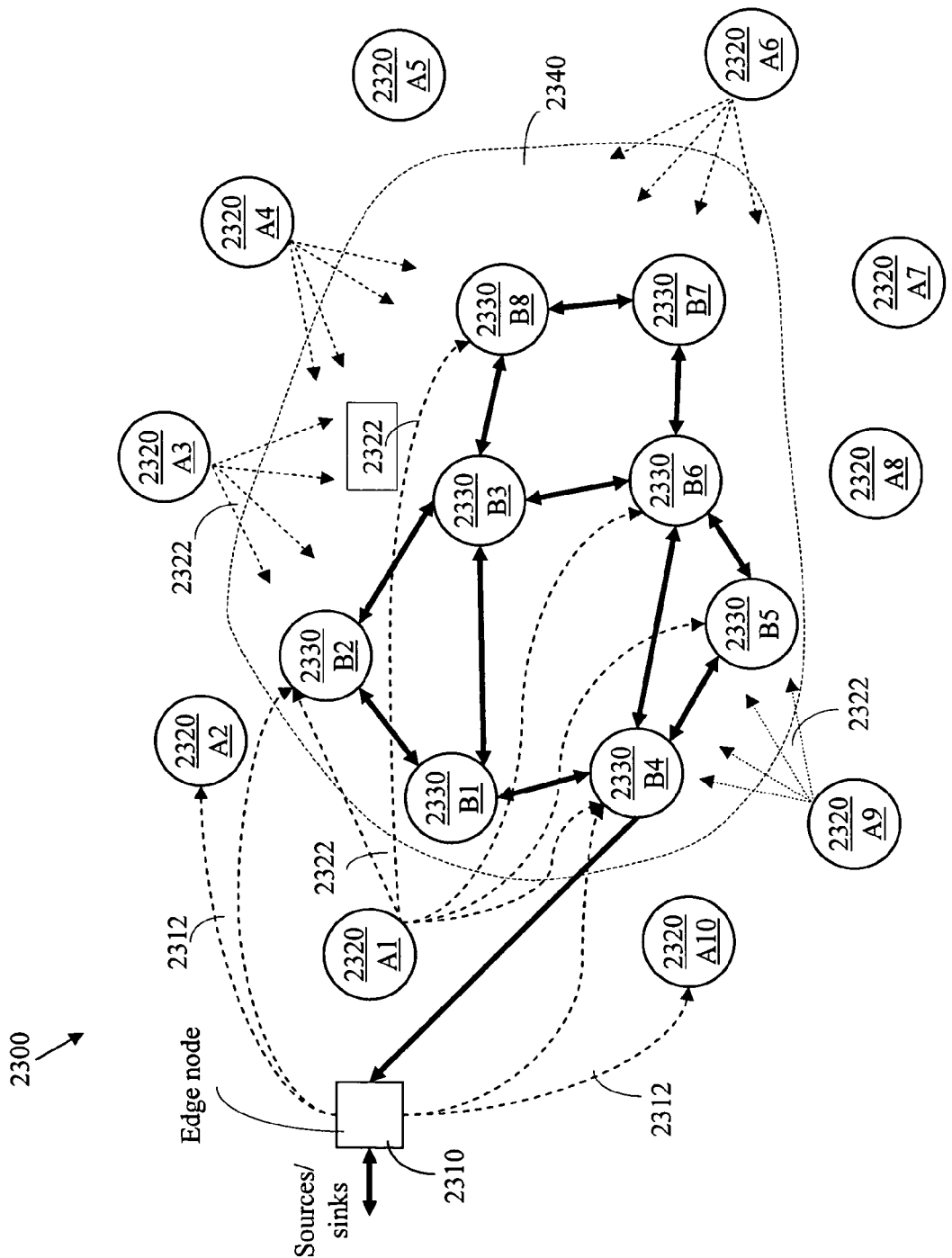
FIG. 23 illustrates a network having asymmetrical edge nodes and asymmetrical shell switches to extend the use of temporal switching, in accordance with an embodiment of the present invention.

FIG. 23 illustrates a network 2300 that combines the asymmetrical edge-node connectivity of FIG. 20 and the asymmetrical shell-switch connectivity of FIG. 22. An edge node 2310 may have output channels 2312 to several shell switches 2320 and core switches 2330, and input channels arranged in a small number of channel bands 2314 each channel band originating from a single core switch 2330. A shell switch 2320 may have output channels 2322 individually routed to several core switches 2330 and input channels 2312 received from edge nodes 2130.

Composite Temporal-Spatial Scheduler

A bufferless core switch 2030 (FIG. 20) having input ports each supporting an input channel, a fast-switching fabric, and output ports each supporting an output channel, may receive individually routed time-locked input channels as well as input channel bands carrying temporally uncoordinated signals. An input channel band may also carry temporally-coordinated (time-locked) signals. A core controller associated with the bufferless node may then include a composite scheduler having a temporal scheduler, operable to allocate a path from a specific input port to a specific output port during any time interval of a specified duration, as well as a spatial scheduler operable to allocate a path from a specific input port to any output port from within a band of output ports during a specified time interval. The core controller includes a timing circuit for exchanging time locking signals with edge controllers associated with subtending edge nodes to enable temporal switching in the bufferless core switch. The time-locking signals generated by a core switch 2030 may be communicated to a subtending edge node through any path.

The spatial scheduler of a composite scheduler associated with a specific bufferless core switch 2030 is likely to have a limited interval of time (within an offset-time) to schedule a path within the bufferless core switch for a forthcoming (already propagating) burst while the temporal scheduler of the composite scheduler has the luxury of dictating the time at which a burst waiting in a buffer at an edge node arrives at the bufferless core switch. Therefore, according to one policy, the spatial scheduler of the composite scheduler may be given priority over the temporal scheduler.

A selector may be provided at the composite scheduler of a core controller to arbitrate between the temporal scheduler and the spatial scheduler when a specific output port designated for temporal switching is one of the output ports of the band of output ports used for spatial switching. Thus, when the core controller receives a first request to schedule the transfer of a burst, waiting in a buffer at an edge node, over a specific output channel and a second request to schedule an already propagating burst, the selector may either activate the temporal scheduler, if the first request has been waiting for a period of time exceeding a predetermined delay tolerance, or activate the spatial scheduler otherwise. A time-space channel-allocation map (basically a calendar) may be used to indicate channel availability (port availability).

Network-Core Examples

Figure 24:
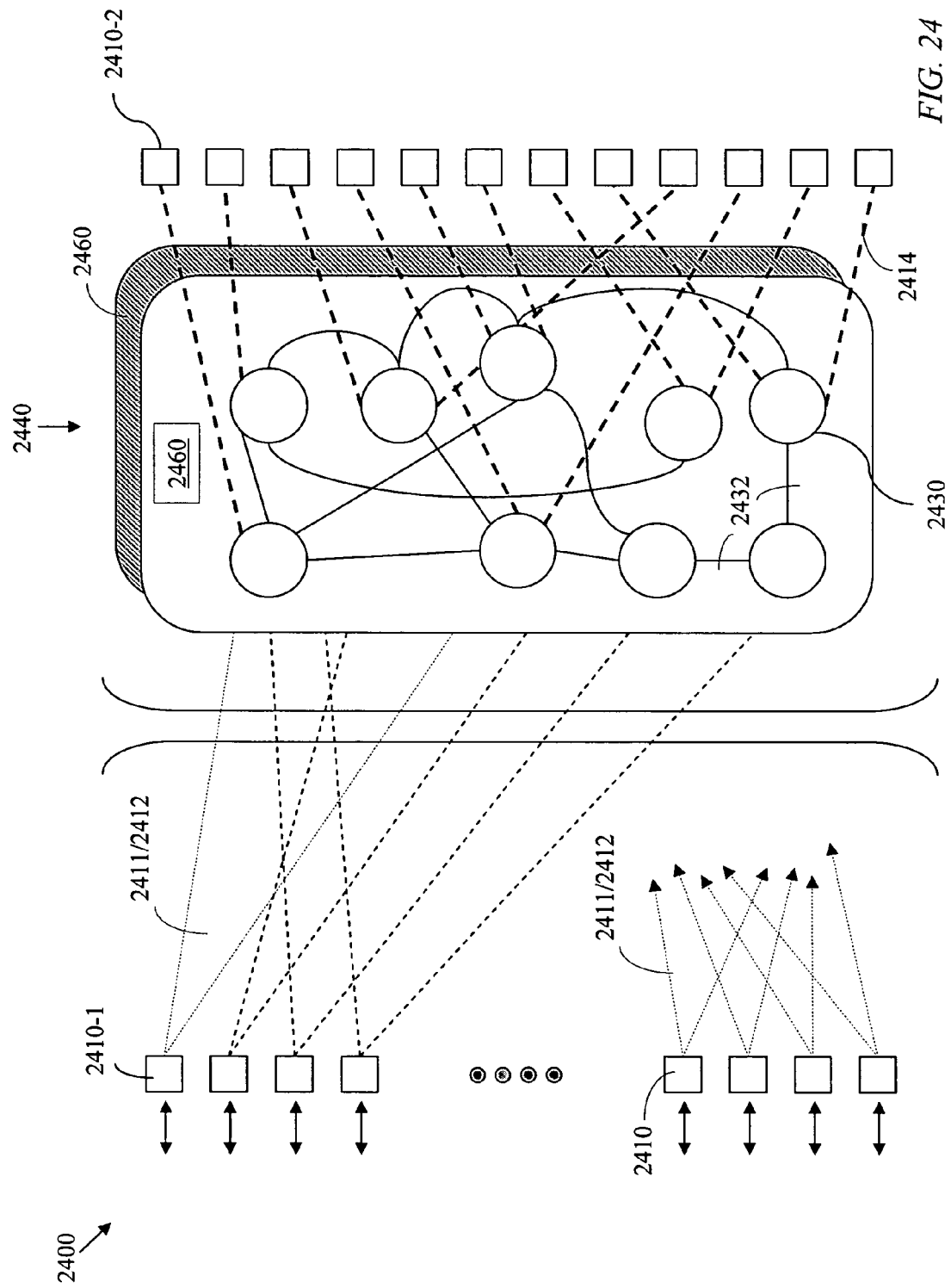
FIG. 24 illustrates a specific structure of the network of FIG. 19 comprising a plurality of edge nodes interconnected by core planes, in accordance with an embodiment of the present invention.

FIG. 24 illustrates an implementation of network 1900 of FIG. 19. Network 2400 comprises a plurality of edge nodes 2410 interconnected by a network core 2440. Each edge node 2410 has an upstream module and a downstream module (not illustrated) which may be integrated to share memory and control. Each edge node 2410 is represented by a block 2410-1 in the left side and a block 2410-2 in the right side of FIG. 24 for clarity. In other words, a block 2410-1 on the left side is paired with a block 2410-2 on the right side; both blocks forming the same edge node 2410 as will be further described with reference to FIG. 25 which illustrates an asymmetrical edge node 2410.

The network core 2440 comprises a number of core planes 2460, each core plane 2460 interconnecting some or all of the edge nodes 2410. A core plane 2460 comprises fast-switching core switches 2430 interconnected by multi-channel links 2432. Each edge node 2410 receives traffic from a core switch 2430 in each core plane 2460 through a channel band 2414. Consider a specific edge node 2410. The upstream module of the specific edge node has input channels (ingress channels) receiving data from traffic sources (not illustrated) and outbound channels 2411 connecting to different core switches 2430. FIG. 24 illustrates individually routed outbound channels 2411 and individually routed inbound channels 2412 for receiving temporally-scheduled bursts from core nodes 2430. In bound channels 2412 may be provided to enable direct temporal switching for edge nodes 2410 subtending to common core switches 2430. The downstream module has output channels (egress channels) transmitting data to subtending traffic sinks (not illustrated) and inbound channels 2414 receiving traffic from the core planes 2460. The inbound channels 2414 are preferably divided into channels bands, each channel band connecting to one core switch 2430 in one of the core planes 2460.

Temporal switching, which observes a time-reference as described earlier, is feasible from an edge node 2410 to an output channel of any core switch 2430 to which the edge node connects. However, a core switch may also receive traffic over channel bands originating from different core switches which may have different time references. Thus, spatial switching which does not require inter-nodal time coordination is used within each core plane 2460. Spatial switching requires a spatial degree of freedom, where any of outgoing channels may be used during a time-interval dictated by a previous node.

Figure 25:
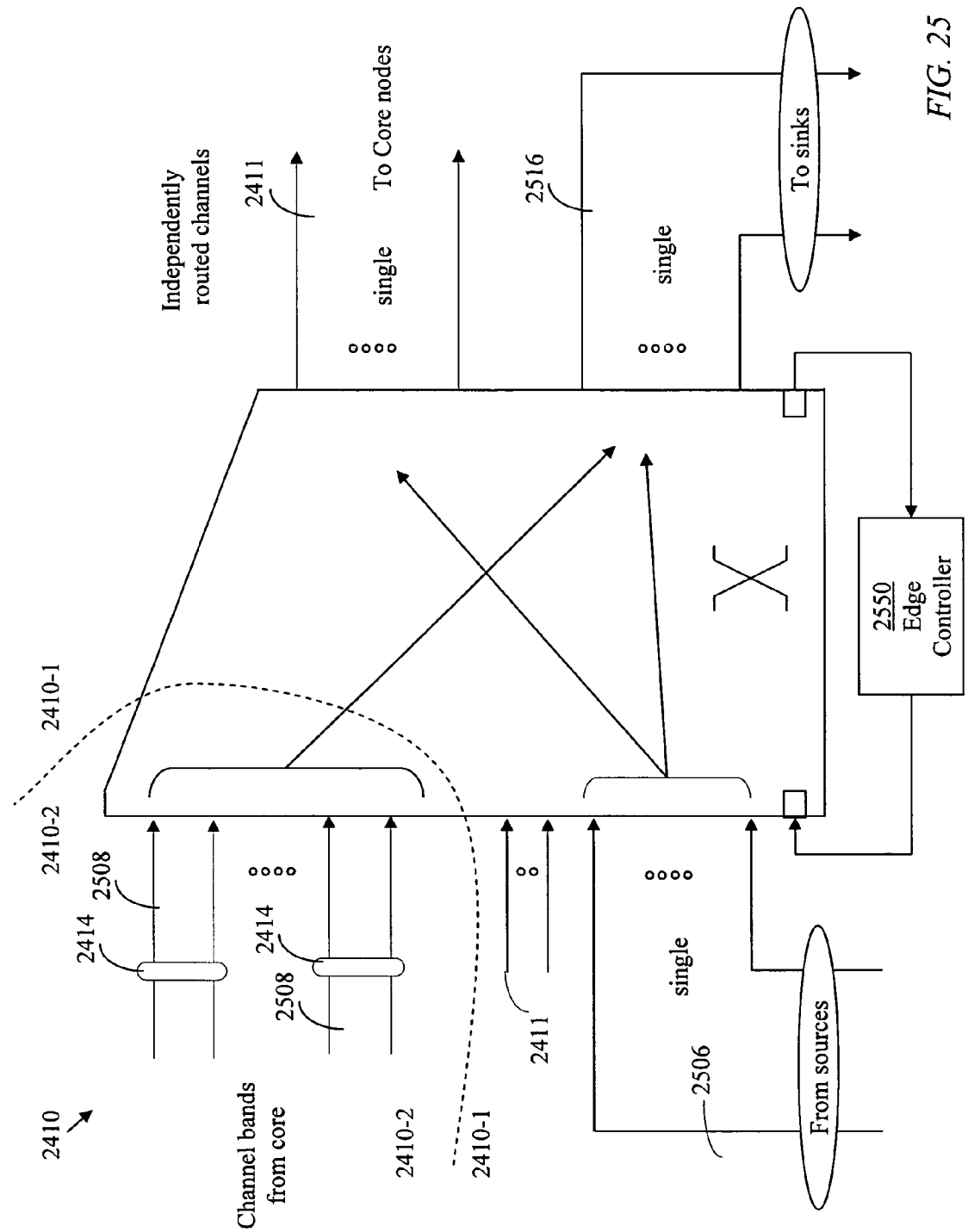
FIG. 25 illustrates an edge node with asymmetrical input-side connectivity and output-side connectivity for use in the network of FIG. 24, in accordance with an embodiment of the present invention.

FIG. 25 illustrates an electronic edge node 2410 of FIG. 24 having several input ports and output ports with asymmetrical input-side connectivity and output-side connectivity. The asymmetrical edge node 2410 has ingress channels 2506 for receiving data from data sources, egress channels 2516 for transmitting data to data sinks, inbound channels 2412 for receiving temporally switched signals from core nodes, inbound channels 2508, arranged in inbound channel bands 2414, for receiving spatially switched signals from optical switches (core switches), and outbound channels 2411 for transmitting signals to optical switches (core switches). The egress channels 2516 may individually connect to traffic sinks. Other channels may connect directly to other edge nodes 2410, if so desired, but are not illustrated in FIG. 25.

The ingress channels 2506 are individually connecting to traffic sources but the (downstream) inbound channels are received in channel bands 2414, each channel band originating from a core switch 2430. The edge node egress channels 2516 are individually connecting to traffic sinks and the (upstream) outbound channels 2411 are individually routed to core switches 2430. Because the edge nodes include buffers, the upstream outbound channels 2411 may be time locked to corresponding bufferless core switches 2430. Time locking permits scheduling the transmission of signals over the outbound channels; each signal is timed to arrive at a corresponding optical core switch at an instant determined by a scheduler of the corresponding optical node. With spatial switching, an optical core switch may transmit a signal to an edge node 2410 through any inbound channel 2508 of a given channel band 2414. Thus, successive signals belonging to a given data stream destined to an edge node 2410 may be transmitted to the edge node 2410 over different inbound channels 2508 of an inbound channel band 2414 (FIGS. 24 and 25). As described earlier, an optical node may resort to spatial switching when time reference is not maintained along an entire path. An edge controller 2550, associated with edge node 2410, may then schedule the signals of the same stream so that they may be delivered to data sinks in proper temporal order. The process of collating the signals (bursts) of each data stream will be described below with reference to FIG. 28.

Due to the availability of a buffer, temporal-switching may result in significantly higher channel efficiency in comparison with spatial switching. Hence, in an edge node 2410, the input capacity may generally be higher than the output capacity as indicated in FIG. 25.

It is noted that block 2410-1 of FIG. 24 includes egress ports 2506, inbound ports 2412, egress ports 2516, and outbound ports 2411 while block 2410-2 includes only inbound channel bands 2414. The two blocks 2410-1 and 2410-2 are drawn separately to simplify FIG. 24.

Edge controller 2550 (FIG. 25) of asymmetrical edge node 2410 schedules the transfer of packets received from ingress channels 2506 to outbound channels 2411. An outbound port associated with each outbound channel 2411 may aggregate packets it receives from ingress channels 2506 into data bursts and formulate burst-transfer requests, each burst-transfer request specifying a destination and duration of a corresponding burst. The outbound port then sends each burst-transfer request over an outbound channel 2411 to a selected core switch 2430. A controller of selected core switch 2430 determines a schedule for transmitting the burst associated with each request indicating a required transmission time of the burst, and communicates the schedule to edge controller 2550. Controller 2550 receives the schedule, associates the schedule with a corresponding outbound channel, and communicates the indicated transmission time to the outbound port associated with the corresponding output channel 2411. The outbound port transmits the corresponding burst at the indicated transmission time. Naturally, edge controller 2550 may also schedule internal paths from ingress channels 2506 to egress channels 2516.

In an alternative mode, each packet is associated with a burst stream and each burst stream is allocated a flow rate. An outbound port associated with an outbound channel 2411 formulates a flow-rate-allocation request for each burst stream, each flow-rate-allocation request specifying a destination and a flow rate. The outbound port sends each flow-rate-allocation request to a selected core switch. The selected core switch formulates burst-transfer permits for each burst stream and communicates the permits to edge controller 2550; each permit specifies a burst size and transmission time. Edge controller 2550 distributes the permits to respective outbound ports, and the outbound ports formulate bursts accordingly, and transmit each formed burst at the time instant indicated in a corresponding permit.

Figure 26:
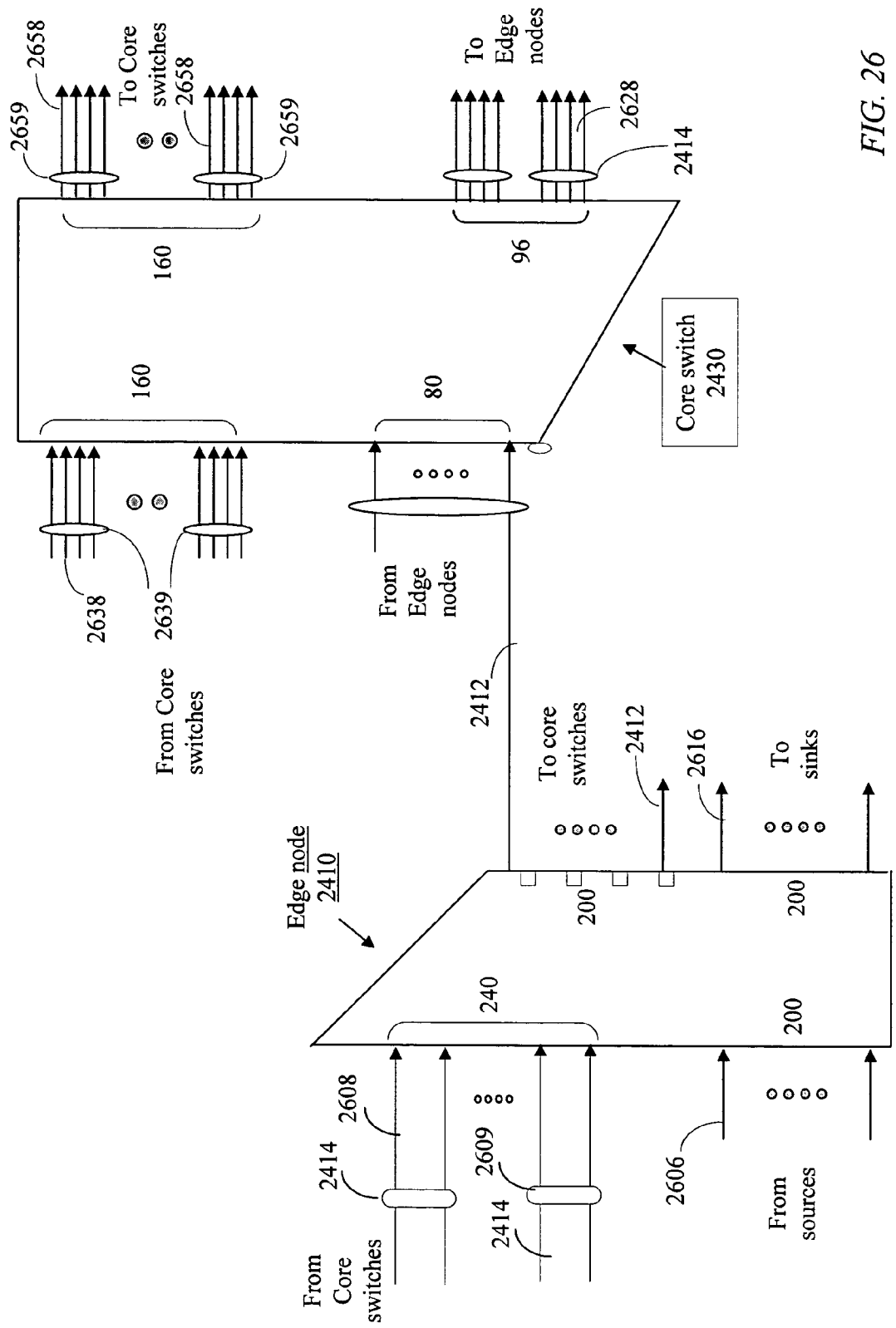
FIG. 26 illustrates a connection from an asymmetrical edge node to an asymmetrical core switch in the network of FIG. 24, in accordance with an embodiment of the present invention.

FIG. 26 illustrates a connection of an edge node 2410 to a core switch 2430 in network 2400 (FIG. 24). The core switch 2430 may be asymmetrical, having more output ports than input ports. Recall that a core switch may receive traffic from subtending edge nodes through individually routed channels. The core switch, however, sends traffic to the subtending edge nodes through channel bands and also to other core switches through channel bands. Spatial switching with-low blocking probability requires that the channel bands be kept at a relatively low occupancy. Hence, more output capacity than input capacity is needed in the core switch. In contrast, as described earlier, the input capacity of an edge node exceeds its output capacity because the edge node receives traffic from core switches using spatial switching over low-occupancy channel bands.

In the configuration of FIG. 26, the illustrated core switch 2430 may have 80 input channels possibly originating from 80 different edge nodes 2410, and 96 output channels 2628 arranged into channel bands 2414, for example two channel bands of 48 channels each, each channel band 2414 terminating in an edge node 2410. The illustrated core switch 2430 also has 160 input channels 2638 arranged in channel bands 2639 each incoming from another core switch 2430, and 160 output channels 2658 arranged in channel bands 2659 each terminating on another core switch 2430. Channel bands 2639 and 2659 correspond to channel bands 2432 of FIG. 24. The illustrated edge node 2410 has 200 ingress channels 2606 (from traffic sources), 200 egress channels 2616 (to traffic sinks), 200 output channels 2412 individually routed to core switches 2430, and 240 inbound channels 2608, grouped in channel bands 2414 each channel band 2414 emanating from a core switch 2430. With channel bands of 60 channels each, for example, the inbound channels may receive traffic from four core switches 2430.

Figure 27:
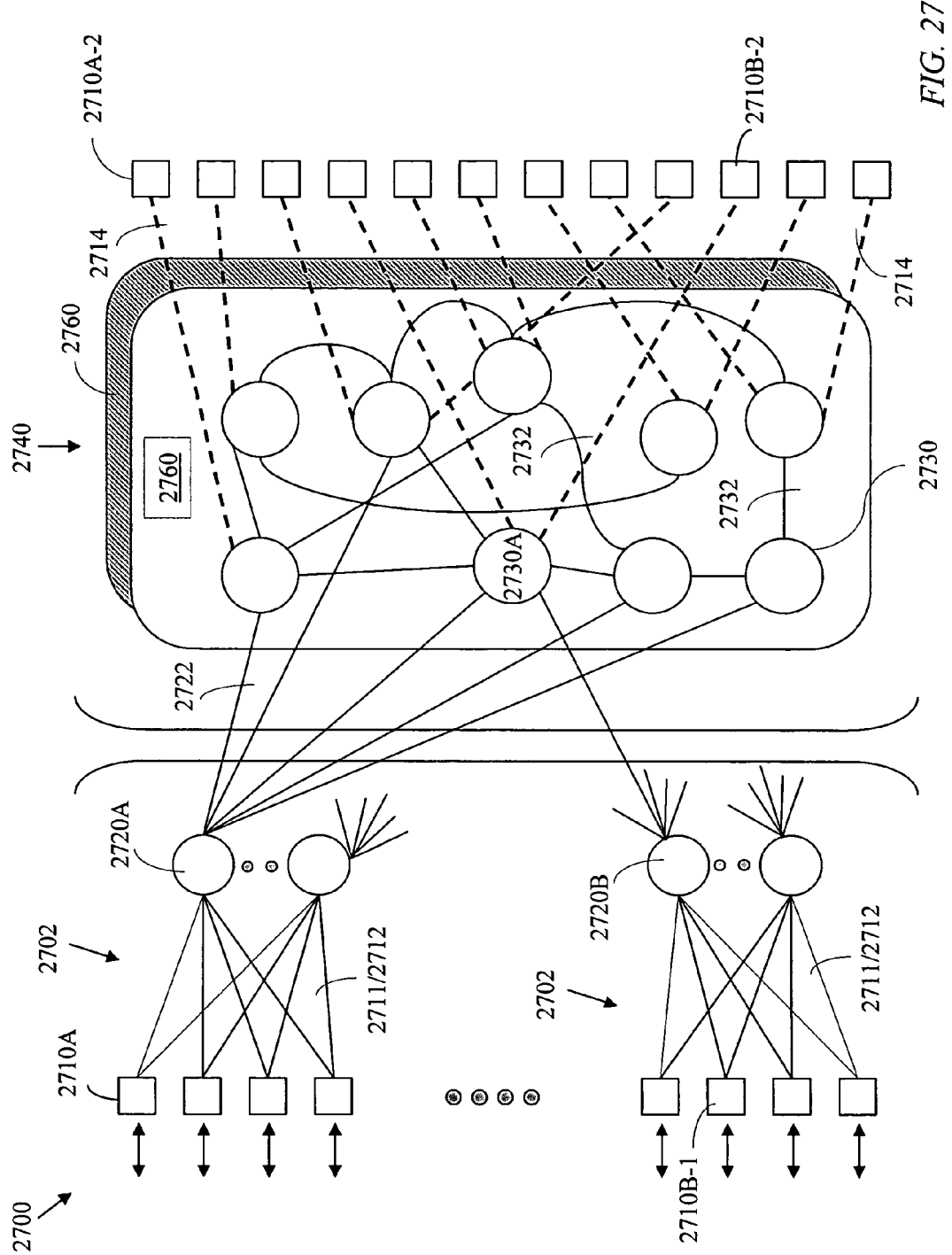
FIG. 27 illustrates a specific structure of the network of FIG. 21 comprising a plurality of composite star networks interconnected by core planes, in accordance with an embodiment of the present invention.

FIG. 27 illustrates an implementation of network 2100 of FIG. 21. Network 2700 comprises a plurality of composite-star networks 2702 interconnected by a network core 2740. Each composite star network 2702 has at least one shell switch 2720 connecting a set of edge nodes 2710. Each edge node 2710 has an upstream module and a downstream module which may be integrated to share memory and control. Each edge node 2710 is represented by a block 2710-1 on the left side and a block 2710-2 on the right side of FIG. 27 for clarity. In other words, a block 2710-1 on the left side is paired with a block 2710-2 on the right side, both blocks forming the same edge node 2710 (to be further illustrated in FIG. 28). As will be described below, with reference to FIG. 28, an edge node 2710 may be asymmetrical. In a uniform composite-star network 2702, the edge nodes 2710 are of equal dimension and the shell switches 2720 are of equal dimension. The number of edge nodes in a uniform composite-star network is determined by the dimension of each shell switch. For example if the dimension of a shell switch is 160×200, then the maximum number of edge nodes in a uniform composite-star network 2702 is 160. The number of shell switches 2720 is determined by the dimension of the edge nodes. If each edge node has a dimension of 450×400, for example, thus supporting 450 input channels and 400 output channels, then 200 of the output channels may be used to interconnect an edge node to at most 200 shell switches, and 250 of the input channels may receive traffic from shell switches 2720 and core switches 2730. A composite-star network 2702 may, however, be non-uniform as described with reference to FIG. 14.

An edge node 2710 has individually routed upstream channels 2711 to shell switches 2720 and, optionally, individually routed downstream channels 2712 from shell switches 2720.

An edge node 2710 time locks to each shell switch 2720 to which it connects. Edge nodes 2710 subtending to a common shell switch 2720 may communicate through temporal switching at the common shell switch while edge nodes 2710 that do not connect to a common shell switch may connect through temporal switching followed by spatial switching. For example, a burst from edge node 2710A to 2710B (FIG. 27) may be transferred through a time-locked path traversing shell switch 2720A towards core switch 2730A. Core switch 2730A then switches the burst over any available channel in a channel band 2714 leading to destination edge node 2710B. Note that the two blocks in FIG. 27 identified by the reference numerals 2710B-1 and 2710B-2 belong to the same edge node 2710B.

To extend network coverage, each shell switch 2720 may also have output channels 2722 individually connecting to the network core 2740. The network core 2740 may comprise a number of core planes 2760; each core plane 2760 comprising fast-switching core switches 2730 interconnected by multi-channel links 2732. The shell switches 2720 are organized into a plurality of shell-switch sets each set comprising at least one shell switch from each composite star network 2702, and the shell switches of each set are interconnected through a core plane 2760. Each edge node 2710 receives traffic from other native edge nodes 2710 of the same composite-star network 2702 through shell switches 2720 and receives traffic from edge nodes 2710 of other composite-star networks 2702 through the network core 2740. Each edge node 2710 is preferably connected to a core switch 2730 in each core plane 2760 through a downstream channel band 2714. Consider a specific edge node 2710 of a specific composite-star network 2702. The upstream module of the specific edge node 2710 has input channels (ingress channels) receiving data from traffic sources and outbound channels 2711 connecting to different shell switches of the specific composite-star network 2702. The downstream module has output channels (egress channels) transmitting data to subtending traffic sinks and input channels divided into two groups, a first group of inbound channels 2712 receiving traffic from the shell switches of the specific composite-star network 2702 and a second group of input channels receiving traffic from core planes 2760. The second group of inbound channels is preferably divided into channels bands 2714, each channel band 2714 connecting to one core switch in one of the core planes 2760.

Temporal switching is feasible from an edge node 2710 to an output channel of any shell switch to which the edge node connects. However, a core switch 2730 receives traffic over channels originating from different shell switches 2720 which may have different time references. The time reference of a shell switch is determined by an associated time counter. The time counters of all shell nodes may be clocked at the same rate and have equal cyclical periods. However, the starting times of the cyclical periods may not be coordinated. The core switches 2730 may not, therefore, be able to maintain time coordination. Thus, spatial switching that requires no inter-nodal time coordination is used within each core plane.

Thus, the structure of network 2700 allows edge nodes 2710 of each composite star network 2702 to communicate through loss-free temporal switching. The structure also allows each shell switch 2720 to connect to multiple core switches 2730 in corresponding core planes 2760, thus reducing the mean number of hops in the spatially switched core. Several structures may be used to realize a core plane 2760, as illustrated in FIGS. 30-33 below.

Figure 28:
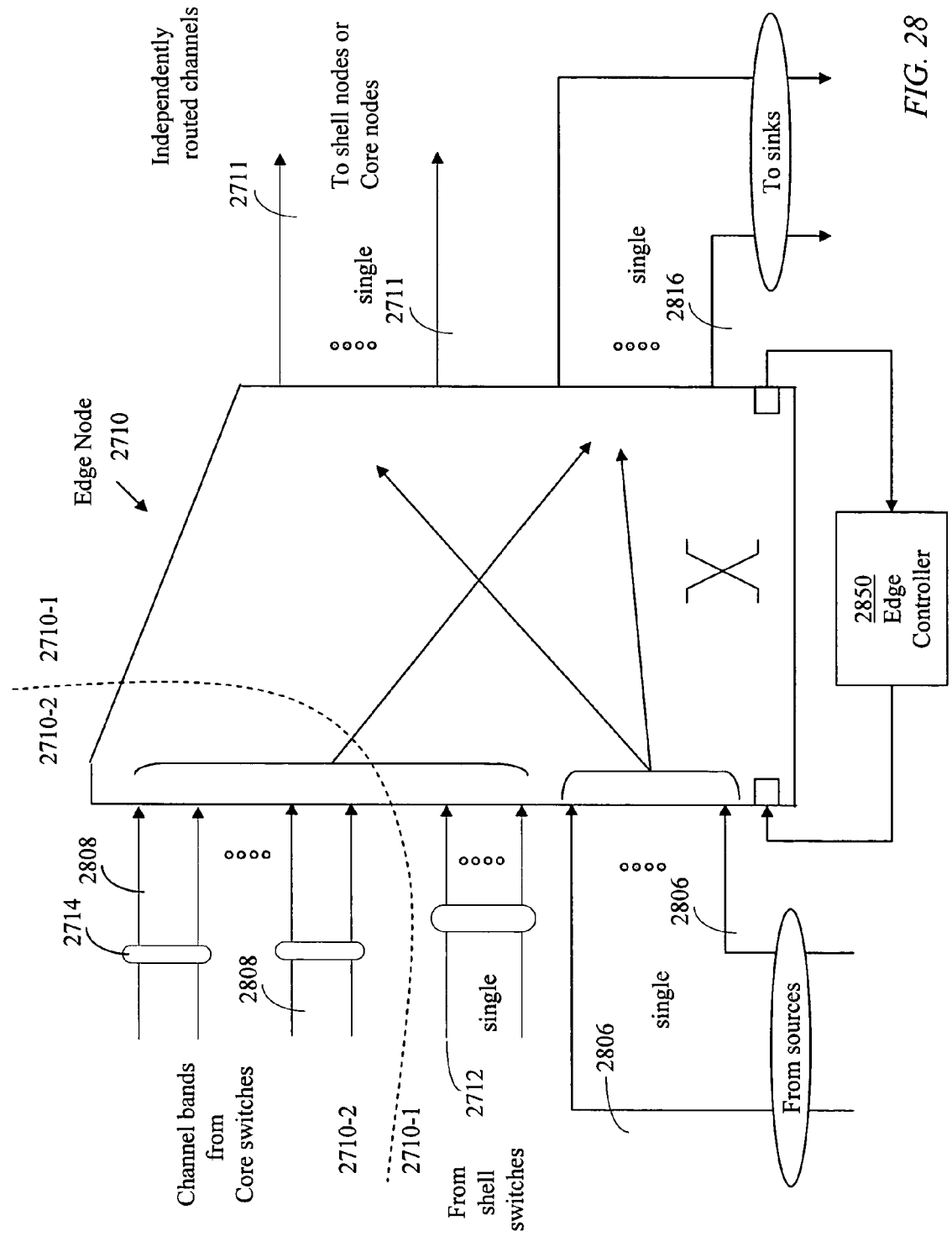
FIG. 28 illustrates an edge node with asymmetrical input-side connectivity and output-side connectivity for use in the network of FIG. 27, in accordance with an embodiment of the present invention.

FIG. 28 illustrates an electronic edge node 2710 (FIG. 27), having several input ports, several output ports, and a switching fabric 2810, with asymmetrical input-side connectivity and output-side connectivity. Notably, edge node 2710 has three groups of input channels. One group includes ingress channels 2806 individually connecting to traffic sources. A second group includes inbound channels 2712 individually routed from shell switches to carry time-coordinated signals transmitted over time-locked paths. The third group includes downstream inbound channels 2808 arranged in channel bands 2714, each channel band 2714 originating from a core switch 2730. Edge node 2710 has two groups of output channels. One group includes egress channels 2816 individually connecting to traffic sinks and the other group includes upstream outbound channels 2711 individually routed to shell switches 2720 or core switches 2730. Because the edge nodes 2710 include buffers, the upstream channels 2711 may be time locked and, hence, may employ temporal switching.

It is noted that block 2710-1 of FIG. 27 includes ingress ports 2806, inbound ports 2712, egress ports 2816, and outbound ports 2711 while block 2710-2 includes only inbound channel bands 2714. The two blocks 2710-1 and 2710-2 are drawn separately to simplify FIG. 27.

In a network where each path from a source edge node to a destination edge node is time locked, any output port of the source edge node may individually connect to any bufferless switch. Such a network is described in the aforementioned U.S. patent application Ser. No. 10/180,050. The present disclosure covers a network where some paths between edge nodes may not be time locked and the network, therefore, employs a mixture of temporal switching and spatial switching to extend the network coverage while realizing high network utilization, given the absence of time coordination in the core.

Collating Inbound Signals at an Edge Node

The asymmetrical edge node 2710 is operable to time lock each of the outbound channels 2711 to a corresponding optical node. Time locking permits temporal scheduling the transmission of signals (bursts) over an outbound channel; each signal is timed to arrive at a corresponding optical node at an instant determined by a temporal scheduler of the corresponding optical node. As described earlier, an optical node may resort to spatial switching when time reference is not maintained along an entire path. An optical core switch may spatially switch a signal to an edge node through any inbound channel 2808 within a channel band 2714. Thus, successive signals belonging to a given data stream destined to an edge node 2710 may be transmitted to the edge node 2710 over different inbound channels 2808 of an inbound channel band 2714.

At a destination edge node 2710, an inbound channel band 2714 occupying a WDM link is demultiplexed into its constituent wavelength channels 2808 and the optical signal carried by each channel 2808 is demodulated to extract its modulating digital data (the baseband signal). The digital data of each channel 2808 is presented to an inbound port for switching through the edge-node's switching fabric 2810 to destination egress ports. An inbound channel band 2714 may carry both temporally-switched bursts and spatially-switched (spectrally switched) bursts. Temporally-switched bursts of a specific data stream form a single-channel data stream terminating on a single inbound port of the destination edge node. Spatially-switched bursts are likely to form a multiple-channel data stream and successive bursts of a specific multiple-channel data stream may appear at different inbound ports of the destination edge node.

Bursts received at an inbound port of an edge node are placed in an input buffer and are switched to respective egress ports according to a schedule determined by an edge controller 2850 of the edge node. The edge controller 2850 determines a transfer time of each burst according to competing demands for read-access at the inbound port and write-access at the egress port. Only one burst can be transferred from an inbound port at a given instant and only one burst can be received by an egress port at any given instant. When there are several bursts waiting at an inbound port for transfer to at least one egress port, the edge controller 2850 schedules the waiting bursts for transfer over successive time intervals. When there are many bursts waiting at different inbound ports and destined to a specific egress port, the bursts will be scheduled for transfer to the specific egress ports over successive time intervals. Thus, the queueing delays of bursts of the same data stream (destined to the same egress port) but waiting at different inbound ports are influenced by uncoordinated arrival processes and the bursts of a multi-channel data stream may be received at the corresponding egress port in a temporal order which may differ from the temporal order in which the bursts were sent from their source edge node.

Two methods may be adopted in order to deliver bursts to their corresponding sinks in proper order, noting that each burst of a specific data stream naturally carries an identifier of the specific data stream and each burst is processed electronically at an edge node. Each inbound port of an edge node announces the arrival of a burst to an edge controller of the edge node by sending a scheduling request specifying the size and the data-stream identifier (or a destination) of each burst.

An obvious method to properly collate bursts is to assign a cyclical identifier to each burst in a data stream and sort the bursts accordingly at each egress port. This approach may incur additional delay at the egress ports. An alternative method, according to the present invention, schedules burst transfer at the receiving edge node according to a desired temporal order, as described below.

Edge controller 2850, associated with edge node 2710, collates the signals of a specific stream so that they may be delivered to data sinks in proper temporal order. This may be realized by using a common cyclic time reference (a time counter) for all inbound ports of the edge node 2710 and time stamping each inbound signal according to its arrival time. The time reference is preferably generated by the edge controller 2850. The time reference is cyclical with a period significantly exceeding the maximum expected queueing delay at the inbound buffers of the edge node. A scheduler associated with the edge controller 2850 then schedules the transfer of the bursts to respective traffic sinks according to the time stamp. It is noted that bursts of the same stream are routed along the same path, traversing the same sequence of bufferless switches. However, the bursts may be sent to the destination edge node on different wavelength channels 2808 of a channel band 2714. The duration of each burst is therefore required to exceed the maximum differential propagation delay along different wavelength channels of any end-to-end multi-channel path. For example, if the maximum differential propagation delay along two wavelength channels of a WDM path is 2 microseconds, the minimum burst duration may be specified to substantially exceed this value (8 microseconds for example) thus eliminating temporal out-of-order arrival of bursts at the destination edge node. Consequently, although successive signals (bursts) of a multi-channel stream may be received at different inbound ports of an edge node, they would not be received simultaneously or out of proper temporal order. However, this does not guarantee that the signals (bursts) will be delivered to the intended egress port in proper order because of the varying queueing delays at the inbound buffers as described earlier.

Although the process of collating spatially switched inbound signals is described above with reference to edge node 2710, the description is applicable to edge node 2410 by replacing reference to temporally switched signals received from shell nodes 2720 by temporally switched signals, if any, received from core nodes 2430.

Figure 29:
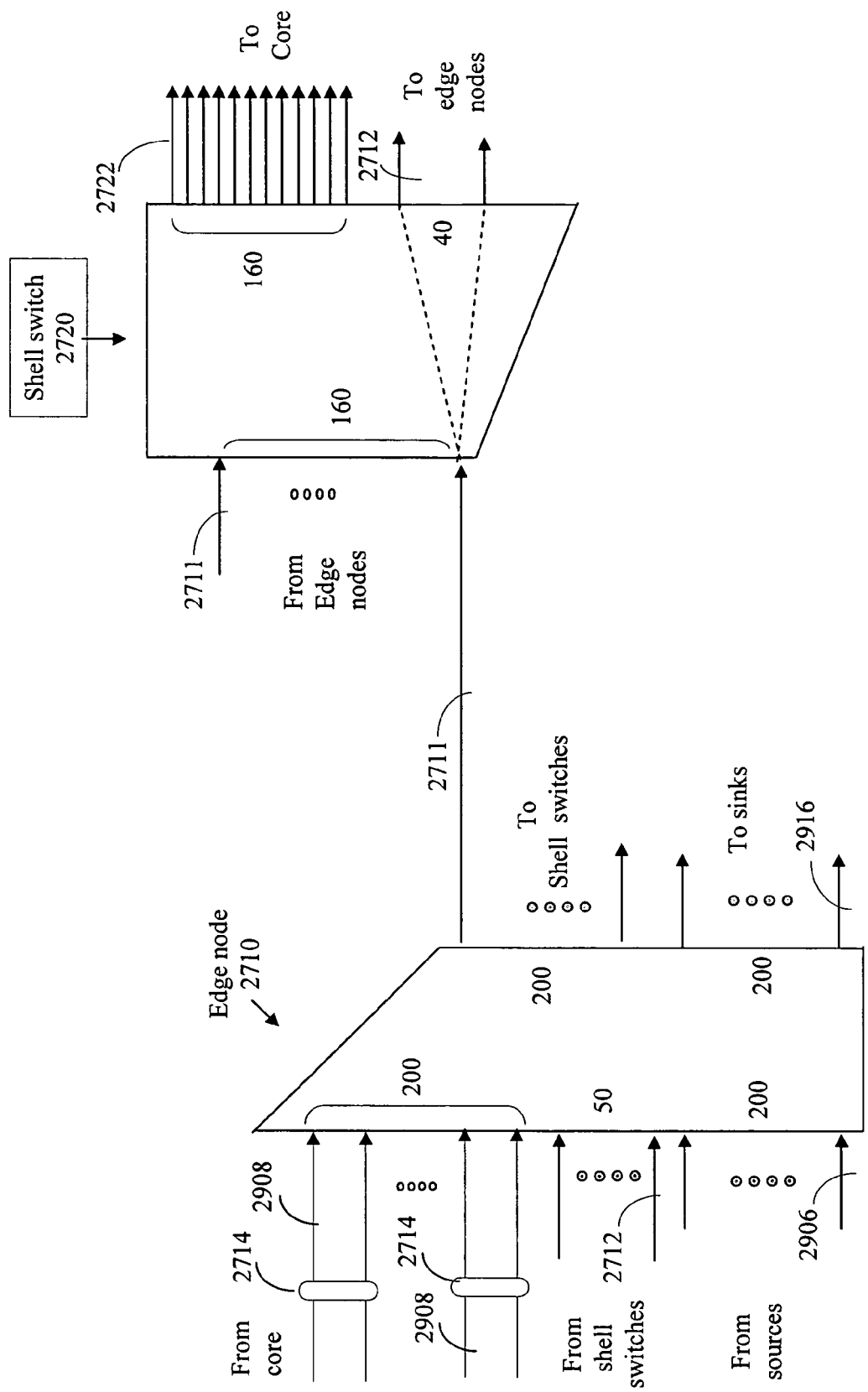
FIG. 29 illustrates a connection from an asymmetrical edge node to an asymmetrical edge shell in the network of FIG. 27, in accordance with an embodiment of the present invention.

FIG. 29 illustrates a shell switch 2720 in network 2700, and its connection to one of subtending edge nodes 2710. The shell switch 2720 may be asymmetrical, having more output ports than input ports. Shell switch 2720 receives traffic only from subtending edge nodes 2710. Shell switch 2720, however, sends traffic to subtending edge nodes 2710 as well as to core switches 2730 of a core plane 2760. A specific edge node 2710 in a specific composite-star network 2702 sends all its outbound traffic to shell switches 2720 of the specific composite-star network 2702 (FIG. 27) through individually routed channels 2711, and receives inbound traffic from shell switches 2720 over individually routed channels 2712 and from core switches 2730 over channel bands 2714. The specific edge node 2710 receives traffic originating from other native edge nodes 2710 through selected native shell switches 2720 using temporal switching but receives traffic originating from foreign edge nodes 2710 through core switches 2730 using spatial switching. While each edge node 2710 has an upstream channel 2711 to each native shell switch, an edge node may have downstream channels 2712 from only a subset of its native shell switches 2720. The number of downstream channels 2712 from a specific shell switch 2720 to its subtending edge nodes 2710 may, therefore, be less than the number of upstream channels 2711 from the subtending edge nodes to the specific shell switch. It is noted that all outbound traffic from an edge node 2710 is directed to shell nodes 2720 while inbound traffic to the edge node is received from both shell nodes 2720 and core nodes 2730.

In the configuration of FIG. 29, shell switch 2720 has 160 input channels 2711 originating from up to 160 native edge nodes, 40 downstream output channels 2712 individually routed to up to 40 of the 160 native edge nodes, and 160 output channels 2722 individually routed to selected core switches 2730. The illustrated edge node 2710 has 200 ingress channels 2906 (from traffic sources), 200 egress channels 2916 (to traffic sinks), 50 inbound channels 2712 from native shell switches, 200 outbound channels 2711 individually routed to native shell switches, and 200 inbound channels 2908, grouped in channel bands 2714 emanating from core switches 2730. With channel bands 2714 of 50 channels each, for example, the edge node 2710 may receive signals from four core switches 2730 in at most four core planes 2760. As such, a composite-star network 2702 (FIG. 27) may have 200 shell switches 2720 and 160 edge nodes 2710, each edge node 2710 having an ingress (or egress) capacity of 200 channels, thus realizing a composite-star network 2702 of access capacity (ingress or egress) of 32000 channels. With each channel having a capacity of 10 gigabits/second (Gb/s), for example, the total access capacity of the composite-star network 2702 would be 320 terabits per second (Tb/s). The entire network 2700 may comprise numerous composite star networks 2702, thus realizing a total access capacity of several petabits per second. It is emphasized here that the actual capacity of a network is determined by the total capacity of its access channels (outer channels).

Core-Plane Examples

Implementations of core planes 2460 or 2760 are described below. The description relates to core plane 2760 but its adaptation to core plane 2460 is straightforward.

Figure 30:
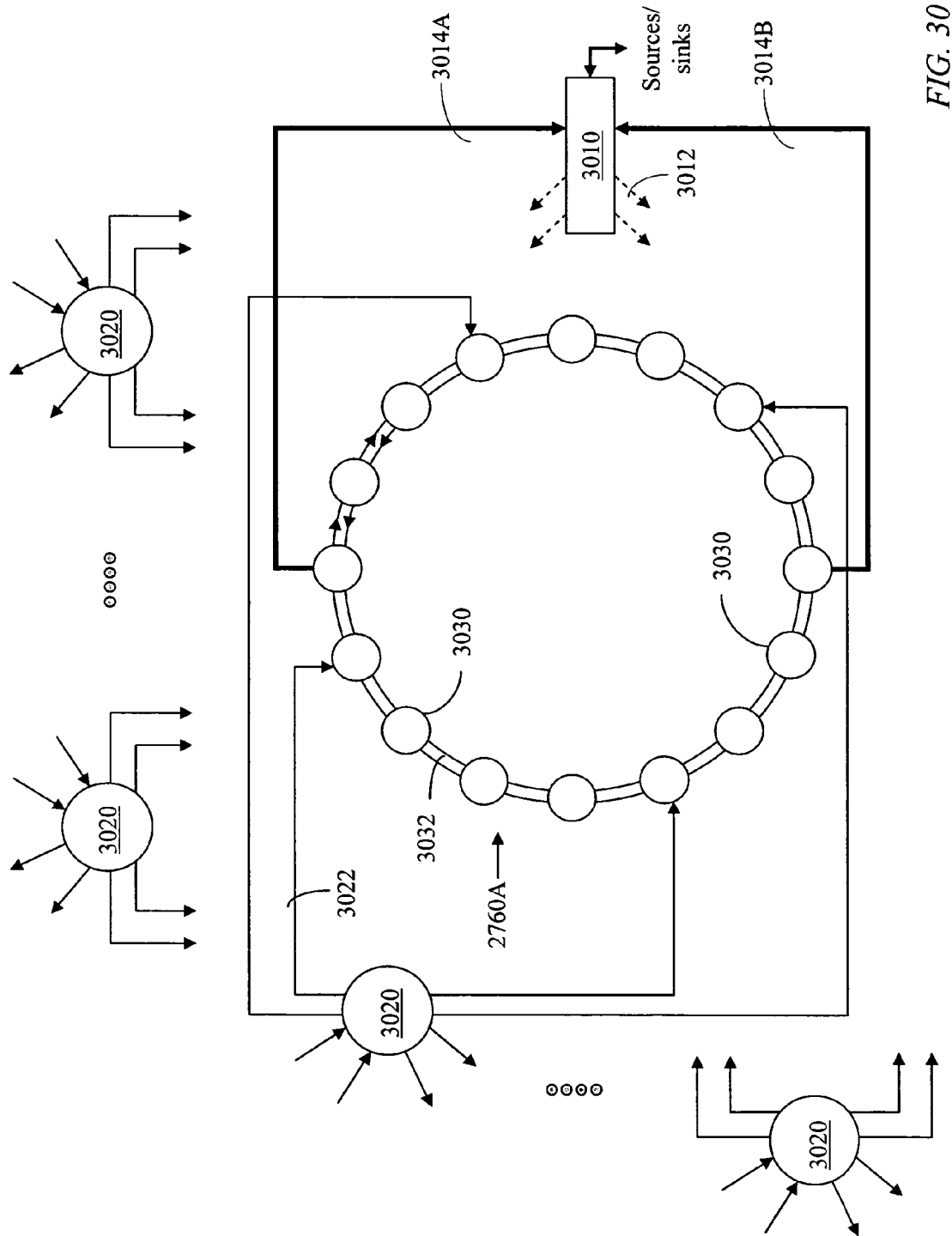
FIG. 30 illustrates a ring structure of a core plane in the network of FIG. 24 or FIG. 27.

FIG. 30 illustrates a core plane, 2760A, in network 2700 in which core switches 3030 are interconnected as a dual ring where successive core switches 3030 are connected through two-way links 3032, each two-way link having a sufficient number of channels in each direction to enable low-loss spatial switching. Upstream channels 3022 from each shell switch 3020 are connected to core switches 3030 that are topologically evenly-spaced in order to reduce the mean number of hops given an unknown spatial traffic distribution. Other connectivity patterns may be selected based on estimated spatial traffic distribution. As described with reference to FIG. 27, an edge node 2710 preferably connects to at least one core switch 2730 in each core plane 2760 by a downstream channel band. In FIG. 30, the illustrated edge node 3010 receives traffic from the illustrated core plane 2760A through two down-stream channel bands 3014A and 3014B. FIG. 30 illustrates the upstream connectivity of one shell switch 3020, but it is understood that other shell switches 3020 of the set of shell switches connecting to the core plane 2760A are likewise connected, each to respectively selected core switches.

Figure 31:
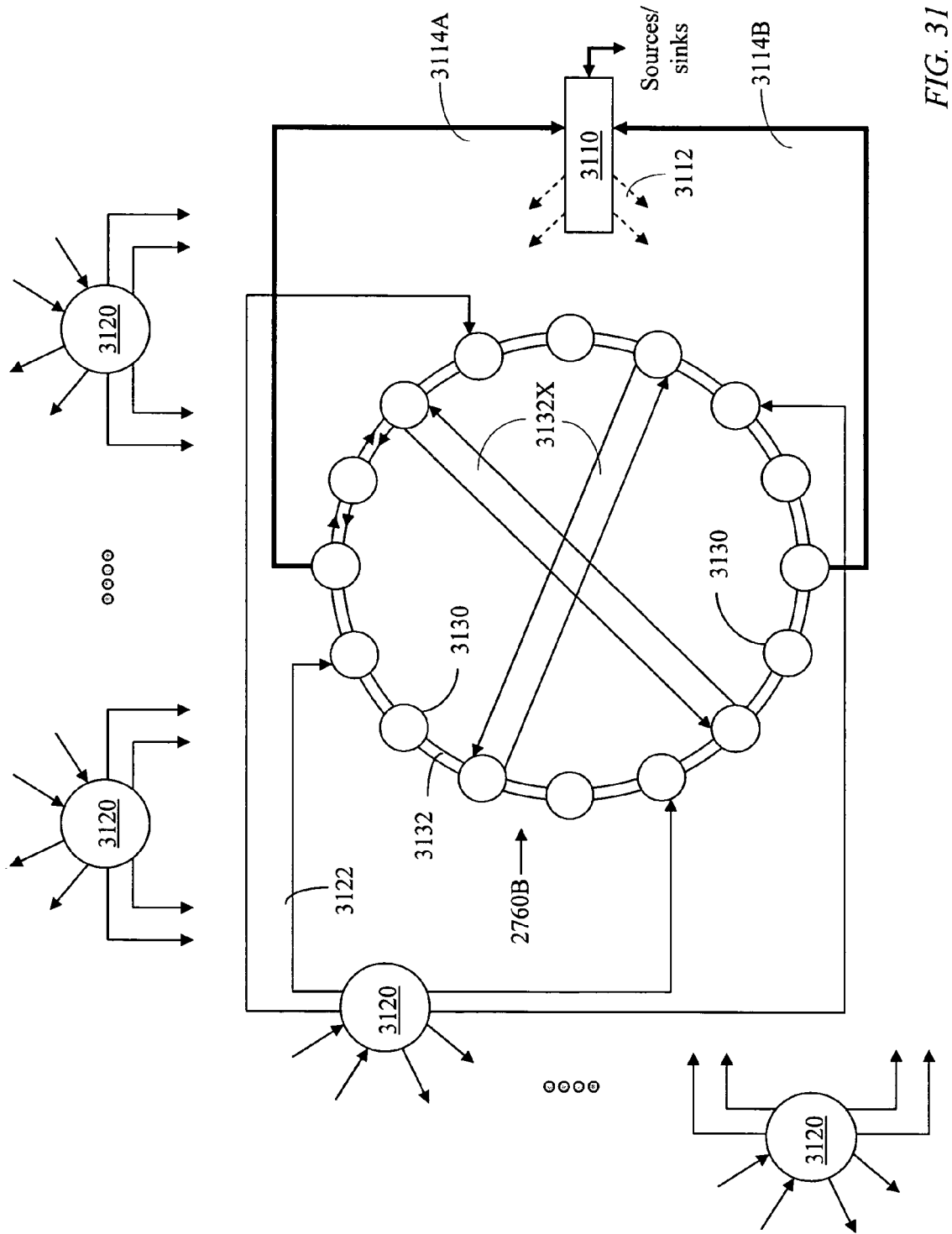
FIG. 31 illustrates a partial-mesh structure of a core plane in the network of FIG. 24 or FIG. 27.

FIG. 31 illustrates a core plane 2760B, similar to core plane 2760A of FIG. 30, having core switches 3130 interconnected to form a dual ring. The main difference is that some core switches may have a larger degree permitting each to have links 3132X to more core switches 3130 as illustrated. A person skilled in the art is aware that a ring is a sparsely connected structure resulting in routes of a large number of hops and the additional links 3132X of FIG. 31 reduces the mean number of hops per route.

Figure 32:
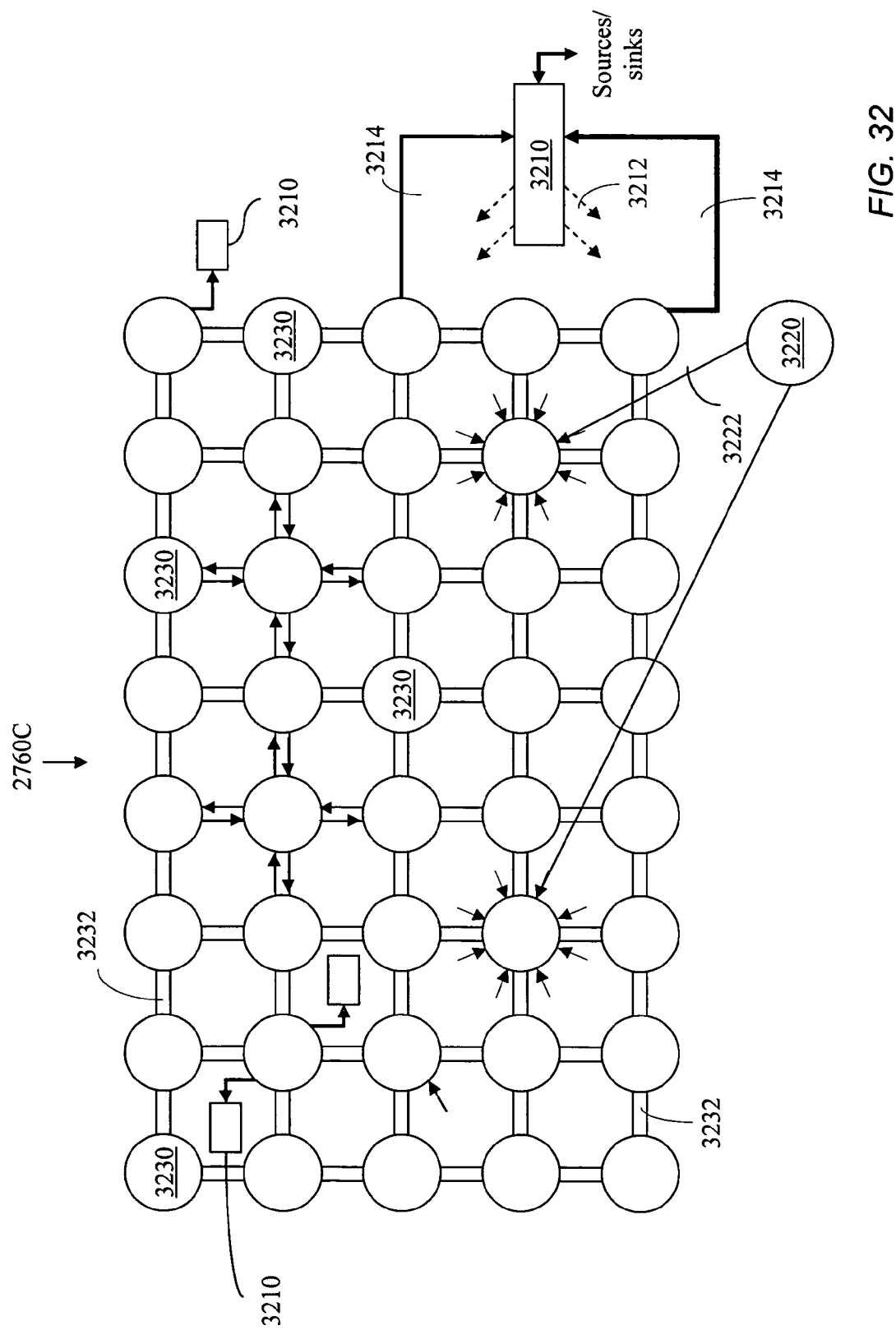
FIG. 32 illustrates a two-dimensional lattice structure of a core plane in the network of FIG. 24 or FIG. 27.

FIG. 32 illustrates core plane 2760C comprising core switches 3230 in a two-dimensional lattice structure where each core switch 3230 connects to each of at most four neighboring core switches 3230 through a multi-channel link 3232. The core switches 3230 would typically be geographically spread over a wide area and the distances between successive nodes may vary significantly. A core switch 3230 may receive signals from edge nodes 3210 through time-locked individual channels 3212 and transmits signals to edge nodes 3210 through downstream multi-channel links 3214. In a conventional lattice structure, having m>1 core switches per row and n>1 core switches per column, the number of intermediate core switches traversed by a path from one core switch to another varies between 1 and (m+n−3). Network efficiency is heavily dependent on the traffic-weighted mean number of hops per path (the number of hops per path equals the number of intermediate nodes plus one) and the conventional lattice structure is therefore practically limited to a very small number of core switches. In network 2700 of the present invention, edge nodes, shell nodes, or both have individual upstream-channel access to core nodes, thus reducing the mean number of hops and increasing network throughput.

In summary, the capacity of a core plane 2760 (FIG. 27) having a sparsely connected structure, would have a very limited access capacity due to multi-hop waste. However, with each shell switch 2720 accessing numerous core switches, and with each edge node switching traffic to the core through several shell switches, the weighted mean number of hops can be significantly reduced. FIG. 30 illustrates one extreme structure of a core plane 2760 having core switches of low dimension, each core switch having only two dual links to adjacent core switches, thus forming a dual-ring structure. In another extreme (not illustrated), core switches of larger dimension may be used, with each core switch providing a multi-channel link to each other core switch to create a fully-meshed core plane.

FIGS. 33 illustrate different input-output configurations of an optical space switch. In configuration 3310, each input channel and each output channel may be individually routed. In configuration 3320 some output channels are routed individually and others are grouped into channel bands with the channels of each channel band routed together. In configurations 3320 and 3330, the input channels may be routed individually or in bands. In configuration 3330, all output channels are arranged in output channel-bands with the channels of each output channel-band routed together to an adjacent node. In configuration 3340, the input channels are arranged in input channel-bands and the output channels are arranged in output channel-bands. The channels of an input channel-band are routed together and the channels of an output channel-band are routed together. Configuration 3310 is suitable for temporal switching in a shell node 2720 (FIG. 27). Configurations 3320, and 3330 are suitable for temporal and spatial switching in core nodes 2430 (FIG. 24) or 2730 (FIG. 27). Configuration 3340 is suitable for spatial switching in a core node 2430 or 2730.

Individual Channel Routing

To increase the adjacency of an optical node used for temporal switching, in accordance with an embodiment of the present invention, wavelength routers may be used to distribute the channels of the outbound links of the edge nodes of network 2000 (FIG. 20), 2300 (FIG. 23) or network 2400 (FIG. 24) among multi-channel links leading to core nodes, or the edge nodes of network 2700 (FIG. 27) among multi-channel links leading to shell nodes 2720 or core node 2730. This allows access to a large number of core switches or shell switches. The core switches may then be distributed geographically over a wide area. For example, in a uniform composite-star network 2702 (FIG. 27) where each edge node directly connects to each shell switch, if each edge node has 128 outbound channels, then the number of accessed shell switches may be as high as 128. Without the use of wavelength routers, the 128 outbound channels would be grouped into channel bands (to exploit WDM economy) each channel band having several channels, 16 for example, and an edge node would have upstream links to at most eight core switches. The use of wavelength routers to exchange individual channels of different channel bands will be described with reference to FIG. 34 which illustrates the use of a conventional wavelength router to enable independent routing of individual channels.

Figure 34:
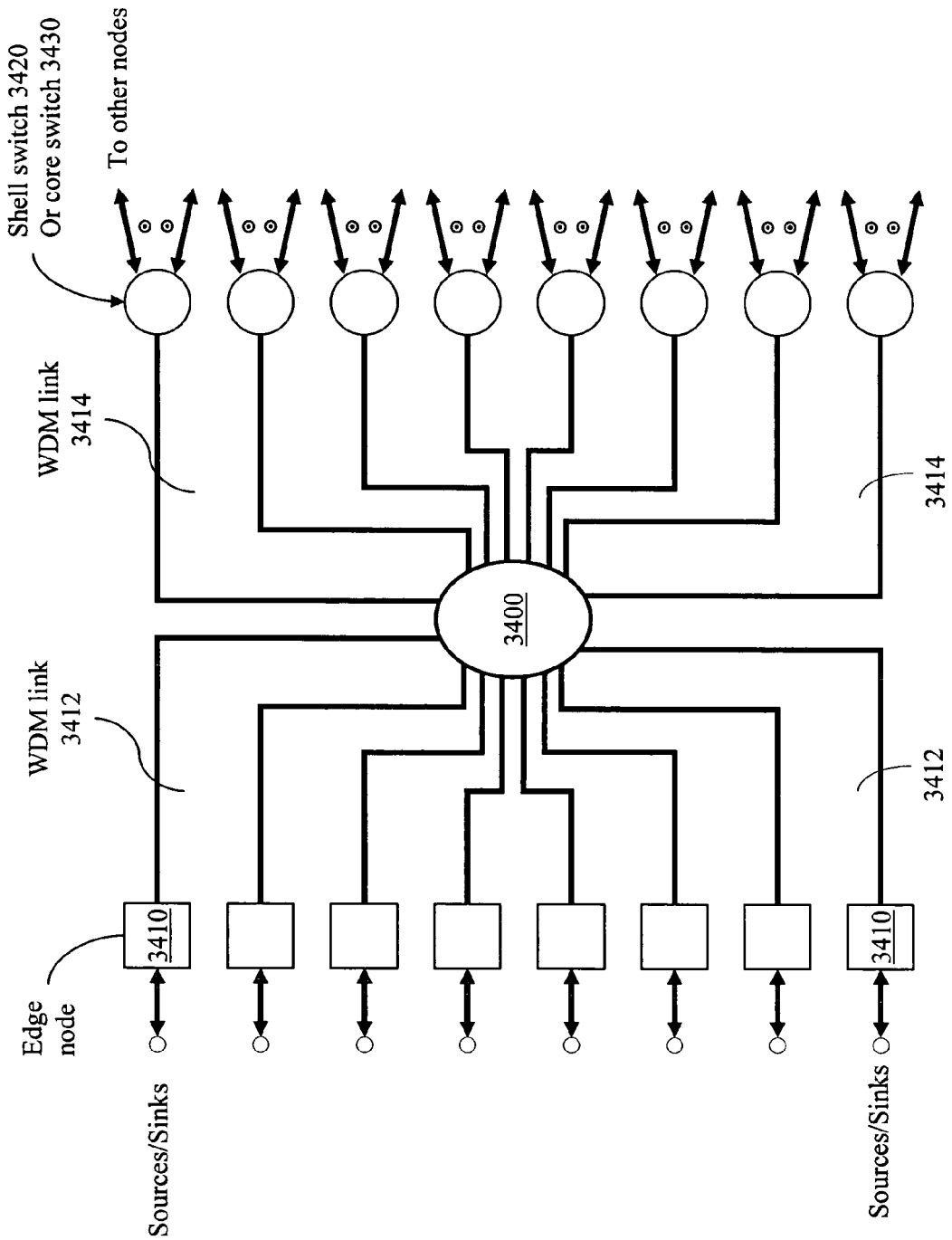
FIG. 34 illustrates the use of a wavelength router to enable routing individual channels in any of the networks of FIGS. 19, 21, 22, 23, 24, and 27, in accordance with an embodiment of the present invention.

FIG. 34 illustrates a number of edge nodes 3410 connecting to a wavelength router 3400 through multi-channel links 3412. Each of the output links 3414 of the wavelength router carries a wavelength channel from each of the edge nodes and may be directed to any of the optical switches, including shell switches 3420 and core switches 3430. Likewise, the arrangement of FIG. 34 applies where the input links to the wavelength router originate from shell switches and the output links are directed to core switches or, possibly, other shell switches. The wavelength router may be replaced by an optical switch that may be reconfigured to follow changes in the spatial traffic distribution. A slow-switching optical node may be used for this purpose.

Figure 35:
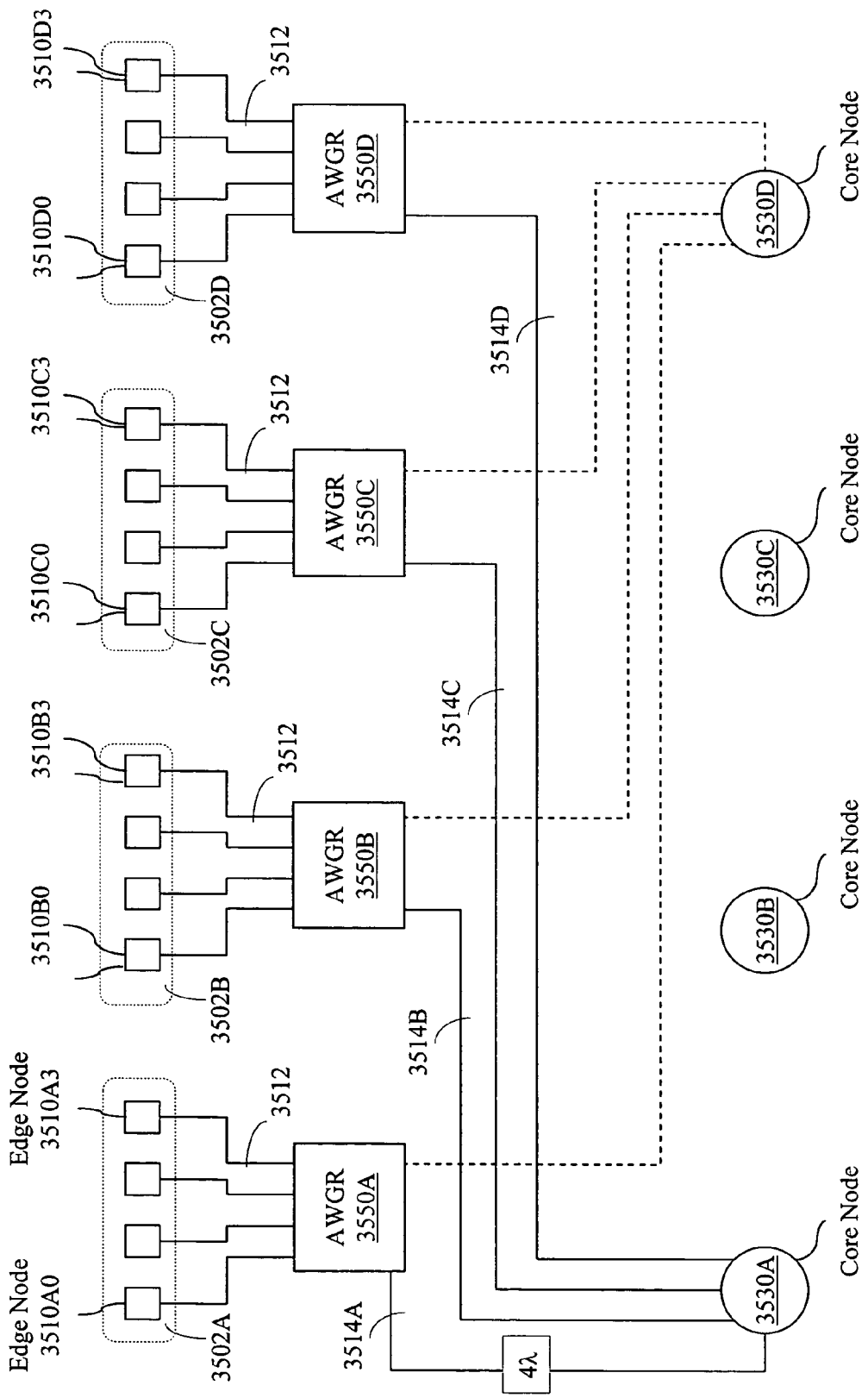
FIG. 35 illustrates the use of wavelength routers to manage access of edge nodes to core switches, for use with an embodiment of the present invention.

FIG. 35 further illustrates the use of wavelength routers where edge nodes 3510 are grouped into edge-node groups 3502 and an arrayed-waveguide-grating router (AWGR) 3550, well known in the art, shuffles the wavelength channels of each edge node group 3502 so that individual wavelength channels in WDM links 3512 are distributed to WDM links 3514 directed to optical core switches 3530. A core switch 3530A, for example, would then receive at least one wavelength channel from each edge node in edge-node group 3502A through WDM link 3514A. Likewise, core switch 3530A may receive a WDM link 3514B carrying at least one wavelength channel from each edge node in edge-node group 3502B, and so on.

Routing in a Network Employing Temporal and Spatial Switching

The process of selecting a route for a burst or a burst stream is greatly facilitated by designating selected candidate routes for each directed pair of edge nodes. The selected candidate routes are then sorted according to some merit criterion. The sorted routes, from an edge node to another edge node, are herein called a route set. An edge node may store a description of a route set to each other edge node.

In a network employing temporal and spatial switching, a first hop in a route from a first edge node to a second edge node may traverse a time-locked channel to a selected optical node, which may be a shell switch or a core switch. The remaining path from the selected optical node to the second edge node may be a direct path, if the selected optical node connects to the second edge node, or may be an indirect path traversing one or more core switches according to a spatial-switching mode. The selected candidate routes from the first edge node to the second edge node may be sorted according to the number of intermediated core switches or according to a composite criterion combining the number of intermediate core switches and the overall distance from the first edge node to the second edge node. An edge node may select a route in a route set according to a local policy.

The invention, therefore, provides means for reducing the number of hops in a spatially-scheduled network core where time coordination is not maintained. Using temporal switching from the edge to selected core switches can significantly reduce the number of hops in a vast network. Temporal switching along a path segment starting from an edge node is feasible due to the availability of buffers at the edge node.

The described embodiments are to be considered as illustrative and not restrictive. It will be apparent to a person skilled in the art that variations and modifications to the embodiments may be made within the scope of the following claims.

I claim:

1. In a network including a plurality of asymmetrical edge nodes interconnected by bufferless switches, a method of transmitting a signal originating from a first asymmetrical edge node to a second asymmetrical edge node over a path traversing two bufferless switches, the method comprising:

temporal switching of the signal in a first bufferless switch, among said bufferless switches, having one channel from the first asymmetrical edge node; and spatial switching of the signal in a second bufferless switch, among said bufferless switches, having a single channel from the first bufferless switch and multiple channels to the second asymmetrical edge node, the second bufferless switch comprising a composite temporal-spatial scheduler operative to schedule temporal switched signals and operative to schedule spatial switched signals;

wherein said temporal switching comprises:

allocating any time-interval during which said single channel from the first bufferless switch to said second bufferless switch is free;

determining a transmission time instant of said signal from said first asymmetrical edge node so that said signal arrives at said first bufferless switch at a start of said any time-interval; and transmitting said signal from said first asymmetrical edge node at said transmission time instant;

and wherein said spatial switching includes a step of allocating, by the composite temporal-spatial scheduler, from among said multiple channels, a channel determined to be free when said signal arrives at said second bufferless switch.

2. The method of claim 1 wherein said transmission time instant is determined according to a process of time locking said first asymmetrical edge node to said first bufferless switch, said process ensuring arrival of said signal at said first bufferless switch at a start of said any time-interval regardless of magnitude of propagation delay between said first asymmetrical edge node to said first bufferless switch.

3. The method of claim 1 wherein said any time-interval at least equals a duration of said signal.

4. The method of claim 1 further comprising said first bufferless switch transmitting to said second bufferless switch a header of said signal, said header indicating a duration of said signal, an identifier of said second asymmetrical edge node, and a time lag of said signal behind said header.

5. A network comprising:

a network core having a set of bufferless optical core switches interconnected by multiple-channel links so that a link connecting any pair of said bufferless optical core switches has multiple channels;

a set of asymmetrical bufferless optical shell switches, each asymmetrical bufferless optical shell switch having a respective plurality of outward wavelength channels individually routed to selected bufferless optical core switches from said set of bufferless optical core switches so that said each asymmetrical bufferless optical shell switch has only one channel to each bufferless optical core switch from among said selected bufferless optical core switches; and a plurality of asymmetrical edge nodes, each asymmetrical edge node having:

only one time-locked upstream channel to each asymmetrical bufferless optical shell switch of a respective subset of said asymmetrical bufferless optical shell switches;

only one downstream channel from said each asymmetrical bufferless optical shell switch of said respective subset of said asymmetrical bufferless optical shell switches; and a downstream channel band comprising multiple wavelength channels from each of at least one bufferless optical core switch.

6. The network of claim 5 wherein said network core comprises at least two core planes, each including a subset of said set of bufferless optical core switches and said each asymmetrical edge node has a downstream channel band from at least one bufferless optical core switch in each core plane.

7. The network of claim 5 wherein outward wavelength channels of at least two of said asymmetrical bufferless optical shell switches are grouped into multi-channel links, each connecting to a wavelength router having output multi-channel links connecting to a plurality of at least two bufferless optical core switches of said set of bufferless optical core switches.

8. The network of claim 5 wherein at least one asymmetrical edge node among said plurality of asymmetrical edge nodes has a time-locked channel directly connecting to one of said bufferless optical core switches.

9. An asymmetrical edge node comprising:

a switch fabric supporting:

a plurality of outbound channels, each outbound channel being individually routed to a different selected bufferless optical shell switch from among a plurality of bufferless optical shell switches;

a plurality of egress channels connecting to data sinks;

a plurality of inbound channel bands, each inbound channel band emanating from a bufferless optical core switch from among a plurality of bufferless optical core switches and containing a respective number of channels;

a plurality of inbound channels each emanating from a different bufferless optical shell switch from among said plurality of bufferless optical shell switches; and a plurality of ingress channels connecting to data sources; and an edge controller coupled to said switch fabric;

said asymmetrical edge node:

time locks each of said outbound channels to a corresponding bufferless optical shell switch from among said plurality of bufferless optical shell switches;

transmits outbound bursts to said plurality of bufferless optical shell switches;

receives temporally switched bursts from said plurality of inbound channels;

receives a plurality of spectrally-switched bursts destined for a same egress channel from different ones of said respective number of channels of said plurality of inbound channel bands; and collates said plurality of spectrally-switched bursts destined for the same egress channel according to a predetermined order.

10. The asymmetrical edge node of claim 9 wherein:

said edge controller schedules transfer of packets received from said ingress channels to said outbound channels;

an outbound port associated with each outbound channel:

aggregates packets received from said ingress channels into data bursts;

formulates burst-transfer requests, each burst-transfer request specifying a destination and a burst duration of a corresponding burst; and sends said each burst-transfer request over said each outbound channel to a respective bufferless optical shell switch to which said each outbound channel connects; and said edge controller receives from said respective bufferless optical shell switch an indication of a required transmission time for said corresponding burst; and communicates the indication of the required transmission time to said outbound port.

11. The asymmetrical edge node of claim 9 wherein:

an outbound port, connecting to an outbound channel:

formulates flow-rate-allocation requests, each flow-rate-allocation request specifying a destination and a required flow rate for a burst upstream; and sends said each flow-rate-allocation request over said outbound channel to a bufferless optical shell switch to which said outbound channel connects;

said edge controller:

receives from a specific bufferless optical core switch having an inbound channel band to said asymmetrical edge node burst-transfer permits for said burst upstream, each burst-transfer permit including an indication of a permissible size and a transmission time of an upstream burst; and communicates said burst-transfer permits to said outbound port; and said outbound port:

formulates said upstream burst within said permissible size; and transmits said upstream burst at said transmission time.

12. The asymmetrical edge node of claim 9 further comprising memory for storing a description of a route set to another asymmetrical edge node connecting to at least one bufferless optical core switch of said plurality of bufferless optical core switches.

13. The asymmetrical edge node of claim 9 further comprising inbound ports, each for receiving one of said inbound channels, said inbound ports sharing a common-time indicator.

14. The asymmetrical edge node of claim 13 wherein each of said inbound ports associates a time stamp with each temporally switched burst of received by the each inbound port.

15. The asymmetrical edge node of claim 14 wherein said edge controller shares said common-time indicator and schedules transfer of outbound bursts comprising temporally switched bursts received from said each inbound port in a temporal order according to said time stamps and said common-time indicator.

16. A core controller of a bufferless optical switching node, said bufferless optical switching node having input ports, output ports, and a switching fabric, the core controller comprising:

a timing circuit for exchanging time locking signals with edge controllers of subtending edge nodes;

a composite scheduler comprising:

a temporal scheduler for allocating a path, for a burst waiting in a buffer at an edge node subtending to said bufferless optical switching node, from a specific input port to a specific output port during any time interval of a specified duration; and a spatial scheduler for allocating a path, for a forthcoming already propagating burst, from a specific input port to any output port from within a band of output ports during a specified time interval; and a selector for arbitrating between said temporal scheduler and said spatial scheduler when said specific output port is within said band of output ports so that upon receiving a first request to schedule transfer of a first burst waiting in a buffer at one of said subtending edge nodes and a second request to schedule an already propagating second burst, said first burst and said second burst having a common destination, said selector:

activates said temporal scheduler, subject to an indication that said first burst has been waiting for a period of time exceeding a predetermined delay tolerance; and activates said spatial scheduler otherwise.

\* \* \* \* \*